United States Patent
Zeng et al.

(10) Patent No.: US 12,200,189 B2
(45) Date of Patent: Jan. 14, 2025

(54) SYSTEMS AND METHODS FOR INTER-FRAME PREDICTION

(71) Applicant: ZHEJIANG DAHUA TECHNOLOGY CO., LTD., Zhejiang (CN)

(72) Inventors: Feiyang Zeng, Hangzhou (CN); Dong Jiang, Hangzhou (CN); Jucai Lin, Hangzhou (CN); Jun Yin, Hangzhou (CN); Cheng Fang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 286 days.

(21) Appl. No.: 17/645,968

(22) Filed: Dec. 24, 2021

(65) Prior Publication Data
US 2022/0124321 A1   Apr. 21, 2022

Related U.S. Application Data

(63) Continuation of application No. PCT/CN2020/098125, filed on Jun. 24, 2020.

(30) Foreign Application Priority Data

Jun. 25, 2019 (CN) .......................... 201910555587.5
Jun. 25, 2019 (CN) .......................... 201910556619.3
Aug. 21, 2019 (CN) .......................... 201910775404.0

(51) Int. Cl.
*H04N 19/105* (2014.01)
*H04N 19/14* (2014.01)
(Continued)

(52) U.S. Cl.
CPC ........... *H04N 19/105* (2014.11); *H04N 19/14* (2014.11); *H04N 19/176* (2014.11); *H04N 19/52* (2014.11); *H04N 19/96* (2014.11)

(58) Field of Classification Search
None
See application file for complete search history.

(56) References Cited

U.S. PATENT DOCUMENTS 7,181,050 B1   2/2007 Daly et al.
10,362,330 B1  7/2019 Li et al.
(Continued)

FOREIGN PATENT DOCUMENTS

CN   1688164 A    10/2005
CN   103517069 A   1/2014
(Continued)

OTHER PUBLICATIONS

Fernandez DG, Del Barrio AA, Botella G, Garc-a C, Prieto M, Hermida R. Complexity reduction in the HEVC/H265 standard based on smooth region classification. Digital Signal Processing. Feb. 1, 2018;73:24-39. (Year: 2018).*

(Continued)

*Primary Examiner* — Clifford Hilaire
(74) *Attorney, Agent, or Firm* — METIS IP LLC

(57) ABSTRACT

A method for inter-frame prediction may include obtaining a current coding unit in an image. The method may also include determining feature information of the current coding unit, the feature information being associated with at least one of a size feature or a texture feature. The method may also include determining, based on the feature information of the current coding unit, an MV candidate list. The method may also include determining, based on the MV candidate list, a prediction result of the current coding unit.

18 Claims, 23 Drawing Sheets

(51) Int. Cl.
*H04N 19/176* (2014.01)
*H04N 19/52* (2014.01)
*H04N 19/96* (2014.01)

(56) References Cited

U.S. PATENT DOCUMENTS

| | | |
|---|---|---|
| 2013/0294512 A1 | 11/2013 | Song et al. |
| 2014/0133571 A1 | 5/2014 | Kim |
| 2014/0301471 A1 | 10/2014 | Lin |
| 2015/0208086 A1 | 7/2015 | Chen et al. |
| 2015/0208087 A1 | 7/2015 | Park et al. |
| 2015/0256850 A1 | 9/2015 | Kottke et al. |
| 2015/0296218 A1 | 10/2015 | Pasupuleti et al. |
| 2015/0326875 A1 | 11/2015 | Chen et al. |
| 2015/0373359 A1* | 12/2015 | He ............... H04N 19/147 375/240.12 |
| 2016/0227218 A1* | 8/2016 | Trudeau ............ H04N 19/52 |
| 2017/0310988 A1 | 10/2017 | Lin et al. |
| 2018/0070105 A1 | 3/2018 | Jin et al. |
| 2018/0192071 A1 | 7/2018 | Chuang et al. |
| 2018/0255316 A1 | 9/2018 | Zhang et al. |
| 2018/0295379 A1 | 10/2018 | Lim et al. |
| 2019/0014338 A1 | 1/2019 | Laroche et al. |
| 2019/0149838 A1 | 5/2019 | Zhang et al. |
| 2019/0174136 A1 | 6/2019 | Jun et al. |
| 2020/0120344 A1 | 4/2020 | Mao et al. |
| 2020/0228830 A1 | 7/2020 | Zhang et al. |
| 2020/0396462 A1 | 12/2020 | Zhang et al. |
| 2021/0160532 A1* | 5/2021 | Zhang ............... H04N 19/593 |
| 2021/0266525 A1 | 8/2021 | Tsukuba |
| 2021/0321102 A1 | 10/2021 | Chen |

FOREIGN PATENT DOCUMENTS

| | | |
|---|---|---|
| CN | 104394409 A | 3/2015 |
| CN | 105338363 A | 2/2016 |
| CN | 105959699 A | 9/2016 |
| CN | 108184115 A | 6/2018 |
| CN | 110213588 A | 9/2019 |
| CN | 110213590 A | 9/2019 |
| CN | 110460859 A | 11/2019 |
| EP | 2096871 A2 | 9/2009 |
| WO | 2014058795 A1 | 4/2014 |
| WO | 2017197126 A1 | 11/2017 |
| WO | 2018205914 A1 | 11/2018 |

OTHER PUBLICATIONS

International Search Report in PCT/CN2020/098125 mailed on Oct. 9, 2020, 6 pages.
Written Opinion in PCT/CN2020/098125 mailed on Oct. 9, 2020, 6 pages.
First Office Action in Chinese Application No. 201910556619.3 mailed on Jan. 13, 2021, 15 pages.
First Office Action in Chinese Application No. 201910555587.5 mailed on Jan. 12, 2021, 11 pages.
First Office Action in Chinese Application No. 201910775404.0 mailed on Mar. 3, 2021, 23 pages.
Mathias Wien, Variable Block-Size Transforms for H.264/AVC, IEEE Transactions On Circuits and Systems for Video Technology, 13(7): 604-613, 2003.
Mahsa T. Pourazad et al., HEVC: The New Gold Standard for Video Compression, IEEE Consumer Electronics Magazine, 2012, 11 pages.
Chen, Yi-Wen et al., CE4-related: A Second ATMVP Candidate, Joint Video Experts Team (JVET) of ITU-T SG 16 WP 3 and ISO/IEC JTC 1/SC 29/WG 11, JVET-L0105, 2018.
Xu, Liying et al., Candidate List Reordering, Joint Video Experts Team (JVET) of ITU-T SG 16 WP 3 and ISO/IEC JTC 1/SC 29/WG 11, JVET-K0065-V4, 2018.
Hahyun Lee, Non-CE4: HMVP Unification Between the Merge and MVP List, Joint Video Experts Team (JVET) of ITU-T SG 16 WP 3 and ISO/IEC JTC 1/SC 29/WG 11, JVET-N0373-V2, 2019.
Jie Zhao, CE4-Related: History Based Affine Merge Candidate, Joint Video Experts Team (JVET) of ITU-T SG 16 WP 3 and ISO/IEC JTC 1/SC 29/WG 11, JVET-L0305, 2018.
Chen, Yi-Wen et al., Non-CE4: Simplification of HMVP in Merge List Construction, Joint Video Experts Team (JVET) of ITU-T SG 16 WP 3 and ISO/IEC JTC 1/SC 29/WG 11, JVET-O0589, 2019.
Suhong Wang, CE8-1.7: Single HMVP Table for All CUs Inside the Shared Merge List Region for IBC, Joint Video Experts Team (JVET) of ITU-T SG 16 WP 3 and ISO/IEC JTC 1/SC 29/WG 11, JVET-O0078, 2019.
Xu, Liying et al., CE4-related: Simplification of Candidate List Derivation for MMVD Mode, Joint Video Experts Team (JVET) ITU-T SG 16 WP 3 and ISO/IEC JTC1/SC 29/WG 11, 2019, 7 pages.
Xu, Liying et al., CE4 related: Candidate List Reordering, Joint Video Experts Team (JVET) of ITU-T SG 16 WP 3 and ISO/IEC JTC 1/SC 29/WG 11, 2018, 6 pages.
Hsu, Chih-Wei et al., Description of SDR Video Coding Technology Proposal by MediaTek, Joint Video Experts Team (JVET) of ITU-T SG 18 WP 3 and ISO/IEC JTC 1/SC 29/WG 11, 2018, 64 pages.
Gary J. Sullivan et al., Overview of the 1-10,13 High Efficiency Video Coding (HEVC) Standard, IEEE Transactions On Circuits and Systems for Video Technology, 22(12): 1649-1668, 2012.
The Partial Supplementary European Search Report in European Application No. 20630559.9 mailed on Oct. 21, 2022, 15 pages.

* cited by examiner

600

> Determining, based on feature information of a current coding unit, a first boundary from the two adjacent boundaries of the current coding unit, the first boundary satisfying a condition
> 602

↓

> Determining a first count of one or more image blocks corresponding to the first boundary
> 604

↓

> Determining a second count of one or more image blocks corresponding to a second boundary of the two adjacent boundaries to a second count, the second count being less than the first count
> 606

↓

> Obtaining MVs of the one or more image blocks of the first count and the one or more image blocks of the second count
> 608

> Determining, based on feature information of a current coding unit, a first boundary and a second boundary from two adjacent boundaries of the current coding unit, the first boundary satisfying a condition
> 702

↓

> Determining an acquisition order of MVs of one or more image blocks, the acquisition order indicating an order in which the MVs are arranged in an MV candidate list, the acquisition order being that an MV of an image block located along the first boundary are arranged in the MV candidate list in front of an MV located along the second boundary
> 706

Determining a texture similarity degree between a current coding unit and each of one or more image blocks associated with the current coding unit
802

Comparing the texture similarity degrees between the current coding unit and the one or more image blocks to obtain a comparison result
804

Determining at least a portion of one or more image blocks based on the comparison result
806

Determining an acquisition order of MVs of the at least a portion of the one or more image blocks, the acquisition order being that an MV of an image block with a higher texture similarity degree is arranged in the MV candidate list in front of an MV of an image block with a higher texture similarity degree
808

```
┌─────────────────────────────────────────────────────────┐
│  Obtaining one or more first reference images of a current image │
│                          1302                            │
└─────────────────────────────────────────────────────────┘
                              ↓
┌─────────────────────────────────────────────────────────┐
│  Obtaining a second reference image of each of one or more co- │
│           located images of the current image            │
│                          1304                            │
└─────────────────────────────────────────────────────────┘
                              ↓
┌─────────────────────────────────────────────────────────┐
│  Obtaining one or more MVs of one or more co-located blocks in │
│   each of the one or more co-located images of the current image, │
│   each of the one or more co-located blocks corresponding to a time- │
│      domain block of a current coding unit in the current image │
│                          1306                            │
└─────────────────────────────────────────────────────────┘
                              ↓
┌─────────────────────────────────────────────────────────┐
│  For each MV of a co-located block, determining, based on a first │
│   distance between the current image and each of the one or more first │
│     reference images and a second distance between the co-located │
│    image and the second reference image, one or more MVs of the │
│                    current coding unit                    │
│                          1308                            │
└─────────────────────────────────────────────────────────┘
```

```
┌─────────────────────────────────────────┐
│   Obtaining a current coding unit in an image │
│                  2002                    │
└─────────────────────────────────────────┘
                    │
                    ▼
┌─────────────────────────────────────────┐
│ Determining a first motion vector (MV) candidate list, │
│ the first MV candidate list including a plurality of MVs │
│ of a plurality of first image blocks, each of the plurality │
│ of MVs having been used to encode one of a plurality │
│           of first image blocks          │
│                  2004                    │
└─────────────────────────────────────────┘
                    │
                    ▼
┌─────────────────────────────────────────┐
│ Determining, from the plurality of MVs, one or more │
│ first MVs of one or more first image blocks according to │
│                a first order             │
│                  2006                    │
└─────────────────────────────────────────┘
                    │
                    ▼
┌─────────────────────────────────────────┐
│ Determining, based at least in part on the one or more │
│ first MVs and a second order, a second MV candidate │
│ list of the current coding unit corresponding to the │
│              prediction mode             │
│                  2008                    │
└─────────────────────────────────────────┘
```

```
Determining a temporary HMVP list of a current coding
unit under an IBC mode
2102
          ↓
Adjusting locations of the one or more MVs in the
temporary HMVP list to obtain a HMVP list of the
current coding unit
2104
```

```
Obtaining a preliminary second MV candidate list
including one or more second MVs and one or more first
MVs from a first MV candidate list
2202
          ↓
Determining, one or more third MVs from the
preliminary second MV candidate list
2204
          ↓
Comparing each of the one or more first MVs obtained
from the first MV candidate list with each of the one or
more third MVs to obtain a comparison result
2206
          ↓
Updating the preliminary second MV candidate list to
obtain a second MV candidate list based on the
comparison result
2208
```

FIG. 22

SYSTEMS AND METHODS FOR INTER-FRAME PREDICTION

CROSS-REFERENCE TO RELATED APPLICATIONS

This application is a continuation of International Application No. PCT/CN2020/098125, filed on Jun. 24, 2020, which claims priority to Chinese Patent Application No. 201910556619.3 filed on Jun. 25, 2019, Chinese Patent Application No. 201910555587.5 filed on Jun. 25, 2019, Chinese Patent Application No. 201910775404.0 filed on Aug. 21, 2019, the contents of each of which are incorporated herein by reference in their entirety.

TECHNICAL FIELD

The present disclosure generally relates to video encoding and decoding systems, and more particularly relates to methods and systems for inter-frame prediction in video encoding.

BACKGROUND

In storage or transmission of image data or video data, the image data or video data may be encoded or compressed into a video stream, which may reduce the amount of video data, thereby reducing network bandwidth and storage space. An encoding process may include prediction, transformation, quantization, entropy encoding, or the like. The prediction may include intra-frame prediction and inter-frame prediction, which is used to remove the spatial and temporal redundancy of video data, respectively. For example, the inter prediction may be performed on a video to obtain prediction values based on a correlation between frames in the video. To improve the accuracy of prediction values and the compression efficiency, an MV (MV) candidate list may be determined to estimate a target MV for inter prediction, that may be used to determine prediction values. Therefore, it is desirable to provide systems and/or methods for determining an MV candidate list for intra-prediction with improved accuracy and efficiency.

SUMMARY

According to an aspect of the present disclosure, a system for inter-frame prediction may be provided. The system may include one or more storage devices and one or more processors configured to communicate with the one or more storage devices. The one or more storage devices may include a set of instructions. When the one or more processors execute the set of instructions, the system may be directed to cause the system to perform one or more of the following operations. The system may obtain a current coding unit in an image. The system may determine feature information of the current coding unit, the feature information being associated with at least one of a size feature or a texture feature. The system may determine, based on the feature information of the current coding unit, a prediction result of the current coding unit. In some embodiments, the system may determine, based on the MV candidate list, a prediction result of the current coding unit.

In some embodiments, the system may determine, based on the feature information of the current coding unit, one or more motion vectors (MVs) of one or more image blocks associated with the current coding unit. Each of the one or more image blocks may have been encoded. The system may determine, based at least in part on the one or more MVs, the MV candidate list.

In some embodiments, to determine, based on the feature information of the current coding unit, one or more motion vectors (MVs) of one or more image blocks associated with the current coding unit, the system may determine the one or more image blocks. The system may obtain the MVs of the one or more image blocks. The system may determine an arrangement order of the one or more MVs in the MV candidate list, wherein at least one of a count of the one or more image blocks and the arrangement order of the one or more MVs in the MV candidate list is determined based on the feature information.

In some embodiments, to determine the one or more image blocks, the system may determine, based on the feature information, a count of image blocks that are located along each of two adjacent boundaries of the current coding unit. The system may determine, based on the count of image blocks that are located along each of two adjacent boundaries of the current coding unit, the one or more image blocks.

In some embodiments, the two adjacent boundaries of the current coding unit may include a first boundary satisfying a condition and a second boundary, and a first count of image blocks located along the first boundary may exceed a second count of image blocks located along the second boundary.

In some embodiments, to determine, based on the feature information, a count of image blocks that are located along each of boundaries of the current coding unit, the system may determine, based on a prediction mode of the current coding unit, an initial count of image blocks that located along the first boundary and an initial count of image blocks that located along the second boundary. The system may increase the initial count of image blocks that are located along the first boundary to obtain the first count. The system may decrease the initial count of image blocks that are located along the second boundary to obtain the first count.

In some embodiments, the two adjacent boundaries of the current coding unit may include a first boundary satisfying a condition and a second boundary, and one or more MVs of image blocks located along the first boundary may be arranged in the MV candidate list in front of MVs of image blocks located along the second boundary.

In some embodiments, the size feature may include information associated with lengths of the two adjacent boundaries of the current coding unit. The first boundary satisfying the condition may include that the first boundary has a longer length among the two adjacent boundaries.

In some embodiments, the texture feature may include information associated with a texture direction of the current coding unit. The first boundary satisfying the condition may include that the texture direction of the current coding unit points to the first boundary.

In some embodiments, to determine feature information of the current coding unit, the system may perform an intra-frame prediction on the current coding unit using multiple angular prediction modes with different prediction directions. The system may determine a rate distortion (RD) cost corresponding to each of the multiple angular prediction modes to obtain multiple RDcosts. The system may designate a prediction direction of one of the multiple angular prediction modes corresponding to a minimum RDcost among the multiple RDcosts as the texture direction.

In some embodiments, the texture feature may include a texture similarity degree between the current coding unit and each of the one or more image blocks. An MV of an image block with a higher texture similarity degree with the current coding unit may be arranged in front of an MV of an image block with a lower texture similarity degree with the current coding unit in the MV candidate list.

In some embodiments, to determine, based at least in part on the one or more motion vectors, an MV candidate list, the system may determine one or more image blocks associated with the current coding unit in the image. The system may determine one or more co-located images of the image. The system may determine one or more co-located blocks in each of the one or more co-located images, each of the one or more co-located blocks corresponding to one of the one or more image blocks. The system may generate, based on each of first motion vectors (MVs) of the one or more co-located blocks, multiple second MVs of the current coding unit, each of the first MVs of the one or more co-located blocks corresponding to the multiple second MVs of the current coding unit. The system may determine, based at least in part on the one or more MVs and the multiple second MVs of the current coding unit, the MV candidate list.

In some embodiments, to determine, based at least in part on the one or more MVs and the multiple second MVs of the current coding unit, the MV candidate list, the system may obtain a first MV candidate list. The first MV candidate list may include a plurality of historical MVs of a plurality of first image blocks and each of the plurality of historical MVs may have been used to encode one of a plurality of first image blocks. The system may determine, from the plurality of historical MVs, one or more historical MVs of one or more first image blocks according to a first order. The system may determine, based at least in part on the one or more MVs, the multiple second MVs, the one or more historical MVs, and a second order, the MV candidate list.

According to another aspect of the present disclosure, a method for inter-frame prediction may be provided. The method may include obtaining a current coding unit in an image. The method may include determining feature information of the current coding unit, the feature information being associated with at least one of a size feature or a texture feature. The method may include determining, based on the feature information of the current coding unit an MV candidate list. The method may further include determining, based on the MV candidate list, a prediction result of the current coding unit.

According to yet another aspect of the present disclosure, a system for inter-frame prediction may be provided. The system may include an acquisition module configured to obtain a current coding unit in an image. The system may also include a feature information determination module configured to determine feature information of the current coding unit. The system may also include an MV determination module configured to determine, based on the feature information of the current coding unit, one or MVs of one or more image blocks associated with the current coding unit. The system may also include an MV candidate list determination module configured to determine an MV candidate list based on the one or more MVs. The system may also include a prediction module configured to determine a prediction result of the current coding unit based on the MV candidate list.

According to yet another aspect of the present disclosure, a non-transitory computer readable medium may be provided. The non-transitory computer readable may include at least one set of instructions for inter-frame prediction. When executed by one or more processors of a computing device, the at least one set of instructions may cause the computing device to perform a method. The method may include obtaining a current coding unit in an image. The method may include determining feature information of the current coding unit, the feature information being associated with at least one of a size feature or a texture feature. The method may include determining, based on the feature information of the current coding unit, an MV candidate list. The method may further include determining, based on the MV candidate list, a prediction result of the current coding unit.

According to yet another aspect of the present disclosure, a system for inter-frame prediction may be provided. The system may include one or more storage devices and one or more processors configured to communicate with the one or more storage devices. The one or more storage devices may include a set of instructions. When the one or more processors execute the set of instructions, the system may be directed to perform one or more of the following operations. The system may obtain a current coding unit in an image. The system may determine one or more image blocks associated with the current coding unit in the image. The system may determine one or more co-located images of the image. The system may determine one or more co-located blocks in each of the one or more co-located images. Each of the one or more co-located blocks may correspond to one of the one or more image blocks. The system may also determine, based at least in part on the one or more co-located blocks in each of the one or more co-located images, an MV candidate list. The system may further determine, based on the MV candidate list, a prediction result of the current coding unit.

In some embodiments, the system may generate, based on each of first motion vectors (MVs) of the one or more co-located blocks, multiple second MVs of the current coding unit. Each of the first MVs of the one or more co-located blocks may correspond to the multiple second MVs of the current coding unit. The system may also determine, based at least in part on the multiple second MVs of the current coding unit, the MV candidate list.

In some embodiments, the one or more image blocks associated with the current coding unit may include at least one of a first image block located at a center of the current coding unit, one or more second image blocks adjacent to the current coding unit, or one or more third image blocks corresponding to each of the one or more second image blocks. The one or more third image blocks may be located in an extended region in the image along a direction that the second image block is located relative to the current coding unit.

In some embodiments, a position relationship between two adjacent third image blocks may be the same as a position relationship between the second image block and the current coding unit.

In some embodiments, at least one of the one or more third image blocks may be located in a first coding tree unit (CTU) including the current coding unit or located in a second CTU that is different from the first CTU.

In some embodiments, to determine one or more image blocks associated with the current coding unit in the image, the system may search the one or more image blocks from the one or more second image blocks and the one or more third image blocks corresponding to each of the one or more second image blocks according to a searching order, including at least one of a first order and a second order. The first order may be used to search image blocks that have a same or similar distance from the center of the current coding unit.

The second order may be used to search image blocks that have different distances from the center of the current coding unit.

In some embodiments, the one or more co-located images of the image may include at least one of a reference image in one or more reference image lists of the image, one or more images that have been encoded whose picture order counts (POCs) are within a range of a POC of the image, or at least one of multiple co-located images of multiple image blocks that have been performed an inter-frame prediction, a frequency of the at least one of the multiple co-located images used for the inter-frame prediction of the multiple image blocks satisfying a condition.

In some embodiments, to generate, based on each of first motion vectors (MVs) of the one or more co-located blocks, multiple second MVs of the current coding unit, the system may obtain one or more first reference images of the image. The system may obtain a second reference image of each of the one or more co-located image. The system may determine, for each of the first MVs, based on a first distance between the image and each of the one or more first reference images and a second distance between one of the one or more co-located images and the second reference image, one of the multiple second MVs.

In some embodiments, the one or more first reference images may include at least one of reference images in one or more reference image lists of the image or multiple reference images of multiple image blocks that have been performed an inter-frame prediction. A frequency of the at least one of the multiple reference images may be used for the inter-frame prediction of the multiple image blocks satisfying a condition.

According to another aspect of the present disclosure, a method for inter-frame prediction may be provided. The method may include obtaining a current coding unit in an image and determining one or more image blocks associated with the current coding unit in the image. The method may include determining one or more co-located images of the image and determining one or more co-located blocks in each of the one or more co-located images. Each of the one or more co-located blocks may correspond to one of the one or more image blocks. The method may also include generating, based on each of first motion vectors (MVs) of the one or more co-located blocks, multiple second MVs of the current coding unit. Each of the first MVs of the one or more co-located blocks may correspond to the multiple second MVs of the current coding unit. The method may also include determining, based at least in part on the multiple second MVs of the current coding unit, an MV candidate list. The method may further include determining, based on the MV candidate list, a prediction result of the current coding unit.

According to yet another aspect of the present disclosure, a system for inter-frame prediction may be provided. The system may include an acquisition module configured to obtain a current coding unit in a current image. The system may also include an image block determination module configured to determine one or more image blocks associated with the current coding unit in the image. The system may also include an MV determination module configured to determine one or more co-located images of the image and one or more co-located blocks in each of the one or more co-located images. Each of the one or more co-located blocks may correspond to one of the one or more image blocks. The MV determination module may also be configured to generate, based on each of first motion vectors (MVs) of the one or more co-located blocks, multiple second MVs of the current coding unit. Each of the first MVs of the one or more co-located blocks may correspond to the multiple second MVs of the current coding unit. The system may also include an MV candidate list determination module configured to determine, based at least in part on the multiple second MVs of the current coding unit, an MV candidate list. The system may also include a prediction module configured to determine, based on the MV candidate list, a prediction result of the current coding unit.

According to yet another aspect of the present disclosure, a non-transitory computer readable medium may be provided. The non-transitory computer readable medium may include at least one set of instructions for inter-frame prediction. The at least one set of instructions may be executed by one or more processors of a computing device. When executed by one or more processors of a computing device, the at least one set of instructions may cause the computing device to perform a method. The method may include obtaining a current coding unit in an image and determining one or more image blocks associated with the current coding unit in the image. The method may include determining one or more co-located images of the image and determining one or more co-located blocks in each of the one or more co-located images. Each of the one or more co-located blocks may correspond to one of the one or more image blocks. The method may also include generating, based on each of first motion vectors (MVs) of the one or more co-located blocks, multiple second MVs of the current coding unit. Each of the first MVs of the one or more co-located blocks may correspond to the multiple second MVs of the current coding unit. The method may also include determining, based at least in part on the multiple second MVs of the current coding unit, an MV candidate list. The method may further include determining, based on the MV candidate list, a prediction result of the current coding unit.

According to yet another aspect of the present disclosure, a system for inter-frame prediction may be provided. The system may include one or more storage devices and one or more processors configured to communicate with the one or more storage devices. The one or more storage devices may include a set of instructions. When the one or more processors execute the set of instructions, the system may be directed to perform one or more of the following operations. The system may obtain a current coding unit in an image and obtain a first motion vector (MV) candidate list. The first MV candidate list may include a plurality of MVs of a plurality of first image blocks. Each of the plurality of MVs may have been used to encode one of a plurality of first image blocks. The system may also determine, from the plurality of MVs, one or more first MVs of one or more first image blocks according to a first order. The system may also determine, based at least in part on the one or more first MVs and a second order, a second MV candidate list of the current coding unit corresponding to the prediction mode. The system may further determine, based on the second MV candidate list, a prediction unit of the current coding unit.

In some embodiments, the prediction mode may include at least one of an affine advanced motion vector prediction (AMVP) mode or an affine merge mode.

In some embodiments, a reference image of each of at least one of the one or more first image blocks may be different from a reference image of the current coding unit.

In some embodiments, the plurality of MVs may be arranged in the first MV candidate list in sequence. To determine, from the plurality of MVs, one or more first MVs of one or more first image blocks according to a first order, the system may select the one or more first MVs from the first MV candidate list in a positive order or in a reverse order.

In some embodiments, to determine, based at least in part on the one or more first MVs and a second order, a second MV candidate list, the system may add the one or more first MVs into the second MV candidate list according to the second order. The second order may be same as or different from the first order.

In some embodiments, to determine, based at least in part on the one or more first MVs and a second order, a second MV candidate list, the system may add a first MV of an first image block whose reference image is same as a reference image of the current coding unit into the second MV candidate list prior to adding a first MV of an first image block whose reference image is different from a reference image of the current coding unit into the second MV candidate list.

In some embodiments, to determine, based at least in part on the one or more first MVs and a second order, a second MV candidate list, the system may determine a scaled first MV by performing, based on a distance between the image and a reference image of the current coding unit and a distance between the image and a reference image of an first image block, a scale operation on a first MV of the first image block whose reference image is different from the reference image of the current coding unit. The system may add the scaled first MV of the first image block whose reference image is different from the reference image of the current coding unit into the second MV candidate list according to the second order.

In some embodiments, to determine, based at least in part on the one or more first MVs and a second order, a second MV candidate list, the system may obtain one or more second MVs in the second MV candidate list. The one or more second MVs may be associated with one or more second image blocks that are correlated with the current coding unit in a space domain. The system may determine at least a portion of the one or more first MVs each of which is different from each of the one or more second MVs. The system may determine, based on the at least a portion of the one or more first MV, the second MV candidate list.

In some embodiments, the one or more second image blocks may be determined based on a position relationship between the current coding unit and the one or more first image blocks.

In some embodiments, to obtain, based on a prediction mode of the current coding unit, a first motion vector (MV) candidate list, the system may determine, based on the prediction mode, a third MV candidate list including one or more third MVs of one or more third image blocks that have been encoded based on an intra block copy (IBC) sharing mode. The first MV candidate list may include a plurality of MVs of a plurality of first image blocks. The system may adjust locations of the one or more third MVs in the third MV candidate list to obtain the first MV candidate list.

In some embodiments, to adjust locations of one or more third MVs in the third MV candidate list to obtain the first MV candidate list, the system may adjust the locations of one or more third MVs in the third MV candidate list to a top portion of the third MV candidate list to obtain the first MV candidate list. The second order may include a positive order.

In some embodiments, to adjust locations of one or more third MVs in the third MV candidate list to obtain the first MV candidate list, the system may adjust the locations of one or more third MVs in the third MV candidate list to an end portion of the third MV candidate list to obtain the first MV candidate list. The second order may include a reverse order.

According to another aspect of the present disclosure, a method for inter-frame prediction may be provided. The method may include obtaining a current coding unit in an image and obtaining a first motion vector (MV) candidate list. The first MV candidate list may include a plurality of MVs of a plurality of first image blocks. Each of the plurality of MVs may have been used to encode one of a plurality of first image blocks. The method may also include determining, from the plurality of MVs, one or more first MVs of one or more first image blocks according to a first order. The method may also include determining, based at least in part on the one or more first MVs and a second order, a second MV candidate list of the current coding unit corresponding to the prediction mode. The method may further include determining, based on the second MV candidate list, a prediction unit of the current coding unit.

According to yet another aspect of the present disclosure, a system for inter-frame prediction may be provided. The system may include an acquisition module configured to obtain a current coding unit in a current image. The system may also include an HMVP list determination module configured to obtain a first motion vector (MV) candidate list. The first MV candidate list may include a plurality of MVs of a plurality of first image blocks. Each of the plurality of MVs may have been used to encode one of a plurality of first image blocks. The HMVP list determination module may also be configured to determine, from the plurality of MVs, one or more first MVs of one or more first image blocks according to a first order. The system may also include an MV candidate list determination module configured to determine, based at least in part on the one or more first MVs and a second order, a second MV candidate list of the current coding unit corresponding to the prediction mode. The system may also include a prediction module configured to determine, based on the second MV candidate list, a prediction unit of the current coding unit.

According to yet another aspect of the present disclosure, a non-transitory computer readable medium may be provided. The non-transitory computer readable medium may comprise at least one set of instructions for inter-frame prediction. The at least one set of instructions may be executed by one or more processors of a computing device. When executed by one or more processors of a computing device, the at least one set of instructions may cause the computing device to perform a method. The method may include obtaining a current coding unit in an image and obtaining a first motion vector (MV) candidate list. The first MV candidate list may include a plurality of MVs of a plurality of first image blocks. Each of the plurality of MVs may have been used to encode one of a plurality of first image blocks. The method may also include determining, from the plurality of MVs, one or more first MVs of one or more first image blocks according to a first order. The method may also include determining, based at least in part on the one or more first MVs and a second order, a second MV candidate list of the current coding unit corresponding to the prediction mode. The method may further include determining, based on the second MV candidate list, a prediction unit of the current coding unit.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 6 is a flowchart illustrating an exemplary process for determining spatial domain MVs based on feature information of a current coding unit according to some embodiments of the present application;

FIG. 7 is a flowchart illustrating an exemplary process for determining MVs based on feature information of a current coding unit according to some embodiments of the present application;

FIG. 8 is a flowchart illustrating an exemplary process for determining an acquisition order of MVs of image blocks according to some embodiments of the present application;

FIG. 13 is a flowchart illustrating an exemplary process for determining MVs according to some embodiments of the present disclosure;

FIG. 20 is a flowchart illustrating an exemplary process for determining an MV candidate list according to some embodiments of the present application;

FIG. 21 is a flowchart illustrating an exemplary process for determining an MV candidate list according to some embodiments of the present application;

FIG. 22 is a flowchart illustrating an exemplary process for determining an MV candidate list according to some embodiments of the present application;

DETAILED DESCRIPTION

Figure 1:
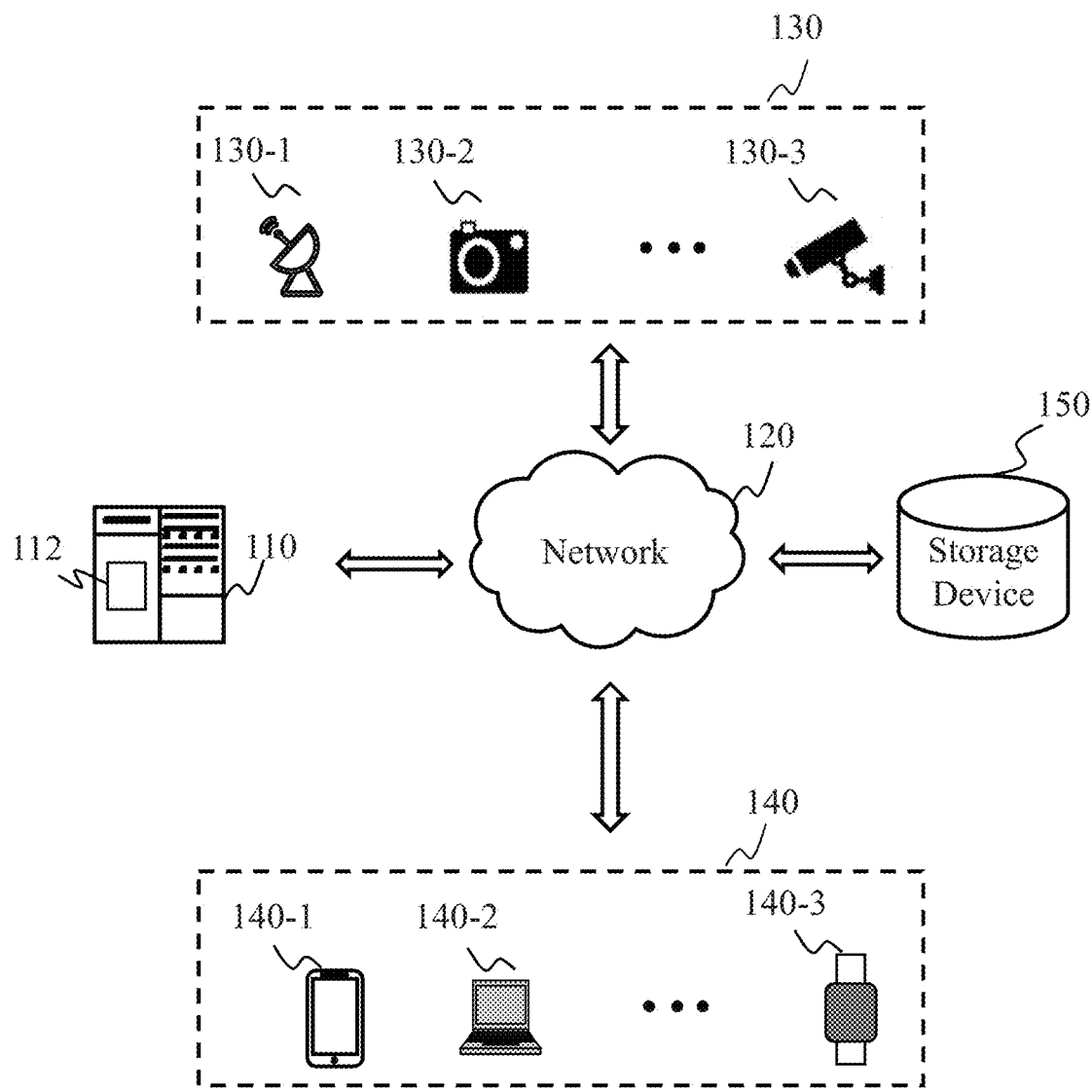
FIG. 1 is a schematic diagram illustrating an exemplary image coding system according to some embodiments of the present disclosure.

In order to illustrate the technical solutions related to the embodiments of the present disclosure, a brief introduction of the drawings referred to the description of the embodiments is provided below. Drawings described below are only some examples or embodiments of the present disclosure. Those having ordinary skills in the art, without further creative efforts, may apply the present disclosure to other similar scenarios according to these drawings. Unless apparent from the locale or otherwise stated, like reference numerals represent similar structures or operation throughout the several views of the drawings.

It will be understood that the term "system," "device," "unit," and/or "module" used herein are one method to distinguish different components, elements, parts, sections or assembly of different levels in ascending order. However, if other words may achieve the same purpose, the words may be replaced by other expressions.

As used in the disclosure and the appended claims, the singular forms "a," "an," and "the" include plural referents unless the content dictates otherwise. In general, the terms "comprise," "comprises," and/or "comprising," "include," "includes," and/or "including," merely prompt to include steps and elements that have been identified, and these steps and elements do not constitute an exclusive listing. The methods or devices may also include other steps or elements.

The flowcharts used in the present disclosure illustrate operations that systems implement according to some embodiments of the present disclosure. It should be noted that the foregoing or the following operations may not be performed in the order accurately. Instead, the steps can be processed in reverse order or simultaneously. Besides, one or more other operations may be added to the flow charts, or one or more operations may be omitted from the flow chart.

FIG. 1 is a schematic diagram illustrating an exemplary image coding system according to some embodiments of the present disclosure. As shown, the image coding system 100 may include a server 110, a network 120, an acquisition device 130, a user device 140, and a storage device 150.

The server 110 may be a single server or a server group. The server group may be centralized or distributed (e.g., the server 110 may be a distributed system). In some embodiments, the server 110 may be local or remote. For example, the server 110 may access information and/or data stored in the acquisition device 130, the user device 140, and/or the storage device 150 via the network 120. As another example, the server 110 may be directly connected to the acquisition device 130, the user device 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 of the present disclosure.

In some embodiments, the server 110 may include a processing device 112. The processing device 112 may process information and/or data relating to image coding to perform one or more functions described in the present disclosure. For example, the processing device 112 may determine an MV candidate list for a current coding unit. As another example, the processing device 112 may determine a prediction result of the current coding unit based on the MV candidate list for the current coding unit. In some embodiments, the processing device 112 may determine one or more spatial domain MVs of the current coding unit. For example, the processing device 112 may determine feature information of the current coding unit, the feature information being associated with at least one of a size feature or a texture feature. The processing device 112 may determine, based on the feature information of the current coding unit, the one or more spatial domain MVs of one or more image blocks associated with the current coding unit. In some embodiments, the processing device 112 may determine one or more time-domain MVs of the current coding unit. For example, the processing device 112 may determine one or more time-domain blocks associated with the current coding unit in the image. The processing device 112 may determine one or more co-located images of the image and determine one or more co-located blocks in each of the one or more co-located images. The processing device 112 may determine, based on each of MVs of the one or more co-located blocks, the one or more time-domain MVs of the current coding unit. In some embodiments, the processing device 112 may determine an HMVP list of the current coding unit. The processing device 112 may determine the MV candidate list based on the spatial domain MVs, the time-domain MVs, and the HMVP list as described elsewhere in the present disclosure.

In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiment, the sever 110 may be unnecessary and all or part of the functions of the server 110 may be implemented by other components (e.g., the acquisition device 130, the user device 140) of the image coding system 100. For example, the processing device 112 may be integrated into the acquisition device 130 or the user device140 and the functions (e.g., performing intra-prediction to an image) of the processing device 112 may be implemented by the acquisition device 130 or the user device140.

The network 120 may facilitate the exchange of information and/or data for the image coding system 100. In some embodiments, one or more components (e.g., the server 110, the acquisition device 130, the user device 140, the storage device 150) of the image coding system 100 may transmit information and/or data to other components of the image coding system 100 via the network 120. For example, the server 110 may obtain an image to be coded from the acquisition device 130 via the network 120. As another example, the server 110 may obtain an intra-prediction mode associated with the image coding from the storage device 150. In some embodiments, the network 120 may be any type of wired or wireless network, or combination thereof. Merely by way of example, the network 120 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof.

The acquisition device 130 may be configured to acquire an image (the "image" herein refers to a single image or a frame of a video). In some embodiments, the acquisition device 130 may include a camera 130-1, a video recorder 130-2, a sensor 130-3, etc. The camera 130-1 may include a gun camera, a dome camera, an integrated camera, a monocular camera, a binocular camera, a multi-view camera, or the like, or any combination thereof. The video recorder 130-2 may include a PC Digital Video Recorder (DVR), an embedded DVR, or the like, or any combination thereof. The sensor 130-1 may include an acceleration sensor (e.g., a piezoelectric sensor), a velocity sensor (e.g., a Hall sensor), a distance sensor (e.g., a radar, an infrared sensor), a steering angle sensor (e.g., a tilt sensor), a traction-related sensor (e.g., a force sensor), or the like, or any combination thereof. The image acquired by the acquisition device 130 may be a two-dimensional image, a three-dimensional image, a four-dimensional image, etc. In some embodiments, the acquisition device 130 may include a plurality of components each of which can acquire an image. For example, the acquisition device 130 may include a plurality of sub-cameras that can capture images or videos simultaneously. In some embodiments, the acquisition device 130 may transmit the acquired image to one or more components (e.g., the server 110, the user device 140, the storage device 150) of the image coding system 100 via the network 120.

The user device 140 may be configured to receive information and/or data from the server 110, the acquisition device 130, and/or the storage device 150 via the network 120. For example, the user device 140 may receive an encoded image determined based on a plurality of predicted coding units corresponding to a plurality of coding units in the image from the server 110. In some embodiments, the user device 140 may process information and/or data received from the server 110, the acquisition device 130, and/or the storage device 150 via the network 120. For example, the user device 140 may decode the encoded image received from the server 110. In some embodiments, the user device 140 may provide a user interface via which a user may view information and/or input data and/or instructions to the image coding system 100. For example, the user may view the encoded image via the user interface. As another example, the user may input an instruction associated with an image coding parameter via the user interface. In some embodiments, the user device 140 may include a mobile phone 140-1, a computer 140-2, a wearable device 140-3, or the like, or any combination thereof. In some embodiments, the user device 140 may include a display that can display information in a human-readable form, such as text, image, audio, video, graph, animation, or the like, or any combination thereof. The display of the user device 140 may include a cathode ray tube (CRT) display, a liquid crystal display (LCD), a light-emitting diode (LED) display, a plasma display panel (PDP), a three dimensional (3D) display, or the like, or a combination thereof. In some embodiments, the user device 140 may be connected to one or more components (e.g., the server 110, the acquisition device 130, the storage device 150) of the image coding system 100 via the network 120.

The storage device 150 may be configured to store data and/or instructions. The data and/or instructions may be obtained from, for example, the server 110, the acquisition device 130, and/or any other component of the image coding system 100. In some embodiments, the storage device 150 may store data and/or instructions that the server 110 may execute or use to perform exemplary methods described in the present disclosure. For example, the storage device 150 may store the prediction mode associated with the image coding. In some embodiments, the storage device 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The storage device 150 may be configured to store data and/or instructions. For example, the storage device 150 may store data and/or instructions that the server 110 may execute or use to perform exemplary methods described in the present disclosure. In some embodiments, the storage device 150 may be connected to the network 120 to communicate with one or more components (e.g., the server 110, the acquisition device 130, the user device 140) of the image coding system 100. One or more components of the image coding system 100 may access the data or instructions stored in the storage device 150 via the network 120. In some embodiments, the storage device 150 may be directly connected to or communicate with one or more components (e.g., the server 110, the acquisition device 130, the user device 140) of the image coding system 100. In some embodiments, the storage device 150 may be part of other components of the image coding system 100, such as the server 110, the acquisition device 130, or the user device 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
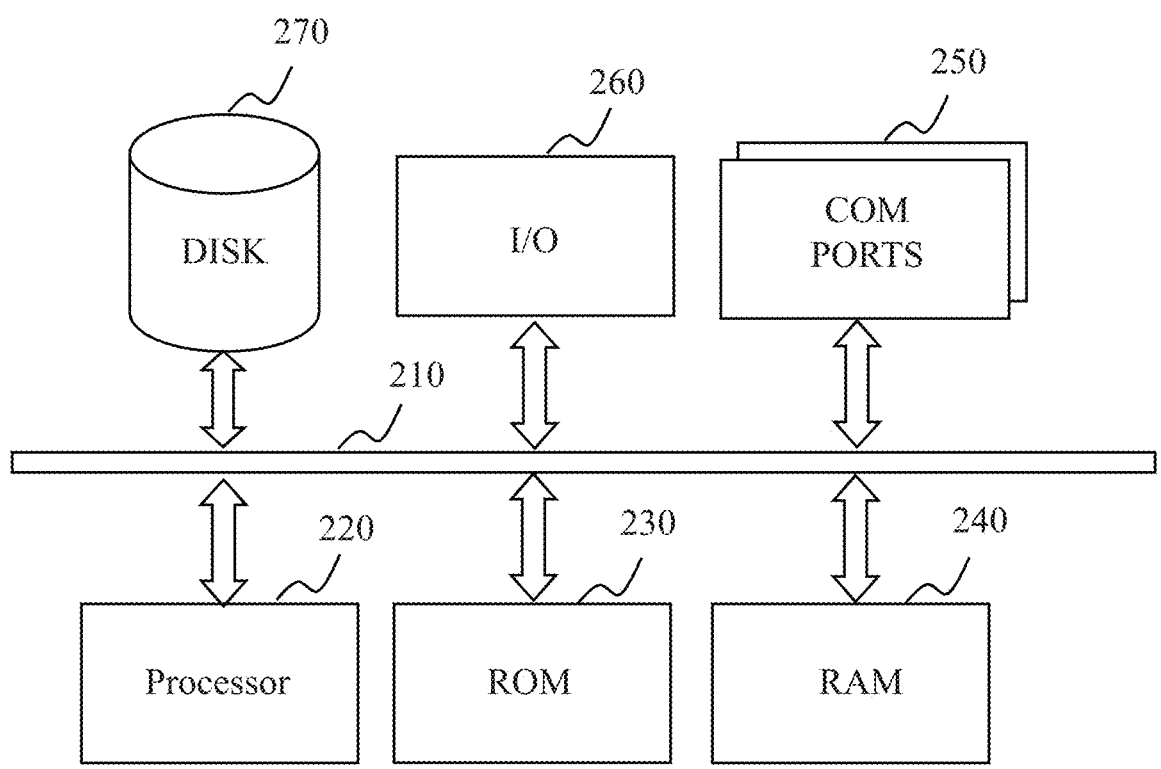
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing device 112 may be implemented on the computing device 200 and configured to perform functions of the processing device 112 disclosed in this disclosure.

The computing device 200 may be used to implement any component of the image coding system 100 as described herein. For example, the processing device 112 may be implemented on the computing device 200, via its hardware, software program, firmware, or a combination thereof. Although only one such computer is shown, for convenience, the computer functions relating to image coding as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an input/output (I/O) component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both operation A and operation B, it should be understood that operation A and operation B may also be performed by two different processors 220 jointly or separately in the computing device 200 (e.g., a first processor executes operation A and a second processor executes operation B, or the first and second processors jointly execute operations A and B).

Figure 3:
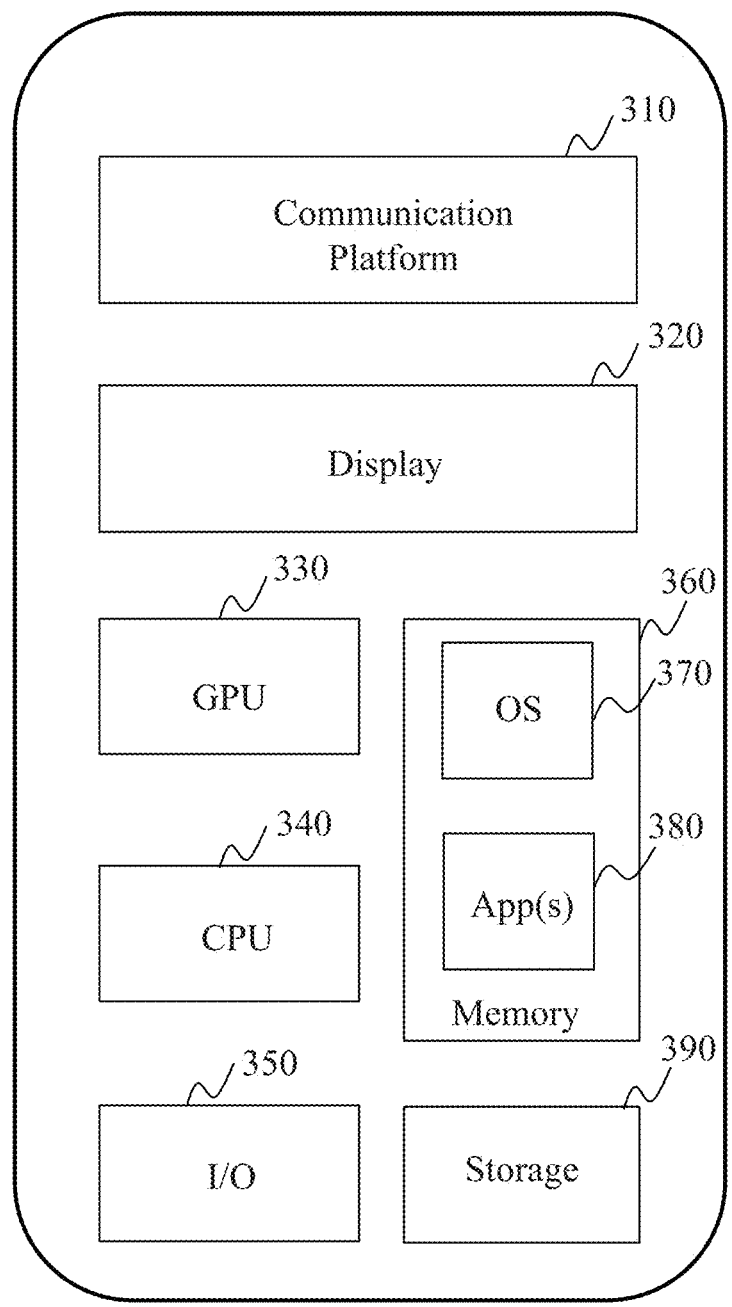
FIG. 3 is a schematic diagram illustrating exemplary hardware and/or software components of an exemplary terminal device according to some embodiments of the present disclosure.

FIG. 3 is a schematic diagram illustrating exemplary hardware and/or software components of an exemplary terminal device according to some embodiments of the present disclosure. In some embodiments, the user device 140 may be implemented on the terminal device 300 shown in FIG. 3.

As illustrated in FIG. 3, the terminal device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the terminal device 300.

In some embodiments, an operating system 370 (e.g., iOS™, Android™, Windows Phone™) and one or more applications (Apps) 380 may be loaded into the memory 360 from the storage 390 in order to be executed by the CPU 340. The applications 380 may include a browser or any other suitable mobile apps for receiving and rendering information relating to image coding or other information from the processing device 112. User interactions may be achieved via the I/O 350 and provided to the processing device 112 and/or other components of the image coding system 100 via the network 120.

Figure 4:
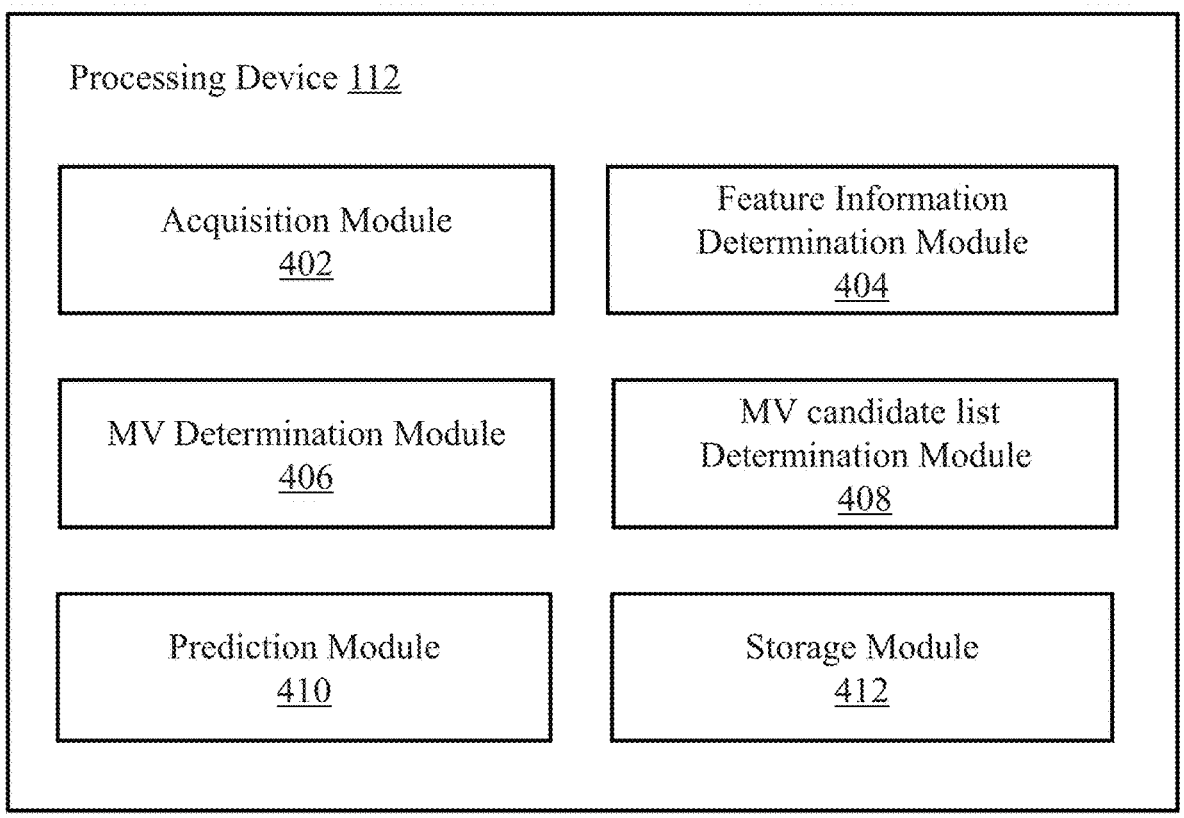
FIG. 4 is a block diagram illustrating an exemplary processing device according to some embodiments of the present disclosure.

FIG. 4 is a block diagram illustrating an exemplary processing device according to some embodiments of the present disclosure. As illustrated in FIG. 4, the processing device 400 may include an acquisition module 402, a feature information determination module 404, an MV determination module 406, an MV candidate list determination module 408, a prediction module 410, and a storage module 412. In some embodiments, the acquisition module 402, the feature information determination module 404, the MV determination module 406, the MV candidate list determination module 408, the prediction module 410, and the storage module 412 may be connected to and/or communicate with each other via a wireless connection (e.g., a network), a wired connection, or a combination thereof.

The acquisition module 402 may be configured to obtain information related to image encoding. For example, the acquisition module 402 may obtain an image. As another example, the acquisition module 402 may obtain a current coding unit in the image. The current coding unit may also be referred to as a current unit, a current block, or a current coding unit that includes a plurality of pixels to be encoded. In some embodiments, the acquisition module 402 may obtain the image from the acquisition device 130, the user device 140, the storage device 150, etc.

The feature information determination module 404 may be configured to determine feature information of the current coding unit. The feature information may be associated with at least one of a size feature or a texture feature.

The size feature of the current coding unit may include information associated with the lengths of two adjacent boundaries of the current coding unit, the area of the current coding unit, the total count of pixels in the current coding unit, or the like, or a combination thereof. The texture feature of the current coding unit may include a texture direction, a texture complexity, a texture similarity, or the like, or a combination thereof. The texture complexity may indicate whether the texture of the current coding unit is flat or irregular. More descriptions for extracting the feature information may be found elsewhere in the present disclosure (e.g., FIG. 5-8 and the descriptions thereof).

The MV determination module 406 may be configured to determine, based on the feature information of the current coding unit, one or MVs of one or more image blocks associated with the current coding unit.

The MV determination module 406 may determine information associated with the one or more image blocks, and/or determining information associated with the one or more MVs of the one or more image blocks. The information associated with the one or more image blocks may include positions of the one or more image blocks, the count of the one or more image blocks, etc. The count of the one or more image blocks may include a count of image blocks that are located along each of two adjacent boundaries of the current coding unit or the total count of the one or more image blocks. The information associated with the one or more MVs of the one or more image blocks may include MV values and/or an acquisition order of the one or more MVs, etc. The acquisition order of the one or more MVs may also be referred to as a searching order of the one or more image blocks that may indicate an arrangement order of the one or more MVs arranged in an MV candidate list of the current coding unit.

In some embodiments, the MV determination module 406 may determine initial MVs of initial image blocks associated with the current coding unit according to an inter-frame prediction mode. Further, the MV determination module 406 may determine the one or more MVs of the one or more image blocks based on the initial MVs of the initial image blocks and the feature information of the current coding unit.

For example, the MV determination module 406 may adjust the count of the initial image blocks distributed along each of the two boundaries of the current coding unit based on the feature information of the current coding unit to determine the one or more image blocks. The MV determination module 406 may increase the count of image blocks located along a first boundary of the current coding unit to a first count and decrease the count of image blocks located along a second boundary of the current coding unit to a second count.

As another example, the MV determination module 406 may adjust the initial acquisition order of MVs (e.g., the initial MVs of the initial image blocks determined according to an inter-frame prediction mode or the MVs of the one or more image blocks determined from the initial image blocks) based on the feature information of the current coding unit. The MV determination module 406 may adjust the initial acquisition order of the MVs such that MVs of one or more image blocks that are located along a first boundary of the current coding unit may be acquired in front of MVs of image blocks that are located along a second boundary of the current coding unit to a second count. In other words, the MVs of one or more image blocks that are located along the first boundary of the current coding unit may be arranged in an MV candidate list in front of MVs of image blocks that are located along the second boundary of the current coding unit. The first boundary and the second boundary may be determined the size feature or the texture feature of the current coding unit.

As still another example, the MV determination module 406 may adjust the initial acquisition order of the MVs such that MVs of one or more image blocks that have higher texture similarity degrees with the current coding unit may be acquired in front of MVs of image blocks that have lower texture similarity degree with the current coding unit. In other words, the MVs of one or more image blocks that have a higher texture similarity degree with the current coding unit may be arranged in an MV candidate list in front of MVs of image blocks that have a lower texture similarity degree with the current coding unit. More descriptions for determining the acquisition order of MVs may be found elsewhere in the present disclosure (e.g., FIG. 8 and the descriptions thereof).

The MV candidate list determination module 408 may be configured to determine one or more MV candidate lists.

In some embodiments, the one or more MVs determined by the MV determination module 406 may be added to the MV candidate list according to the acquisition order. The acquisition order of the MVs may be the same as an order (i.e., arrangement order) of the one or more MVs arranged in the MV candidate list. As used herein, the one or more MVs determined by the MV determination module 406 may also be referred to as spatial domain MVs. In some embodiments, the MV candidate list determined may also be referred to as a spatial domain MV candidate list.

In some embodiments, the MV candidate list may include a desired count of MVs. The MV candidate list determination module 408 may obtain at least a portion of the spatial domain MVs, time-domain MVs, HMVPs, average MVs, 0 MVs, etc., to fill the MV candidate list until the desired count of MVs is satisfied.

The prediction module 410 may be configured to determine a prediction result of the current coding unit based on the MV candidate list.

The prediction result of the current coding unit may include a prediction direction of the current coding unit, a reference index of the current coding unit, a motion vector prediction (MVP) of the current coding unit, a motion vector difference (MVD), a residual error associated with the current coding unit, etc.

In some embodiments, the prediction module 410 may determine a target MV (i.e., MVP) from the MV candidate list. The prediction module 410 may determine a motion estimation of the current coding unit. For example, the prediction module 410 may determine a matched image block of the current coding unit from the one or more reference images of the image. The prediction module 410 may determine an actual MV of the current coding unit by determining a difference between coordinates of the current coding unit and coordinates of the matched image block. The prediction module 410 may determine the MVD between the actual MV and the MVP.

The storage module 412 may be configured to store data generated during any process performed by any component in the processing device 112. For example, the storage module may store the MVs, the MV candidate list, algorithms for determining feature information, etc.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the prediction module 410 may be omitted.

Figure 5:
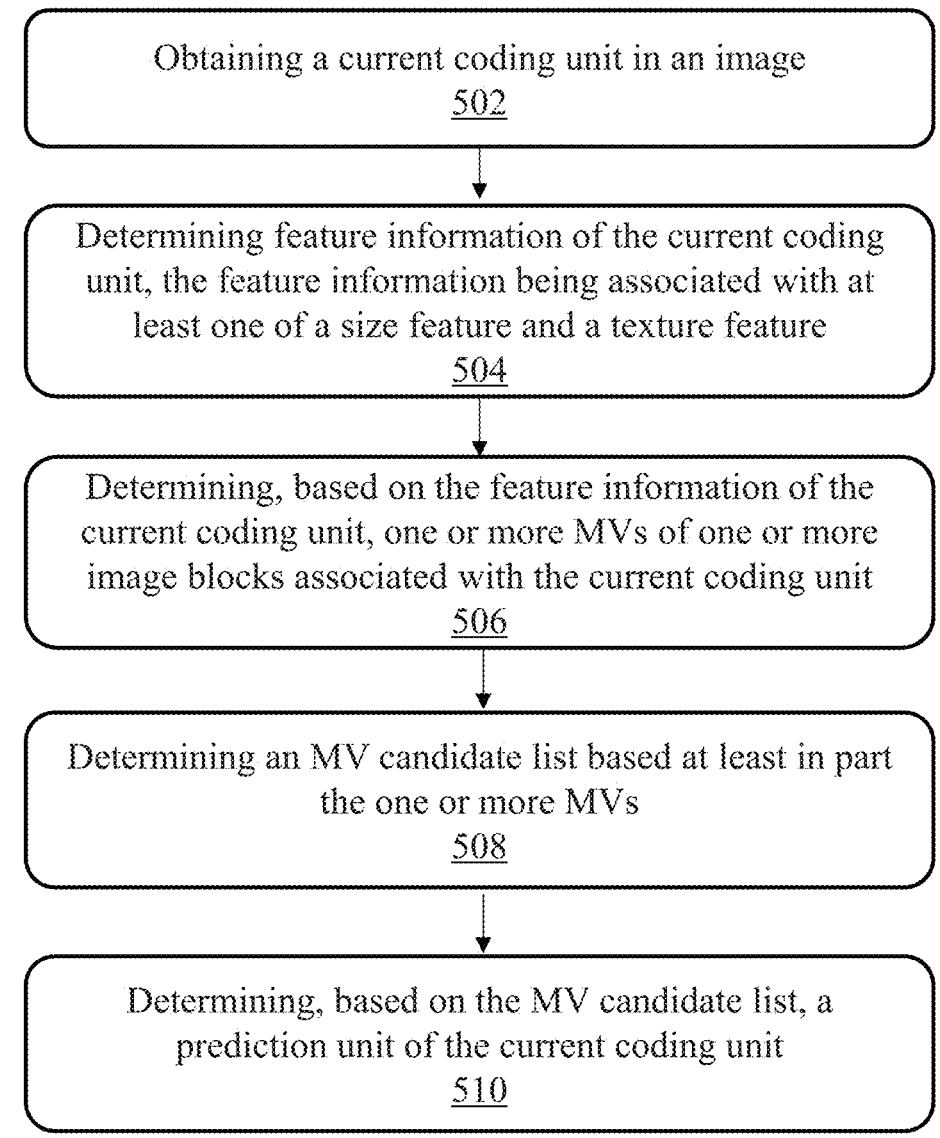
FIG. 5 is a flowchart illustrating an exemplary process for inter-frame prediction according to some embodiments of the present disclosure.

FIG. 5 is a flowchart illustrating an exemplary process for inter-frame prediction according to some embodiments of the present disclosure. In some embodiments, the process 500 may be implemented as a set of instructions (e.g., an application) stored in the storage ROM 230 or RAM 240. The processor 220, and/or the modules and/or the units in FIG. 4 may execute the set of instructions, and when executing the instructions, the processor 220, and/or the modules and/or the units may be configured to perform the process 500. The operations of the illustrated process presented below are intended to be illustrative. In some embodiments, the process 500 may be accomplished with one or more additional operations not described and/or without one or more of the operations herein discussed. Additionally, the order in which the operations of the process as illustrated in FIG. 5 and described below is not intended to be limiting.

In 502, the processing device 112 (e.g., an acquisition module 402) may obtain a current coding unit in an image.

The current coding unit may be an image block that includes a plurality of pixels to be encoded. The current coding unit may also be referred to as a coding unit (CU), a coding block, or a current coding block.

In some embodiments, the image may be a single image or a video frame to be encoded (or compressed). The image may be in a format of YUV (including a luminance component, a Cb chrominance component, and a Cr chrominance component), Red-Green-Blue (RGB) (which may be converted into the YUV format), etc. In some embodiments, the processing device 112 may obtain the image from the acquisition device 130 and extract the coding unit from the image. In some embodiments, the coding unit may be a quadrilateral region (e.g., a square) with a size in the image. As used herein, the size may include 2 pixels*2 pixels, 4 pixels*4 pixels, 8 pixels*8 pixels, 16 pixels*16 pixels, 32 pixels*32 pixels, 64 pixels*64 pixels, 128 pixels*128 pixels, etc. In some embodiments, the image may be a frame in a video collected by the acquisition device 130 (e.g., the camera 130-1, the video recorder 130-2, the sensor 130-3, etc.). The processing device 112 may determine the image (i.e., the frame) from the video. For example, the processing device 112 may perform a framing operation on the video to obtain a plurality of frames in the video. The processing device 112 may obtain one of the plurality of frames as the image.

In 504, the processing device 112 (e.g., the feature information determination module 404) may determine feature information of the current coding unit. The feature information may be associated with at least one of a size feature or a texture feature.

The size feature of the current coding unit may include information associated with the lengths of two adjacent boundaries of the current coding unit, the area of the current coding unit, the total count of pixels in the current coding unit, or the like, or a combination thereof. For example, the size feature may include the relationship between the lengths of two adjacent boundaries of the current coding unit. As a further example, the size feature may include a width and height of the current coding unit. The width of the current coding unit may refer to a length of a boundary of the current coding unit along the horizontal direction. The height of the current coding unit may refer to a length of a boundary of the current coding unit along the vertical direction.

The texture feature of the current coding unit may include a texture direction, a texture complexity, a texture similarity, or the like, or a combination thereof. The texture complexity may indicate whether the texture of the current coding unit is flat or irregular.

The texture direction may refer to a direction in which the change of a pixel parameter (e.g., grayscale) is minimum or less than other directions. For example, if the change of a pixel parameter (e.g., grayscale) along the vertical direction of the current coding unit is less than other directions (e.g., the horizontal direction), the processing device 112 may determine that the texture direction of the current coding unit includes the vertical direction; if the change of a pixel parameter (e.g., grayscale) along the horizontal direction of the current coding unit is less than other directions (e.g., the vertical direction), the processing device 112 may determine that the texture direction of the current coding unit includes the horizontal direction. In some embodiments, the texture direction of the current coding unit may be close to the vertical direction or the horizontal direction. As used herein, the texture direction close to the vertical direction or the horizontal direction refers to an angle between the texture direction and the vertical direction or the horizontal direction is less than a threshold (e.g., 10 degrees, 20 degrees, 45 degrees, etc.).

In some embodiments, the processing device 112 may determine or extract the texture direction of the current coding unit using a texture direction detection algorithm. For example, the processing device 112 may determine the texture direction using the Gabor transform algorithm.

In some embodiments, the processing device 112 may determine the texture direction based on one or more intra-frame angular prediction modes. The intra-frame angular prediction mode may be used to predict the current coding unit based on adjacent reference pixels according to a prediction direction. The effect of each angular prediction mode may be strongly related to the texture direction of the current coding unit. Therefore, the processing device 112 may determine the texture direction of the current coding unit using angular prediction modes and RDcosts corresponding to the angular prediction modes. The prediction direction of an angular prediction mode with a lower RDcost may be closer to the texture direction of the current coding unit, and the prediction direction of an angular prediction mode with a higher RDcost may be far away from the texture direction of the current coding unit.

In some embodiments, the processing device 112 may perform inter-frame prediction on the current coding unit using at least one first angular prediction in a first direction to obtain at least one first prediction unit and using at least one second angular prediction in a second direction to obtain at least one first prediction unit. The processing device 112 may determine the rate-distortion cost (RDcost) corresponding to each angle mode based on the at least one first prediction unit and the at least one second prediction unit. The processing device 112 may designate one of the at least one first direction and at least one second direction as the texture direction whose rate-distortion cost (RDcost) is minimum among the RDcosts corresponding to the at least one first angular prediction mode and the at least one second angular prediction mode in the second direction. More descriptions for determining the texture direction may be found elsewhere in the present disclosure (e.g., FIG. 6 and the descriptions thereof).

The texture similarity may include a similarity degree (also referred to as texture similarity degree) between texture descriptions of the current coding unit and each of one or more image blocks associated with the current coding unit. The texture descriptions may include descriptions of one or more texture parameters that include coarseness, contrast, directionality, linearity, regularity, roughness, or the like, or a combination thereof. In some embodiments, the processing device 112 may determine the texture descriptions of the current coding unit and/or each of the one or more image blocks associated with the current coding unit using one or more texture description algorithms. Exemplary texture description algorithms may include a gray level co-occurrence matrix algorithm, a Gabor transform algorithm, a Markov random field (MRF) algorithm, etc. The texture similarity degree between the current coding unit and an image block may be described based on a similarity distance between texture descriptions of the current coding unit and the image blocks, a gradient difference between the current coding unit and the image blocks, etc. The similarity distance may include the Euclidean distance, the Minkowski distance, the Manhattan distance, etc. More descriptions for determining the texture similarity degree may be found elsewhere in the present disclosure (e.g., FIG. 8 and the descriptions thereof).

In 506, the processing device 112 (e.g., the MV determination module 406) may determine, based on the feature information of the current coding unit, one or MVs of one or more image blocks associated with the current coding unit.

As used herein, the determination of the one or more MVs of the one or more image blocks may include determining information associated with the one or more image blocks, and/or determining information associated with the one or more MVs of the one or more image blocks. The information associated with the one or more image blocks may include positions of the one or more image blocks, the count of the one or more image blocks, etc. The count of the one or more image blocks may include a count of image blocks that are located along each of two adjacent boundaries of the current coding unit or the total count of the one or more image blocks. The information associated with the one or more MVs of the one or more image blocks may include MV values and/or an acquisition order of the one or more MVs, etc. The acquisition order of the one or more MVs may also be referred to as a searching order of the one or more image blocks that may indicate an arrangement order of the one or more MVs arranged in an MV candidate list of the current coding unit.

Figure 9A:
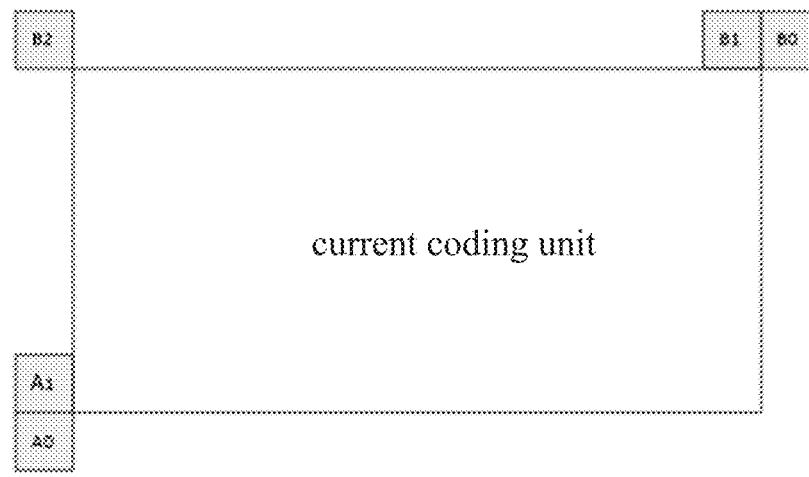
FIGS. 9A-9D are schematic diagrams illustrating exemplary spatial domain blocks of the current coding unit according to some embodiments of the present disclosure.

As used herein, an image block associated with the current coding unit may refer to an image block (also referred to as spatial domain block) that is correlated with the current coding unit in a space domain. An image block associated with the current coding unit in the space domain may include pixels that have been encoded based on an MV of the image block. The MVs of the image blocks may be stored in a storage device (e.g., the storage device 150). The one or more spatial domain blocks may include one or more adjacent image blocks and/or one or more non-adjacent image blocks of the current coding unit that are distributed along two adjacent boundaries of the current coding unit. For example, FIG. 9A is a schematic diagram illustrating exemplary spatial domain blocks of the current coding unit according to some embodiments of the present disclosure. As shown in FIG. 9A, the one or more spatial domain blocks of the current coding unit include spatial domain blocks A1, B1, B0, A0, and B2.

In some embodiments, the processing device 112 (e.g., the image block determination module 406) may determine initial MVs of initial image blocks associated with the current coding unit according to an inter-frame prediction mode. Further, the processing device 112 may determine the one or more MVs of the one or more image blocks based on the initial MVs of the initial image blocks and the feature information of the current coding unit.

The determination of the initial MVs of the initial image blocks may include a determination of the initial image blocks and/or a determination of the acquisition order of the initial MVs. Exemplary inter-frame prediction modes may include a merge mode, an AMVP (advanced motion vector prediction) mode, etc. For example, using the merge mode, as shown in FIG. 9A, the processing device 112 may determine the initial image blocks including A1, B1, B0, A0, and B2. The processing device 112 may obtain the initial MVs of the initial image blocks including A1, B1, B0, and A0. When at least one of spatial domain blocks A1, B1, B0, and A0 do not exist and the MV of spatial domain block B2 is different from that of spatial domain blocks A1 and B1, the MV of the spatial domain block B2 may be used. Different prediction modes may correspond to different spatial domain blocks, different counts of initial MVs, and/or different acquisition orders of the initial MVs of the spatial domain blocks. For example, using the merge mode, the counts of initial MVs may be equal to 4. Using the AMVP mode, the counts of initial MVs may be equal to 2.

In some embodiments, the processing device 112 may adjust the count of the initial image blocks distributed along each of the two boundaries of the current coding unit based on the feature information of the current coding unit to determine the one or more image blocks. For example, the processing device 112 may increase the count of image blocks located along a first boundary of the current coding unit to a first count and decrease the count of image blocks located along a second boundary of the current coding unit to a second count. The first boundary and the second boundary may be determined the size feature or the texture feature of the current coding unit. The processing device 112 may obtain the MVs of one or more image blocks of the first count that are located along the first boundary and one or more image blocks of the second count from the initial image blocks that are located along the second boundary. More descriptions for the determining image blocks corresponding to different boundaries may be found elsewhere in the present disclosure (e.g., FIG. 7 and the descriptions thereof).

In some embodiments, the processing device 112 may adjust the initial acquisition order of MVs (e.g., the initial MVs of the initial image blocks determined according to an inter-frame prediction mode or the MVs of the one or more image blocks determined from the initial image blocks) based on the feature information of the current coding unit. For example, the processing device 112 may adjust the initial acquisition order of the MVs such that MVs of one or more image blocks that are located along a first boundary of the current coding unit may be acquired in front of MVs of image blocks that are located along a second boundary of the current coding unit to a second count. In other words, the MVs of one or more image blocks that are located along the first boundary of the current coding unit may be arranged in an MV candidate list in front of MVs of image blocks that are located along the second boundary of the current coding unit. The first boundary and the second boundary may be determined the size feature or the texture feature of the current coding unit. As another example, the processing device 112 may adjust the initial acquisition order of the MVs such that MVs of one or more image blocks that have higher texture similarity degrees with the current coding unit may be acquired in front of MVs of image blocks that have lower texture similarity degree with the current coding unit. In other words, the MVs of one or more image blocks that have a higher texture similarity degree with the current coding unit may be arranged in an MV candidate list in front of MVs of image blocks that have a lower texture similarity degree with the current coding unit. More descriptions for determining the acquisition order of MVs may be found elsewhere in the present disclosure (e.g., FIG. 8 and FIG. 9 and the descriptions thereof).

In some embodiments, the processing device 112 may determine a first count of image blocks that are located along a first boundary of the current coding unit and determine a second count of image blocks that are located along a second boundary of the current coding unit to a second count. The first boundary and the second boundary may be determined the size feature of the current coding unit. The processing device 112 may further determine the acquisition order of MVs of the image blocks of the first count and MVs of the image blocks of the second count based on the size feature.

In some embodiments, the processing device 112 may determine a first count of image blocks that are located along a first boundary of the current coding unit and determine a second count of image blocks that are located along a second boundary of the current coding unit. The first boundary and the second boundary may be determined based on the texture feature of the current coding unit. The processing device 112 may further determine the acquisition order of MVs of the image blocks of the first count and MVs of the image blocks of the second count based on the texture feature.

In some embodiments, the processing device 112 may determine a first count of image blocks that are located along a first boundary of the current coding unit and determine a second count of image blocks that are located along a second boundary of the current coding unit to a second count. The first boundary and the second boundary may be determined the size feature of the current coding unit. The processing device 112 may further determine the acquisition order of MVs of the image blocks of the first count and MVs of the image blocks of the second count based on the texture feature.

In some embodiments, the processing device 112 may determine a first count of image blocks that are located along a first boundary of the current coding unit and determine a second count of image blocks that are located along a second boundary of the current coding unit to a second count. The first boundary and the second boundary may be determined based on the texture feature of the current coding unit. The processing device 112 may further determine the acquisition order of MVs of the image blocks of the first count and MVs of the image blocks of the second count that are located along the second boundary of the current coding unit based on the size feature.

In 508, the processing device 112 (e.g., the MV candidate list determination module 408) may determine an MV candidate list based on the one or more MVs.

In some embodiments, the one or more MVs determined in operation 506 may be added to the MV candidate list according to the acquisition order. The acquisition order of the MVs may be the same as an order (i.e., arrangement order) of the one or more MVs arranged in the MV candidate list. As used herein, the one or more MVs determined in operation 506 may also be referred to as spatial domain MVs. In some embodiments, the MV candidate list determined in operation 508 may also be referred to as a spatial domain MV candidate list.

In some embodiments, the MV candidate list may include a desired count of MVs. The processing device 112 may obtain at least a portion of the spatial domain MVs, time-domain MVs, HMVPs, average MVs, 0 MVs, etc., to fill the MV candidate list until the desired count of MVs is satisfied. For example, if the count of the spatial domain MVs that have been added in the MV candidate list does not satisfy the desired count of MVs in the MV candidate list, the processing device 112 may obtain one or more MVs (also referred to as time-domain MVs) of image blocks that are correlated to the current coding unit in a time domain. The processing device 112 may add the time-domain MVs into the MV candidate list. More descriptions for determining the time-domain MVs may be found in FIGS. 11-18 and the description thereof). If the count of the spatial domain MVs and the time-domain MVs that have been added in the MV candidate list does not satisfy the desired count of MVs in the MV candidate list, processing device 112 may obtain one or more MVs (also referred to as HMVPs) of image blocks in a historical motion vector prediction (HMVP) list. The processing device 112 may determine the MV candidate list based on the spatial domain MVs, the time-domain MVs, and the historical MVs. More descriptions for determining the HMVPs may be found in FIGS. 19-27 and the description thereof).

In some embodiments, for different inter-frame prediction modes, the MV candidate list may be different. The inter-frame prediction mode may include the AMVP mode, the merge mode, etc. In some embodiments, the inter-frame prediction mode may include a conventional mode, an affined mode, an intra block copy (IBC) mode, etc. For example, the inter-frame prediction mode may include the conventional merge mode, the conventional AMVP mode, the affine merge mode, the affine AMVP mode, the IBC merge mode, the IBC AMVP mode, etc.

Using the conventional AMVP mode, the MV candidate list may be filled based on the spatial domain MVs, time-domain MVs, HMVPs, and 0MVs in sequence. Using the conventional merge mode, the MV candidate list may be filled based on the spatial domain MVs, time-domain MVs, HMVPs, average MVs, and 0MVs in sequence. More descriptions for determining the spatial domain MVs, the time-domain MVs, and/or HMVPs and adding the spatial domain MVs, the time-domain MVs, and/or the HMVPs into the MV candidate list may be found elsewhere in the present disclosure (e.g., FIG. 12 and FIG. 20, and the descriptions thereof).

Figure 25A:
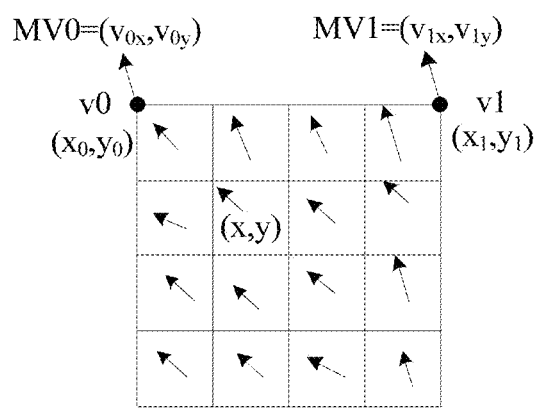
FIGS. 25A-25B show diagrams illustrating the affine mode according to some embodiments of the present disclosure.
Figure 25B:
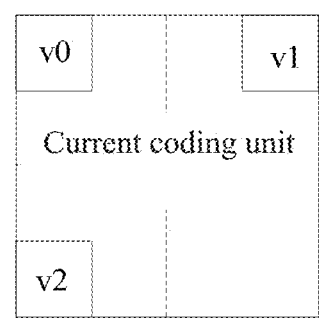
Figure 25C:
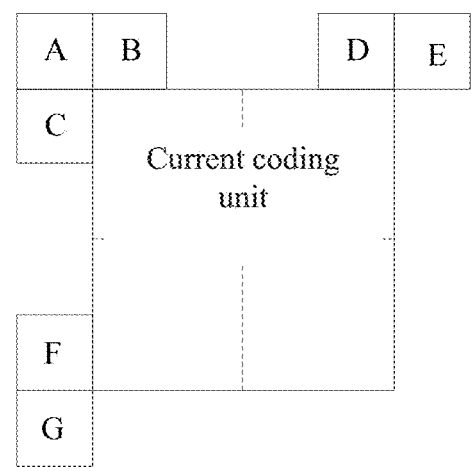
FIG. 25C shows a diagram illustrating spatial domain blocks in the affine AMVP mode according to some embodiments of the present disclosure.

Using the affine AMVP mode, the MV candidate list may also be referred to as a CPMVP candidate list. The desired count of CPMVPs in the CPMVP candidate list may be 2. More descriptions for CPMVPs may be found in FIG. 20 and FIG. 25A-25B. The CPMVP candidate list may be filled based on the spatial domain CPMVs, time-domain CPMVs, HMVPs, and 0MVs in sequence. For example, FIG. 25C shows a diagram illustrating spatial domain blocks in the affine AMVP mode according to some embodiments of the present disclosure. As shown in FIG. 25C, the spatial domain blocks of the current coding unit in the affine AMVP mode may include image blocks A-G. Using the affine merge mode, the MV candidate list may be filled based on MVs of coding sub-units in the current coding unit, spatial domain MVs, time-domain MVs, HMVPs, and 0MVs in sequence. The desired count of MVs in the MV candidate list under the affine merge mode may be 5. More descriptions for MVs of coding sub-units may be found in FIG. 20 and FIG. 25A-25B.

Using the IBC AMVP mode, the desired count of MVs in the MV candidate list under the IBC AMVP mode may be 2. The MV candidate list may be filled based on the spatial domain MVs, HMVPs, and 0MVs in sequence until the desired count of MVs in the MV candidate list is satisfied. Using the IBC merge mode, the desired count of MVs in the MV candidate list under the IBC merge mode may be 6. The MV candidate list may be filled based on the spatial domain MVs, HMVPs, and OMV in sequence until the desired count of MVs in the MV candidate list is satisfied. More descriptions for determining the spatial domain MVs and/or HMVPs and adding the spatial domain MVs and/or HMVPs into the MV candidate list may be found elsewhere in the present disclosure (e.g., FIG. 12 and FIG. 20, and the descriptions thereof).

In some embodiments, operation 506 and operation 508 may be combined into a single operation. For example, the processing device 112 may determine the MV candidate list based on the feature information of the current coding unit.

In 510, the processing device 112 (e.g., the prediction module 410) may determine a prediction result of the current coding unit based on the MV candidate list.

The prediction result of the current coding unit may include a prediction direction of the current coding unit, a reference index of the current coding unit, a motion vector prediction (MVP) of the current coding unit, a motion vector difference (MVD), a residual error associated with the current coding unit, etc.

In some embodiments, the processing device 112 may determine a target MV (i.e., MVP) from the MV candidate list. The processing device 112 may determine a motion estimation of the current coding unit. For example, the processing device 112 may determine a matched image block of the current coding unit from the one or more reference images of the image. The processing device 112 may determine an actual MV of the current coding unit by determining a difference between coordinates of the current coding unit and coordinates of the matched image block. The processing device 112 may determine the MVD between the actual MV and the MVP.

According to some embodiments of the present disclosure, one or more spatial domain blocks that have a higher correlation with the current coding unit may be determined based on the feature information of the current coding unit, which may improve the accuracy of MVs of the spatial domain blocks. The system may add an MV of an image block that has a higher correlation with the current coding unit in an MV candidate list in front of an MV of an image block that has a lower correlation with the current coding unit in the MV candidate list, which may improve the accuracy for inter-frame prediction based on the MV candidate list.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, operation 510 may be omitted from process 500. As another example, operation 506 and operation 508 may be combined into a single operation.

FIG. 6 is a flowchart illustrating an exemplary process for determining spatial domain MVs based on feature information of a current coding unit according to some embodiments of the present application. In some embodiments, the process 600 may be implemented as a set of instructions (e.g., an application) stored in the storage ROM 230 or RAM 240. The processor 220, and/or the modules and/or the units in FIG. 4 may execute the set of instructions, and when executing the instructions, the processor 220, and/or the modules and/or the units may be configured to perform the process 600. The operations of the illustrated process presented below are intended to be illustrative. In some embodiments, the process 600 may be accomplished with one or more additional operations not described and/or without one or more of the operations herein discussed. Additionally, the order in which the operations of the process as illustrated in FIG. 6 and described below is not intended to be limiting. Operation 506 may be performed according to process 600 as illustrated in FIG. 6.

In 602, the processing device 112 (e.g., the MV determination module 406) may determine, based on feature information of a current coding unit, a first boundary from two adjacent boundaries of the current coding unit. The first boundary may satisfy a condition.

In some embodiments, the feature information of the current coding unit in the image may include at least one of a size feature or a texture feature. More descriptions for the feature information of the current coding unit in the image may be found elsewhere in the present disclosure (e.g., FIG. 5 and the descriptions thereof).

In some embodiments, the two adjacent boundaries may include the first boundary and a second boundary. The first boundary satisfying the condition may indicate that one or more image blocks that are located along the first boundary may have a higher correlation with the current coding image in the space domain. The processing device 112 may adjust the count of image blocks that are located along at least one of the two adjacent boundaries. For example, the processing device 112 may increase the count of image blocks that are located along a boundary and have a higher correlation with the current coding unit and decrease the count of image blocks that are located along another boundary and have a lower correlation with the current coding unit.

In some embodiments, the processing device 112 may determine the first boundary based on the size feature of the current coding unit. The size feature may include length information of the two adjacent boundaries. The processing device 112 may designate one of the two adjacent boundaries whose length is larger as the first boundary. The processing device 112 may designate one of the two adjacent boundaries whose length is smaller as the second boundary. The condition being satisfied may include that the first boundary of the two adjacent boundaries includes a larger length. For example, the size feature of the current coding unit may include the width and height of the current coding unit. When the length of the width exceeds the length of the height, the processing device 112 may determine a boundary corresponding to the width of the current coding unit as the first boundary of the current coding unit. The processing device 112 may determine a boundary corresponding to the height of the current coding unit as the second boundary of the current coding unit. As another example, when the length of the height exceeds the length of the width, the processing device 112 may determine a boundary corresponding to the height of the current coding unit as the first boundary of the current coding unit. The processing device 112 may determine a boundary corresponding to the width of the current coding unit as the second boundary of the current coding unit.

In some embodiments, the processing device 112 may determine the first boundary based on the texture feature of the current coding unit. The texture feature may include a texture direction of the current coding unit. The processing device 112 may designate one of the two adjacent boundaries corresponding to the texture direction as the first boundary. As used herein, a boundary corresponding to the texture direction refers to that the texture direction points to the boundary. The condition being satisfied may include that the texture direction points to the first boundary. In some embodiments, the texture direction may be approximately perpendicular to the first boundary. For example, if the texture direction is the horizontal direction, a boundary of the current coding unit along the vertical direction may be designated as the first boundary; if the texture direction is the vertical direction, a boundary of the current coding unit along the horizontal direction may be designated as the first boundary.

In some embodiments, the processing device 112 may determine the texture direction by performing inter-frame prediction on the current coding unit using multiple intra-frame angular prediction modes with different prediction directions. The processing device 112 may determine the rate-distortion cost (RDcost) corresponding to each of the multiple angular prediction modes. The processing device 112 may determine the texture direction based on the prediction directions of the multiple angular prediction modes and rate-distortion costs (RDcosts) corresponding to the multiple angular prediction modes. For example, the processing device 112 may designate a prediction direction of an angular prediction mode whose rate-distortion cost (RDcost) is minimum among the RDcosts as the texture direction.

Figure 10:
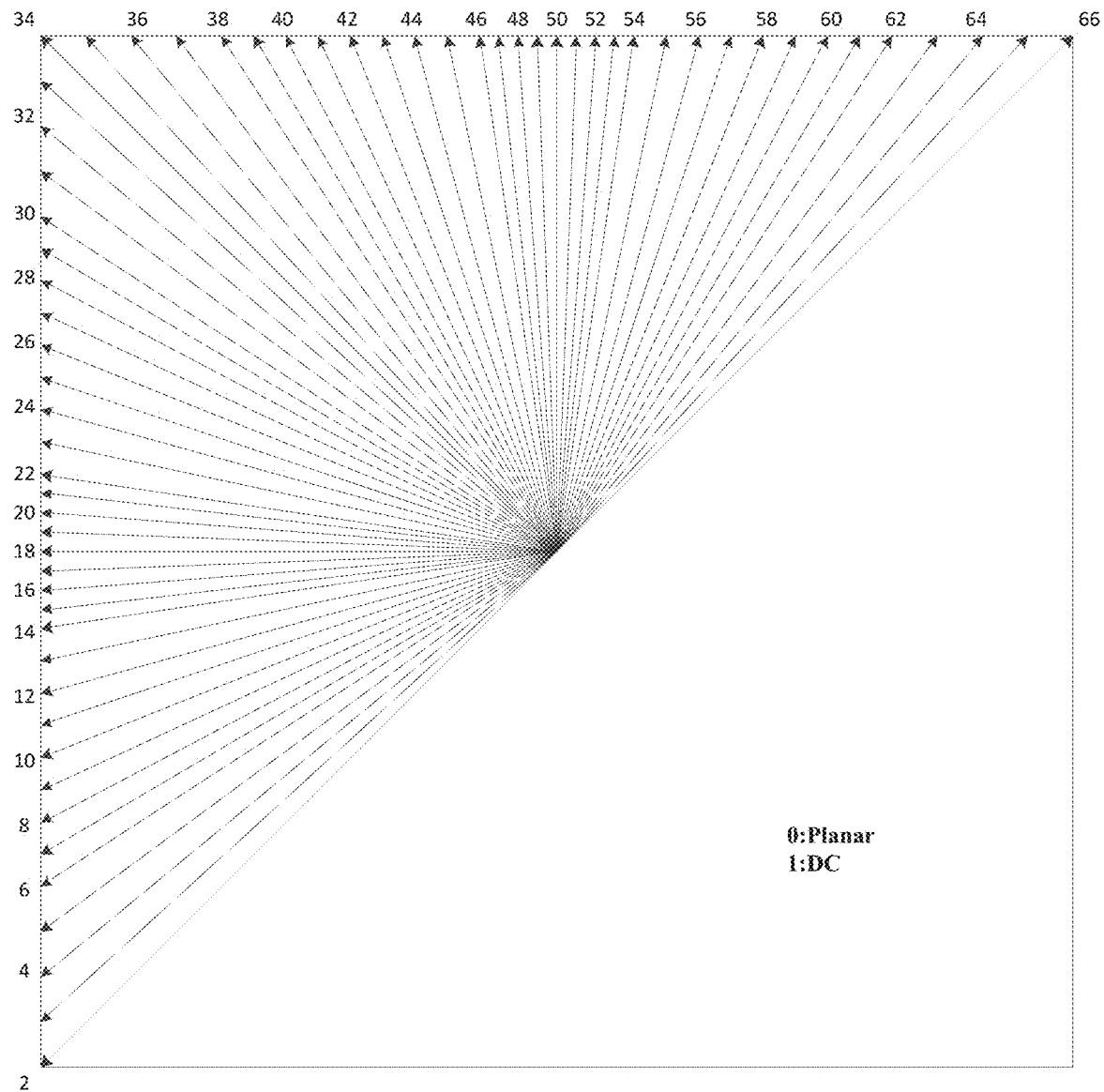
FIG. 10 is a schematic diagram illustrating exemplary prediction directions of angular prediction modes according to some embodiments of the present disclosure.

For example, FIG. 10 is a schematic diagram illustrating exemplary prediction directions of angular prediction modes according to some embodiments of the present disclosure. As shown in FIG. 10, the plurality of intra-predication modes may include 67 exemplary intra-prediction modes that include the planar mode, the DC mode, and 65 angular prediction modes each of which corresponds to a prediction direction where an arrow points. The index of the planar mode may be 0. The index of the DC mode may be 1. The indexes of the 65 angular modes may be 2-66, respectively. Especially, the angular prediction mode with index 18 may also be referred to as a horizontal mode with a prediction direction of the horizontal direction, and the angular prediction mode with index 50 may also be referred to as a vertical mode with a prediction direction of the vertical direction. The processing device 112 may determine the multiple angle prediction modes from the angular prediction modes as shown in FIG. 10. In some embodiments, the multiple angle prediction modes may include the horizontal mode with index 18 and the vertical mode with index 50. In some embodiments, the prediction directions of angular prediction modes with indexes 18-34 as shown in FIG. 10 may be close to or the same as the horizontal direction that points to the left boundary of the current coding unit. The prediction directions of angular prediction modes with indexes 35-66 as shown in FIG. 10 may be close to or the same as the vertical direction that points to the upper boundary of the current coding unit.

In 604, the processing device 112 (e.g., the MV determination module 406) may determine a first count of one or more image blocks corresponding to the first boundary.

In 606, the processing device 112 (e.g., the MV determination module 406) may determine a second count of one or more image blocks corresponding to a second boundary of the two adjacent boundaries.

In some embodiments, the processing device 112 may determine the first count and the second count based on a ratio of the length of the first boundary to the length of the second boundary. For example, using the merge mode, the maximum count of spatial domain blocks may be 5. The processing device 112 may determine the first count of image blocks that are located along the first boundary of the current coding unit and the second count of image blocks that are located along the second boundary of the current coding unit based on the maximum count of the image blocks and the ratio of the length of the first boundary to the length of the second boundary. In some embodiments, as the length of the first boundary exceeds the length of the second boundary, the first count may exceed the second count.

In some embodiments, the processing device 112 may increase the count of image blocks that are located along the first boundary to the first count, and reduce the count of image blocks that are located along the second boundary of the two adjacent boundaries to the second count. The increased count and the reduced count may be greater than or equal to 0. For example, if a reference count (i.e., initial count corresponding to an inter-frame prediction mode) of image blocks that are located along the first boundary is G, and the increased count is M, the processing device 112 may increase the count of image blocks that are located along the first boundary to the first count G+M; if a reference count of image blocks that are located along the second boundary is H, and the reduced count is N, the processing device 112 may reduce the count of image blocks that are located along the second boundary to the second count H−N. The increased count M and the reduced count N may be greater than or equal to 0. M and N may be the same or different.

Figure 9B:
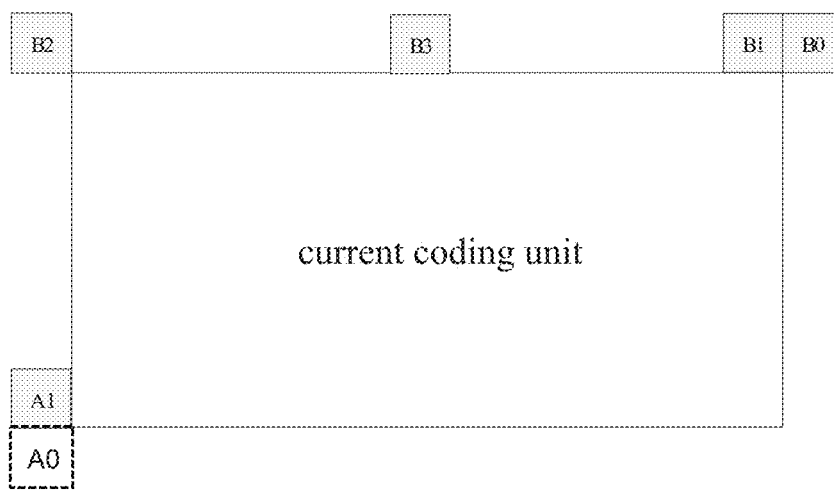

In some embodiments, when the lengths of two adjacent boundaries of the current coding unit are different, the image blocks near the longer boundary may have a higher correlation with the current coding unit than the image blocks near the shorter boundary. Therefore, the processing device 112 may reduce the MVs of image blocks located along the shorter boundary and increase the MVs of image blocks located along the longer boundary, which may increase the correlation of the MVs of the image blocks with the current coding unit and improve the accuracy of the determined MV candidate list, thereby improving the accuracy for inter-prediction. For example, as shown in FIG. 9A, the length of the width exceeds the length of the height and the first boundary of the current coding unit includes the boundary (i.e., the left boundary) corresponding to the width of the current coding unit. According to the merge mode, the processing device 112 may determine initial spatial domain blocks (A0, A1, B2, B1, B0) associated with the current coding unit that are located along the left boundary and the upper boundary of the current coding unit. As the length of the left boundary exceeds the length of the upper boundary, the processing device 112 may increase the count of image blocks that are located along the upper boundary, and reduce the count of image blocks that are located along the left boundary. For example, as shown in FIG. 9B, the processing device 112 may increase the count of image blocks that are located along the upper boundary from 3 (B0, B1, B2) to 4 (B0, B1, B2, B3) and reduce the count of image blocks that are located along the left boundary from 2 (A0, A1) to 1 (A1).

Figure 9C:
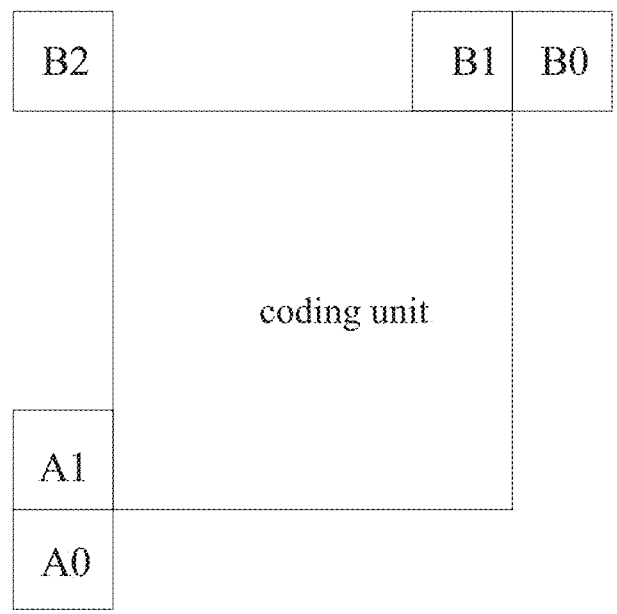
Figure 9D:
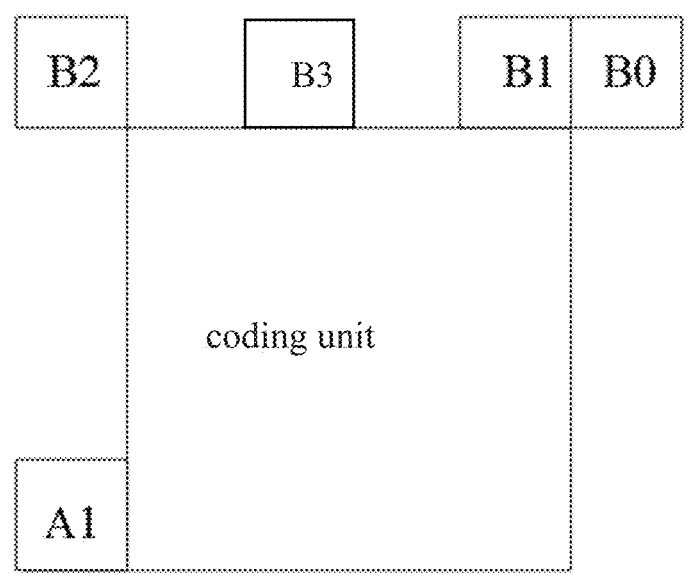

In some embodiments, the image blocks located along a boundary where the texture direction points to may have a higher correlation with the current coding unit than the image blocks located along a boundary where the texture direction deviates from. Therefore, the processing device 112 may reduce the MVs of image blocks located along a boundary that the texture direction deviates from and increase the MVs of image blocks located along a boundary that the texture direction points to. For example, as shown in FIG. 9C, the length of the width is the same as the length of the height. According to the IBC merge mode, the processing device 112 may determine the initial spatial domain blocks (A0, A1, B2, B1, B0) associated with the current coding unit that are located along the left boundary and the upper boundary of the current coding unit. The processing device 112 may determine RDcosts of an angular prediction mode with index 18 and an angular prediction mode with index 50. If the RDcost of the angular prediction mode with index 50 is minimum, the processing device 112 may determine that the texture direction is the vertical direction that points to the upper boundary of the current coding unit. The processing device 112 may increase the count of image blocks that are located along the upper boundary, and reduce the count of image blocks that are located along the left boundary. For example, as shown in FIG. 9D, the processing device 112 may increase the count of image blocks that are located along the upper boundary from 3 (B0, B1, B2) to 4 (B0, B1, B2, B3) and reduce the count of image blocks that are located along the left boundary from 2 (A0, A1) to 1 (A1).

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, operations 602 may be omitted from process 600. As another example, operation 604 and operation 606 may be combined into a single operation.

FIG. 7 is a flowchart illustrating an exemplary process for determining MVs based on feature information of a current coding unit according to some embodiments of the present application. In some embodiments, the process 700 may be implemented as a set of instructions (e.g., an application) stored in the storage ROM 230 or RAM 240. The processor 220, and/or the modules and/or the units in FIG. 4 may execute the set of instructions, and when executing the instructions, the processor 220, and/or the modules and/or the units may be configured to perform the process 700. The operations of the illustrated process presented below are intended to be illustrative. In some embodiments, the process 700 may be accomplished with one or more additional operations not described and/or without one or more of the operations herein discussed. Additionally, the order in which the operations of the process as illustrated in FIG. 7 and described below is not intended to be limiting. Operation 506 may be performed according to process 700 as illustrated in FIG. 7.

In 702, the processing device 112 (e.g., the MV determination module 406) may determine, based on feature information of a current coding unit, a first boundary and a second boundary from two adjacent boundaries of the current coding unit. The first boundary may satisfy a condition.

In some embodiments, the feature information of the current coding unit in the image may include at least one of a size feature or a texture feature. More descriptions for the feature information of the current coding unit in the image may be found elsewhere in the present disclosure (e.g., FIG. 5 and the descriptions thereof).

The first boundary satisfying the condition may indicate that the first boundary may include one or more image blocks with a higher correlation with the current coding image. In some embodiments, the processing device 112 may determine the first boundary based on the size feature of the current coding unit. The size feature may include length information of the two adjacent boundaries. The processing device 112 may designate one of the two adjacent boundaries whose length is larger as the first boundary and another one as the second boundary.

In some embodiments, the processing device 112 may determine the first boundary based on the texture feature of the current coding unit. The texture feature may include a texture direction of the current coding unit. The processing device 112 may designate one of the two adjacent boundaries that the texture direction points to as the first boundary and another one as the second boundary. More descriptions for determining the first boundary and/or the second boundary may be found elsewhere in the present disclosure (e.g., operation 602 as described in FIG. 6)

In 704, the processing device 112 (e.g., the MV determination module 406) may determine an acquisition order of MVs of one or more image blocks. The acquisition order may indicate an order in which the MVs are arranged in an MV candidate list. The acquisition order may be that an MV of an image block located along the first boundary is arranged in the MV candidate list in front of an MV of an image block located along the second boundary.

In some embodiments, the one or more image blocks may initial image blocks that are determined according to an inter-frame prediction mode. In some embodiments, the one or more image blocks may be determined as described in FIG. 6.

In some embodiments, the processing device 112 may determine a first acquisition order of first MVs of one or more image blocks that are located along the first boundary. The processing device 112 may determine a second acquisition order of first MVs of one or more image blocks that are located along the first boundary. The first acquisition order may be before the second acquisition order. In other words, the first MVs may be arranged in the MV candidate list in front of the second MVs arranged in the MV candidate list.

In some embodiments, the processing device 112 may determine a reference acquisition order (i.e., initial acquisition order) of the MVs according to a default setting of the image coding system 100. The processing device 112 may adjust the reference acquisition order to determine the acquisition order of the MVs. For example, if the lengths of two adjacent boundaries of the current coding unit are different, the image blocks located along the longer boundary may have a higher correlation with the current coding unit than the image blocks located along the shorter boundary. The processing device 112 may adjust the acquisition order of MVs of image blocks located along the longer boundary and the acquisition order of MVs of image blocks located along the shorter boundary, such that the MVs of image blocks located along the longer boundary may be acquired before the MVs of image blocks located along the shorter boundary.

For example, as shown in FIG. 9A, the length of the width of the coding unit exceeds the length of the height and the first boundary of the current coding unit includes the boundary (i.e., the left boundary) corresponding to the width of the current coding unit. According to the AMVP mode, the reference acquisition order of MVs of image blocks (A0, A1, B2, B1, B0) as A0→A1(→scaled A0→scaled A1)>B0→B1→B2(→scaled B0→scaled B1→scaled B2). As the length of the left boundary exceeds the length of the upper boundary, the processing device 112 may adjust the reference acquisition order of MVs of image blocks located along the upper boundary and the left boundary, such that the MVs of image blocks located along the upper boundary may be acquired before the MVs of image blocks located along the left boundary. For example, the processing device 112 may adjust the reference acquisition order of MVs of image blocks from A0→A1(→scaled A0→scaled A1)>B0→B1→B2→scaled B0→scaled B1→scaled B2 to B0→B1→B2(→scaled B0→scaled B1→scaled B2)>A0→A1(→scaled A0→scaled A1).

As another example, as shown in FIG. 9A, according to the merge mode, the reference acquisition order of MVs of image blocks (A0, A1, B2, B1, B0) is A1→B1→B0→A0 (→B2). The processing device 112 may adjust the reference acquisition order to B2→B1→B0→A0 (→A1).

As still another example, as shown in FIG. 9B, as the length of the upper boundary, exceeds the length of the left boundary, the image block A0 located along the left boundary as shown in FIG. 9A may be removed and the image block B3 located along the upper boundary may be added as shown in FIG. 9B. According to the IBC merge mode, the reference acquisition order of MVs of the image blocks A1, B1, B0, B3, and B2 may be A1→B1→B0→B3→B2. The processing device 112 may adjust the reference acquisition order A1→B1→B0→B3→B2 to B1→B0→B3→B2→A1.

In some embodiments, the processing device 112 may adjust the reference acquisition order based on the size feature as the length of the upper boundary exceeds the length of the left boundary.

In some embodiments, the processing device 112 may perform inter-frame prediction on the current coding unit and determine the RDcosts using four angular prediction modes with index 118, 34, 50, 661. The processing device 112 may determine the RDcost of the angular prediction mode with index 66 is minimum and the RDcost of the angular prediction mode with index 18 is maximum. The prediction direction of the angular prediction mode with index 66 may be designated as the texture direction of the current coding unit that points to the upper boundary. Therefore, the processing device 112 may adjust the reference acquisition order such that the MVs of image blocks (B1, B0, B3, B2) may be acquired before the MV of image block (A1).

As the image blocks near a boundary that is correlated with the texture direction (e.g., the texture direction points to) of the current coding unit may have a higher correlation with the current coding unit than the image blocks near another one of two adjacent boundaries, the processing device 112 may reduce the MVs of image blocks located along the s boundary and increase the MVs of image blocks located along the another one boundary, which may increase the correlation of the MVs of the image blocks with the current coding unit and improve the accuracy of the determined MV candidate list, thereby improving the accuracy for inter-prediction.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

FIG. 8 is a flowchart illustrating an exemplary process for determining an acquisition order of MVs of image blocks according to some embodiments of the present application. In some embodiments, the process 800 may be implemented as a set of instructions (e.g., an application) stored in the storage ROM 230 or RAM 240. The processor 220, and/or the modules and/or the units in FIG. 4 may execute the set of instructions, and when executing the instructions, the processor 220, and/or the modules and/or the units may be configured to perform the process 800. The operations of the illustrated process presented below are intended to be illustrative. In some embodiments, the process 800 may be accomplished with one or more additional operations not described and/or without one or more of the operations herein discussed. Additionally, the order in which the operations of the process as illustrated in FIG. 8 and described below is not intended to be limiting. Operations 504 and 506 as described in FIG. 5 may be performed according to process 800 as illustrated in FIG. 8.

In 802, the processing device 112 (e.g., the feature information determination module 404) may determine a texture similarity degree between a current coding unit and each of one or more image blocks associated with the current coding unit. The current coding unit and/or the one or more image blocks may be determined as described elsewhere in the present disclosure (e.g., FIG. 5 and the descriptions thereof). For example, the one or more image blocks may include one or more initial spatial domain blocks that are determined based on an inter-frame prediction mode (e.g., the merge mode, the AMVP mode, etc.). As another example, the one or more image blocks may be determined based on feature information (e.g., the size feature, the texture direction) as described in FIG. 5 and FIG. 6. As a further example, as shown in FIG. 9A, the one or more image blocks of the current coding unit may include spatial domain blocks A1, B1, B0, A0, and B2.

In some embodiments, the processing device 112 may determine the texture similarity degree of the current coding unit and an image block by determining a similarity distance (e.g., the Euclidean distance, the Minkowski distance, the Manhattan distance, etc.) between texture descriptions of the current coding unit and the image block, a gradient difference between the current coding unit and the image block, etc.

In some embodiments, the smaller the similarity distance between the current coding unit and the image block is, the greater the texture similarity degree of the current coding unit and the image block may be. In some embodiments, the smaller the gradient difference between the current coding unit and the image block is, the greater the texture similarity degree of the current coding unit and the image block may be.

In some embodiments, the processing device 112 may determine the gradient difference between the current coding unit and the image block by determining a gradient value of the current coding unit and a gradient value of the image block. The processing device 112 may determine the gradient values of the current coding unit and/or the image block according to Equation (1):

$$grad = \frac{1}{w*h}\sum_{j=1}^{h}\sum_{i=1}^{w}(|p_{i,j} - p_{i,j-1}| + |p_{i,j} - p_{i-1,j}|), \quad (1)$$

where w and h denote the width and height of the current coding unit (or image block), respectively, i and j denote the horizontal coordinate and vertical coordinate of a pixel in the current coding unit (or image block), respectively, p denotes the pixel value of a pixel in the current coding unit (or the image block).

In some embodiments, the processing device 112 may use the absolute value of the gradient difference between gradient values of the current coding unit and each image block to describe the texture similarity degree between the current coding unit and the image block. The smaller the absolute value of the gradient difference between the gradient values of the current coding unit and the image block is, the greater the texture similarity degree of the current coding unit and the image block may be.

In 804, the processing device 112 (e.g., the MV determination module 406) may compare the texture similarity degrees between the current coding unit and the one or more image blocks to obtain a comparison result.

In some embodiments, the processing device 112 may compare the texture similarity degrees by sorting the texture similarity degrees between the current coding unit and the one or more image blocks according to a descending order or an ascending order. The comparison result may include the rank of the texture similarity degrees between the current coding unit and the one or more image blocks.

In 806, the processing device 112 may determine one or more MVs based on the comparison result.

In some embodiments, the processing device 112 may determine at last a portion of the one or more image blocks based on the comparison result. For example, the processing device 112 may determine the at least a portion of the one or more image blocks whose texture similarity degrees exceed a threshold. As another example, the processing device 112 may determine the at least a portion of the one or more image blocks whose texture similarity degrees are ranked in the top (e.g., top 2, top 3, top 4, etc.) among the texture similarity degrees between the current coding unit and the one or more image blocks. Then the processing device 112 may obtain an MV of each of the at least a portion of the one or more image blocks from a storage device (e.g., the storage device 150).

In some embodiments, the processing device 112 may determine an acquisition order of the MVs of the one or more image blocks or the at least a portion of the one or more image blocks based on the comparison result. For example, the processing device 112 may determine the acquisition order of an MV of an image block with a higher texture similarity degree with the current coding unit before an MV of an image block with a lower texture similarity degree. As another example, the processing device 112 may determine the acquisition order of the MVs of the one or more image blocks based on the rank of the texture similarity degrees between the current coding unit and the one or more image blocks. The acquisition order of the MVs of the one or more image blocks (or the at least portion of the one or more image blocks) may be the same as the rank of the texture similarity degrees between the current coding unit and the one or more image blocks in the descending order.

For example, as shown in FIG. 9A, using the merge mode, the processing device 112 may determine spatial domain blocks A0, A1, B0, B1, B2. The processing device 112 may determine the gradient values of the image blocks A0, A1, B0, B1, B2, and the current coding unit, respectively, which may be denoted as gradA0, gradA1, gradB0, gradB1, gradB2, and gradCur, respectively. The processing device 112 may determine the absolute values of the gradient differences between the gradient values of the image blocks A0, A1, B0, B1, B2, and the current coding unit, which may be denoted as diff_gradA0, diff_gradA1, diff_gradB0, diff_gradB1, diff_gradB2. The processing device 112 may sort the diff_gradA0, diff_gradA1, diff_gradB0, diff_gradB1, diff_gradB2 according to the descending order or the ascending order. If the comparison result includes (diff_gradA0<diff_gradA1<diff_gradB0<diff_gradB1<diff_gradB2), the texture similarity degrees between the current coding unit and the spatial image blocks may be A0>A1>B0>B1>B2. The processing device 112 may acquire the MVs of the spatial domain blocks A0, A1, B0, B1, B2 according to the acquisition order A0-A1-B0-B1-B2. In other words, the MVs of the spatial domain blocks A0, A1, B0, B1, B2 may be arranged in an order A0-A1-B0-B1-B2 in sequence.

As another example, as shown in FIG. 9B, using the IBC prediction mode, the processing device 112 may determine spatial domain blocks A1, B1, B0, B3, and B2. The processing device 112 may determine the gradient values of the image blocks A1, B1, B0, B3, B2, and the current coding unit, respectively, which may be denoted as gradA1, gradB1, gradB0, gradB3, gradB2, and gradCur, respectively. The processing device 112 may determine the absolute values of the gradient differences between the gradient values of the image blocks A1, B1, B0, B3, B2, and the current coding unit, which may be denoted as diff_gradA1, diff_gradB1, diff_gradB0, diff_gradB3, and diff_gradB2. The processing device 112 may sort the diff_gradA1, diff_gradB1, diff_gradB0, diff_gradB3, and diff_gradB2 according to the descending order or the ascending order. If the comparison result (i.e., sorting result) includes (diff_gradA1<diff_gradB1<diff_gradB0<diff_gradB3<diff_radB2), the texture similarity degree between the current coding unit and the spatial image blocks may be A1>B1>B0>B3>B2. The processing device 112 may acquire the MVs of the spatial domain blocks A1, B1, B0, B3, B2, according to the acquisition order A1-B1-B0-B3-B2. In other words, the MVs of the spatial domain blocks A1, B1, B0, B3, B2 may be arranged in an order A1-B1-B0-B3-B2 in sequence.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, operation 804 and 806 may be integrated into one single operation. As another example, operation 804 may be omitted.

Figure 11:
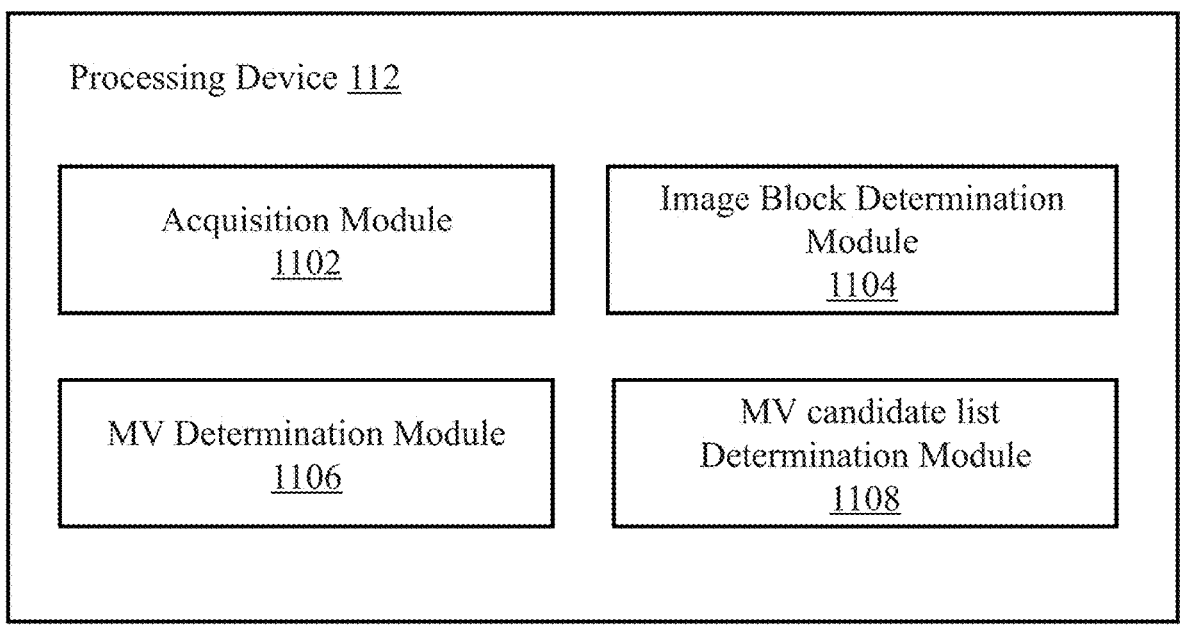
FIG. 11 is a block diagram illustrating an exemplary processing device according to some embodiments of the present disclosure.

FIG. 11 is a block diagram illustrating an exemplary processing device according to some embodiments of the present disclosure. As illustrated in FIG. 11, the processing device 1100 may include an acquisition module 1102, an image block determination module 1104, an MV determination module 1106, and an MV candidate list determination module 1108. In some embodiments, the processing device 1100 may also include a prediction module (not shown in FIG. 11). In some embodiments, the acquisition module 1102, the image block determination module 1104, the MV determination module 1106, and the MV candidate list determination module 1108 may be connected to and/or communicate with each other via a wireless connection (e.g., a network), a wired connection, or a combination thereof.

The acquisition module 1102 may be similar to or same as the acquisition module 402. For example, the acquisition module 1102 may be configured to obtain a current coding unit in a current image.

The image block determination module 1104 may be configured to determine one or more time-domain blocks associated with the current coding unit in the current image. In some embodiments, at least one of the one or more time-domain blocks may be in a coding tree unit (CTU) (also referred to as a first CTU) that includes the current coding unit. In some embodiments, at least one of the one or more time-domain blocks may be in a CTU (also referred to as a second CTU) that is different from the CTU including the current coding unit. In some embodiments, the count of the one or more time-domain blocks may be equal to 1. In some embodiments, the count of the one or more time-domain blocks may exceed 1, such as 2, 3, 4, etc.

In some embodiments, the image block determination module 1104 may determine the one or more time-domain blocks from candidate image blocks associated with the current coding unit. In some embodiments, the candidate image blocks may include a center image block (also referred to as first image block) of the current coding unit, one or more adjacent image blocks (also referred to as second image blocks) of the current coding unit, one or more extended image blocks (also referred to as third image blocks) of each of the one or more adjacent image blocks, or the like, or a combination thereof.

In some embodiments, the image block determination module 1104 may determine the one or more time-domain blocks from the candidate image blocks (e.g., the center image block of the current coding unit, the adjacent image blocks of the current coding unit, and the extended image blocks of each of the adjacent image blocks) according to a searching order. For example, the processing device 112 may search one or more available candidate image blocks from the center image block of the current coding unit, the adjacent image blocks of the current coding unit, and the extended image blocks of each of the adjacent image blocks according to the searching order and designate at least a portion of the available candidate image blocks as the time-domain blocks of the current coding unit.

The MV determination module 1106 may be configured to one or more MVs (also referred to as second MVs) of the current coding unit.

In some embodiments, the MV determination module 1106 may determine one or more co-located images of the image. The MV determination module 1106 may determine one or more co-located blocks in each of the one or more co-located images, each of the one or more co-located blocks corresponding to one of the one or more time-domain blocks. The MV determination module 1106 may determine, based on MVs (also referred to as first MVs) of the one or more co-located blocks, the one or more second MVs of the current coding unit.

For each of the one or more co-located images, the MV determination module 1106 may determine a co-located block corresponding to each of the one or more time-domain blocks. A position of the co-located block in the each of the one or more co-located images may be the same as the position of the corresponding time-domain block in the image. A count of co-located blocks of a time-domain block may be determined based on a count of the one or more co-located images. For example, the count of co-located blocks of a time-domain block may be the same as the count of the one or more co-located images.

In some embodiments, the MV determination module 1106 may determine one or more first reference images of the image. The MV determination module 1106 may determine a second reference image of each of the one or more co-located images of the image. For each first MV of a co-located block in a co-located image, the processing device 112 may determine the one or more second MVs of the current coding unit based on a first distance between the image and each of the first reference images of the image, a second distance between the co-located image and the corresponding second reference image, and the first MVs of the one or more co-located blocks. For example, the MV determination module 1106 may scale a first MV of a co-located block in a co-located image of a time-domain block to obtain one or more second MVs of the current coding unit based on the first distances between the image and the one or more first reference images of the image and the second distance between the co-located image and the second reference image of the co-located image. More descriptions for determining the one or more MVs of the current coding unit may be found in FIG. 13 and the description thereof.

The MV candidate list determination module 1108 may be similar to or same as the MV candidate list determination module 408.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, a prediction module and/or storage module may be added. As another example, the MV determination module 1106 and the MV candidate list determination module may be integrated into the same module.

Figure 12:
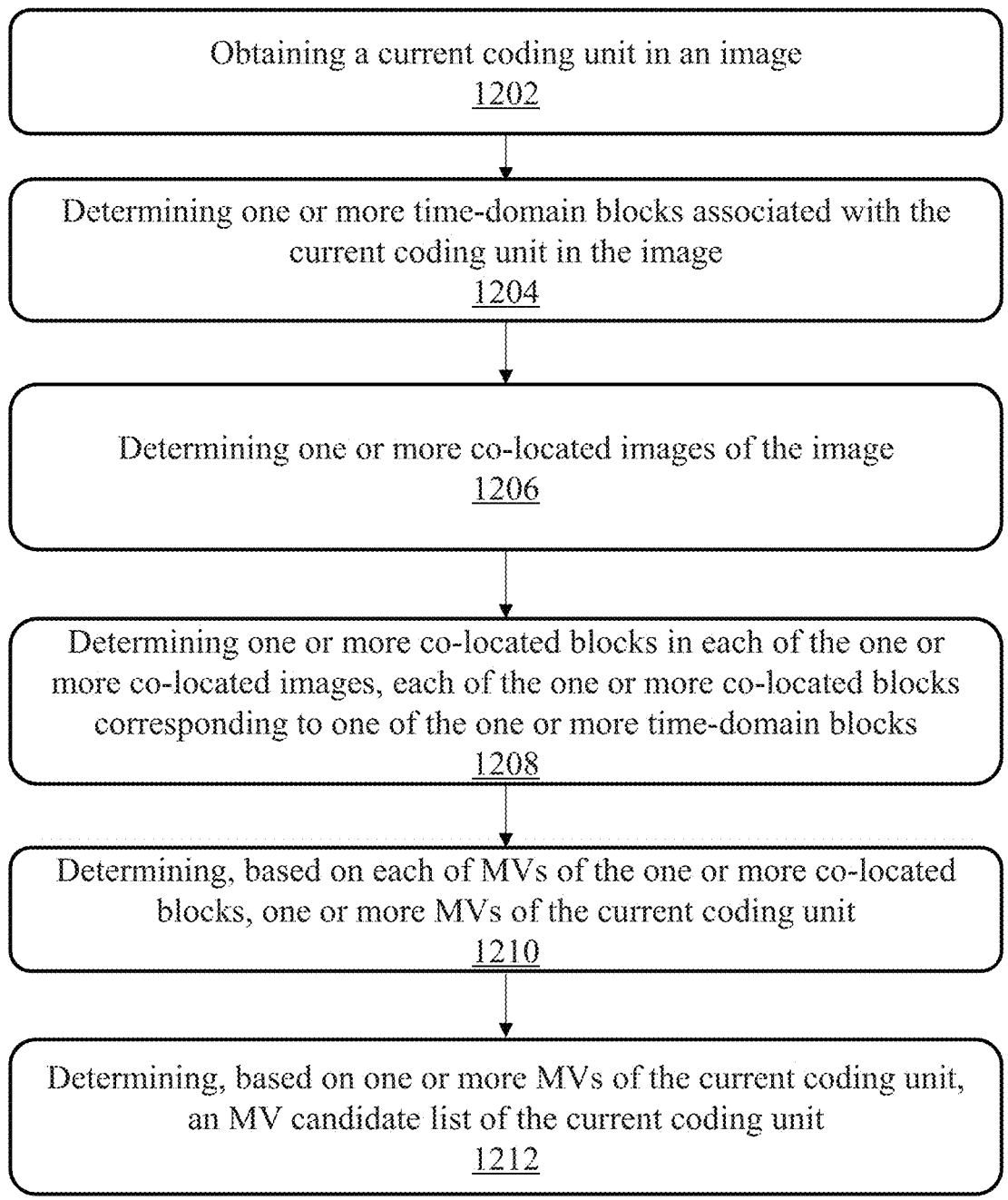
FIG. 12 is a flowchart illustrating an exemplary process for determining an MV candidate list according to some embodiments of the present disclosure.

FIG. 12 is a flowchart illustrating an exemplary process for determining an MV candidate list according to some embodiments of the present disclosure. In some embodiments, the process 1200 may be implemented as a set of instructions (e.g., an application) stored in the storage ROM 230 or RAM 240. The processor 220, and/or the modules and/or the units in FIG. 12 may execute the set of instructions, and when executing the instructions, the processor 220, and/or the modules and/or the units may be configured to perform the process 1200. The operations of the illustrated process presented below are intended to be illustrative. In some embodiments, the process 1200 may be accomplished with one or more additional operations not described and/or without one or more of the operations herein discussed. Additionally, the order in which the operations of the process as illustrated in FIG. 12 and described below is not intended to be limiting.

In 1202, the processing device 112 (e.g., the acquisition module 1102) may obtain a current coding unit in an image. More descriptions for the current coding unit and/or the image may be found elsewhere in the present disclosure.

In 1204, the processing device 112 (e.g., the image block determination module 1104) may determine one or more image blocks (also referred to as time-domain blocks) associated with the current coding unit in the current image.

As used herein, a time-domain block refers to an image block that is correlated with the current coding unit in a time domain.

In some embodiments, at least one of the one or more time-domain blocks may be in a coding tree unit (CTU) (also referred to as a first CTU) that includes the current coding unit. In some embodiments, at least one of the one or more time-domain blocks may be in a CTU (also referred to as a second CTU) that is different from the CTU including the current coding unit. In some embodiments, the count of the one or more time-domain blocks may be equal to 1. In some embodiments, the count of the one or more time-domain blocks may exceed 1, such as 2, 3, 4, etc.

In some embodiments, the processing device 112 may determine the one or more time-domain blocks from candidate image blocks associated with the current coding unit. In some embodiments, the candidate image blocks may include a center image block (also referred to as first image block) of the current coding unit, one or more adjacent image blocks (also referred to as second image blocks) of the current coding unit, one or more extended image blocks (also referred to as third image blocks) of each of the one or more adjacent image blocks, or the like, or a combination thereof. The center image block of the current coding unit may be located at a center position of the current coding unit. The one or more adjacent image blocks of the current coding unit may include one or more image blocks that are adjacent to one or more boundaries of the current coding unit. The one or more extended image blocks of an adjacent image block may include one or more image blocks in the image that are distributed beside the adjacent image block along a direction that the second image block is located relative to the current coding unit. If the adjacent image block is located at a corner of the current coding unit, the direction may be along the diagonal line associated with the corner of the current coding unit. A position relationship between two adjacent extended image blocks of an adjacent image block may be the same as a position relationship between the adjacent image block and the current coding unit.

Figure 14A:
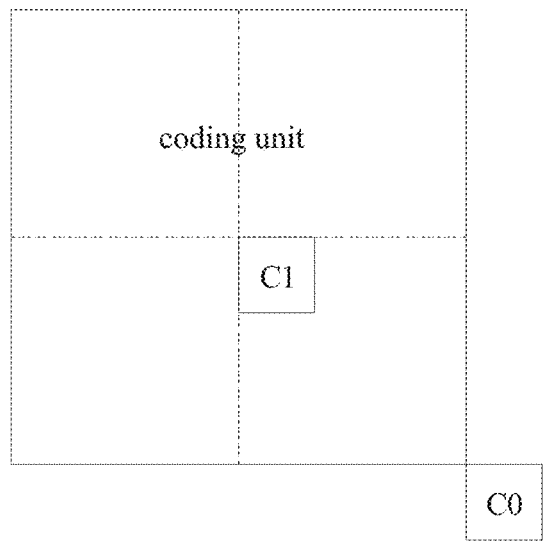
FIGS. 14A-14B show exemplary time-domain blocks of a coding unit according to some embodiments of the present disclosure.

For example, FIG. 14A shows exemplary time-domain blocks of a coding unit according to some embodiments of the present disclosure. As shown in FIG. 14A, C1 is the center image block of the coding unit, and C1 is the adjacent image block of the coding unit.

Figure 14B:
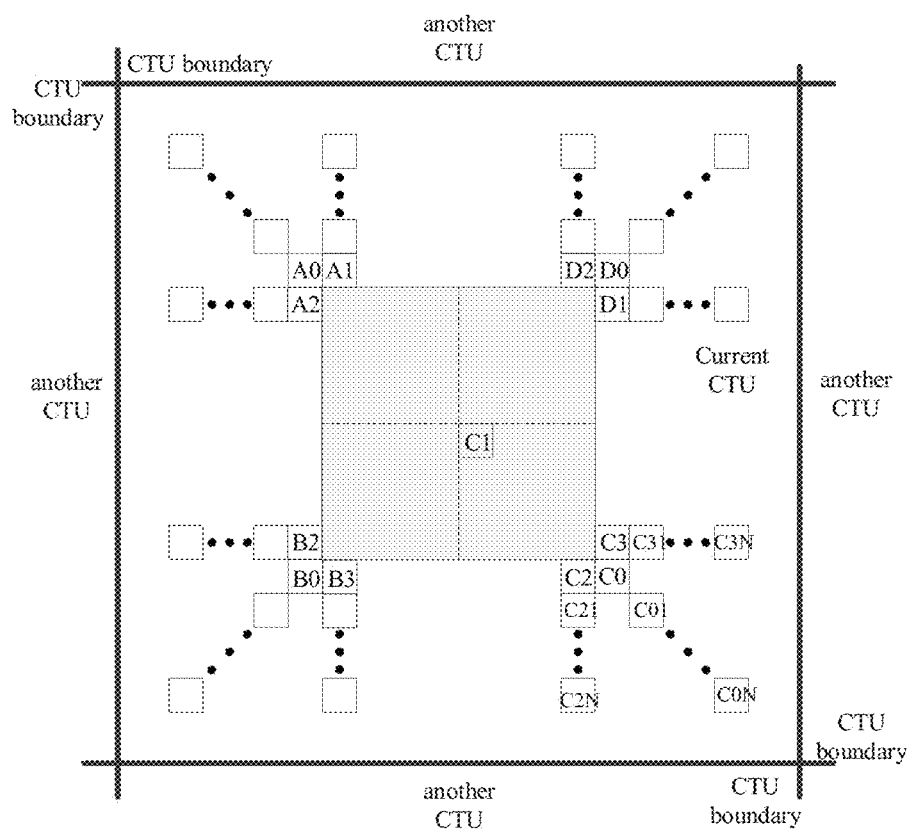

As another example, FIG. 14B shows exemplary time-domain blocks of a coding unit according to some embodiments of the present disclosure. As shown in FIG. 14B, in addition to the center image block C0 and the adjacent image block C1, the candidate image blocks may be determined from a region surrounding the current coding unit. For example, the candidate image blocks may be determined from a region located at the lower, the lower-right, the lower-left, the right, the upper, the upper-left, and the upper-right of the current coding unit. In some embodiments, the candidate image blocks may be located within the rows in L CTUs on the upper of the CTUs, the rows in L CTUs below the CTUs, the columns in L CTUs on the left of the CTU and the columns in L CTUs on the right of the CTU. L may be equal to or exceed 0. When L is equal to 0, the extended image blocks may be located in the same CTU as the current coding unit. The adjacent image block C0 may include extended image blocks C01 ..., C0N that are distributed along the direction between the current coding unit and the adjacent image block C0. The adjacent image block C2 may include extended image blocks C21 ..., C2N that are distributed along the direction between the current coding unit and the adjacent image block C2.

The processing device 112 may determine the time-domain blocks from C0, C1, and the extended image blocks of each of the adjacent image blocks of the current coding unit.

Specifically, the one or more time-domain blocks may include at least one of the center image block, the adjacent image blocks, and the extended image blocks of each of the adjacent image blocks. The extended image blocks may be arranged in the image from near to far according to the distance between the extended image blocks and the corresponding adjacent image block. The position relationship of the qth extended image block relative to the q-1th extended image block of the same adjacent image block may be the same as that of the adjacent image block relative to the current coding unit. q may be an integer, and 0th extended image block may be the adjacent image block.

In some embodiments, as shown in FIG. 14B, the adjacent image block may include at least one of a first lower-right adjacent image block (C0), a second lower-right adjacent image block (C2), a third lower-right adjacent image block (C3), a first lower-left adjacent image block (B0), a second lower-left adjacent image block (B2), a third lower-left adjacent image block (B3), a first upper-left adjacent image block (A0), a second upper-left adjacent image block (A1), a third upper-left position block (A2), a first upper-right adjacent image block (D0), a second upper-right adjacent image block (D1), and a third upper-right adjacent image block (D2).

The first lower-right adjacent block (C0) may contact to a first vertex (i.e., the lower-right vertex) of the current coding unit and include pixels located on the lower-right of the current coding unit; the second lower-right adjacent block (C2) may contact to the right portion of the bottom boundary of the current coding unit and include pixels that are located below the pixels in the lower-right of the current coding unit; the third lower-right adjacent block (C3) may contact to the bottom portion of the right boundary of the current coding unit and include pixels on the right of the pixels in the lower-right of the current coding unit.

The first lower-left adjacent block (B0) may contact to a second vertex (i.e., the lower-left vertex) of the current coding unit and include pixels located on the lower-left of the current coding unit; the second lower-left adjacent block (B2) may contact to the bottom portion of the left boundary of the current coding unit and include pixels that are located on the left of the pixels in the lower-left of the current coding unit; the third lower-left adjacent block (B2) may contact to the left portion of the bottom boundary of the current coding unit and include pixels below the pixels in the lower-right of the current coding unit.

The first upper-left adjacent block (A0) may contact to a third vertex (i.e., the upper-left vertex) of the current coding unit and include pixels located on the upper-left of the current coding unit; the second upper-left adjacent block (A1) may contact to the left portion of the upper boundary of the current coding unit and include pixels that are located on the upper of the pixels in the upper-left of the current coding unit; the third upper-left adjacent block (A2) may contact to the upper portion of the left boundary of the current coding unit and include pixels that are located on the left of the pixels in the lower-left of the current coding unit.

The first upper-right adjacent block (D0) may contact to a fourth vertex (i.e., the upper-right vertex) of the current coding unit and include pixels located on the upper-right of the current coding unit; the second upper-right adjacent block (D1) may contact to the upper portion of the right boundary of the current coding unit and include pixels that are located on the right of the pixels in the upper-right of the current coding unit; the third upper-right adjacent block (D2) may contact to the right portion of the upper boundary of the current coding unit and include pixels that are located on the upper of the pixels in the upper-right of the current coding unit.

In some embodiments, the adjacent image blocks C1, C0, C2, C3, D0, D1, B0, B3, and corresponding extended image blocks may be not encoded, and the image blocks A1, A0, A2, D2, B2 may have been encoded, such as based on inter-frame prediction.

In some embodiments, the processing device 112 may determine the one or more time-domain blocks from the candidate image blocks (e.g., the center image block of the current coding unit, the adjacent image blocks of the current coding unit, and the extended image blocks of each of the adjacent image blocks) according to a searching order. For example, the processing device 112 may search one or more available candidate image blocks from the center image block of the current coding unit, the adjacent image blocks of the current coding unit, and the extended image blocks of each of the adjacent image blocks according to the searching order and designate at least a portion of the available candidate image blocks as the time-domain blocks of the current coding unit.

In some embodiments, the searching order of the time-domain blocks of the current coding unit may include at least one of the first order and the second order. The first order may be used to search image blocks that have the same or similar distance from the center of the current coding unit. For example, the adjacent image blocks of the current coding unit may have the same similar distance from the center of the current coding unit or the same distance (i.e., 0) from the corresponding boundary of the current coding unit. As another example, the extended image blocks that are located at the same location with respect to the corresponding adjacent image blocks may have the same or similar distance from the center of the current coding unit. As used herein, a location of an extended image block of an adjacent image block with respect to the adjacent image block may be defined by an order number in an order of the extended image blocks of the adjacent image block arranged from near to far. As still another example, the qth extended image blocks of the adjacent image blocks may have the same or similar distance from the center of the current coding unit. The second order may be used to search image blocks that have different distances from the center of the current coding unit. For example, the extended image blocks of each adjacent image block may include different distances from the center of the current coding unit.

In some embodiments, the processing device 112 may search the adjacent image blocks (e.g., A1, A0, A2, C1, C0, C2, C3, D0, D1, D2, B0, B3, B2 as shown in FIG. 14B) according to the first order; when the processing device 112 finishes to search the adjacent image blocks, the processing device 112 may determine one of multiple groups of extended image blocks of the adjacent image blocks according to the second order (i.e., from near to far); and for each group of extended image blocks, the processing device 112 may search extended image blocks in each group according to the first order. Extended image blocks (i.e., C21, C01, C31, ..., etc.) in each group may have the same or similar distance from the center of the current coding unit, i.e., the order numbers of the extended image blocks in each group may be the same. Each of the extended image blocks in each group may correspond to an adjacent image block.

In some embodiments, the processing device 112 may search an adjacent image block and the extended image blocks of the adjacent image blocks according to the second order (i.e., from near to far); when the processing device 112 finishes to search the adjacent image block and the extended image blocks of the adjacent image blocks, the processing device 112 may determine a next adjacent image block according to the first order; and the processing device 112 may search the next adjacent image block and the extended image blocks of the next adjacent image block according to the second order (i.e., from near to far).

In some embodiments, the first order may include a clockwise, a counterclockwise, a first clockwise or counterclockwise for image blocks at corner positions and then a clockwise or counterclockwise for image blocks at non-corner positions, and a first diagonal order for first adjacent image blocks and then searching second adjacent blocks in any order. The first adjacent image blocks may include the first lower-right adjacent image block (C0 in FIG. 14B), the first lower-left adjacent image block (B0 in FIG. 14B), the first upper-left adjacent image block (A0 in FIG. 14B), and the first upper-right adjacent image block (D0 in FIG. 14B). Image blocks that are located at the corner positions may include at least one of the first lower-right (C0 in FIG. 14B) adjacent image block and the extended image blocks thereof, the first lower-left adjacent image block (B0 in FIG. 14B) and the extended image blocks thereof, the first upper-left adjacent image block (A0 in FIG. 14B) and the extended image blocks thereof, the first upper-right adjacent image block (D0 in FIG. 14B) and the extended image blocks thereof. The image blocks that are located at the non-corner positions may include at least one of adjacent image blocks and corresponding extended image blocks other than the first lower-right (C0 in FIG. 14B) adjacent image block and the extended image blocks thereof, the first lower-left adjacent image block (B0 in FIG. 14B) and the extended image blocks thereof, the first upper-left adjacent image block (A0 in FIG. 14B) and the extended image blocks thereof, the first upper-right adjacent image block (D0 in FIG. 14B) and the extended image blocks thereof. At least two of the three image blocks searched in the diagonal order may be diagonally distributed.

For example, the processing device 112 may search the adjacent image blocks of the current coding unit starting from an adjacent image block (e.g., C0, C2, A0, A1, etc.) in clockwise or counterclockwise. Then the processing device 112 may search the extended image blocks of the adjacent image blocks from near to far. If all the adjacent image blocks and the extended image blocks of the adjacent image blocks are searched and unavailable, the processing device 112 may determine the center image block (e.g., C1 in FIG. 14B) as the time-domain blocks of the current coding unit.

As another example, the processing device 112 may search the first adjacent image blocks according to a diagonal order (e.g., C0→A0→B0→D0). The processing device 112 may search the second adjacent image blocks and the extended image blocks thereof according to any order. For example, the processing device 112 may search the second adjacent image blocks according to the diagonal order (e.g., C2>A1>A2>C3>B2>D1>D2>B1) and search extended image blocks from near to far. If all the adjacent image blocks and the extended image blocks of the adjacent image blocks are searched and unavailable, the processing device 112 may determine the center image block (e.g., C1 in FIG. 14B) as the time-domain blocks of the current coding unit.

As still another example, the processing device 112 may search an adjacent image block (e.g., C0 in FIG. 14B) and the extended image blocks thereof from near to far. After finishing the search of the adjacent image block and the extended image blocks thereof, the processing device 112 may determine a next adjacent image block (e.g., D0 in FIG. 14B) in clockwise or counterclockwise. The processing device 112 may search the next adjacent image block (e.g., D0 in FIG. 14B) and the extended image blocks thereof from near to far. If all the adjacent image blocks and the extended image blocks of the adjacent image blocks are searched and unavailable, the processing device 112 may determine the center image block (e.g., C1 in FIG. 14B) as the time-domain blocks of the current coding unit.

In 1206, the processing device 112 (e.g., the MV determination module 1106) may determine one or more co-located images of the image.

As used herein, a co-located image of the image may refer to an encoded image that is strongly correlated with the image in the time-domain. For example, a co-located image of an image may include a picture order count (POC) that is close to the POC of the image. In some embodiments, the count of the one or more co-located images of the image may be equal to 1. In some embodiments, the count of the one or more co-located images of the image may exceed 1, for example, 2, 3, 4, etc.

In some embodiments, the processing device 112 may designate at least one reference image in one or more reference image lists of the image as the one or more co-located images of the image. For example, the processing device 112 may designate one single reference image (i.e., frame) or some reference images (i.e., frames) in the reference image lists of the image as the co-located images. As a further example, the reference image lists of the image may include list0 and list1, the processing device 112 may designate the reference images with index=0 and/or index=3 in the reference image lists (list0 and list1) as the co-located images. In the reference image list0, the forward reference images of the image may be arranged in the list0 in front of the backward reference images of the image. In the reference image list1, the backward reference images of the image may be arranged in front of the forward reference images of the image.

In some embodiments, the processing device 112 may select m images from n encoded images whose POCs are closest to the POC of the image as co-located images. For example, the processing device 112 may select m images from n encoded images whose POCs are with a range of the POC of the image as co-located images. The selection order and/or selection conditions of the m images from the n encoded images are not limited, and the m images may be selected from the n encoded images in any way, such as random selection or according to features of the m images. Both n and m may be integers greater than 1, and n may be greater than or equal to m, that is, multiple co-located images may be determined.

In some embodiments, the processing device 112 may determine the one or more co-located images of the image based on multiple candidate co-located images of image blocks that have been inter-frame encoded (also referred to as encoded image blocks). The processing device 112 may designate at least one of the multiple candidate co-located images of the image blocks that have been inter-frame encoded as the one or more co-located image of the image.

A frequency of the at least one of the multiple candidate co-located images used for the inter-frame prediction of the multiple image blocks may satisfy a condition, e.g., exceed a threshold. For example, the processing device 112 may determine the count of encoded image blocks that use each of the candidate co-located images for inter-frame encoding, and determine the first m candidate co-located images corresponding to the higher count of encoded image blocks. In some embodiments, the processing device 112 may select the encoded image blocks from the candidate image blocks of the current coding unit as described in operation 1204.

In some embodiments, the processing device 112 may search the candidate image blocks of the current coding unit according to a searching order and determine the co-located images of the first m candidate image blocks that have been inter-frame encoded as the co-located images of the image. The searching order may be as described in connection to operation 1204.

In 1208, the processing device 112 (e.g., the MV determination module 1106) may determine one or more co-located blocks in each of the one or more co-located images, each of the one or more co-located blocks corresponding to one of the one or more time-domain blocks.

For each of the one or more co-located images, the processing device 112 may determine a co-located block corresponding to each of the one or more time-domain blocks. A position of the co-located block in the each of the one or more co-located images may be the same as the position of the corresponding time-domain block in the image. A count of co-located blocks of a time-domain block may be determined based on a count of the one or more co-located images. For example, the count of co-located blocks of a time-domain block may be the same as the count of the one or more co-located images.

Figure 15:
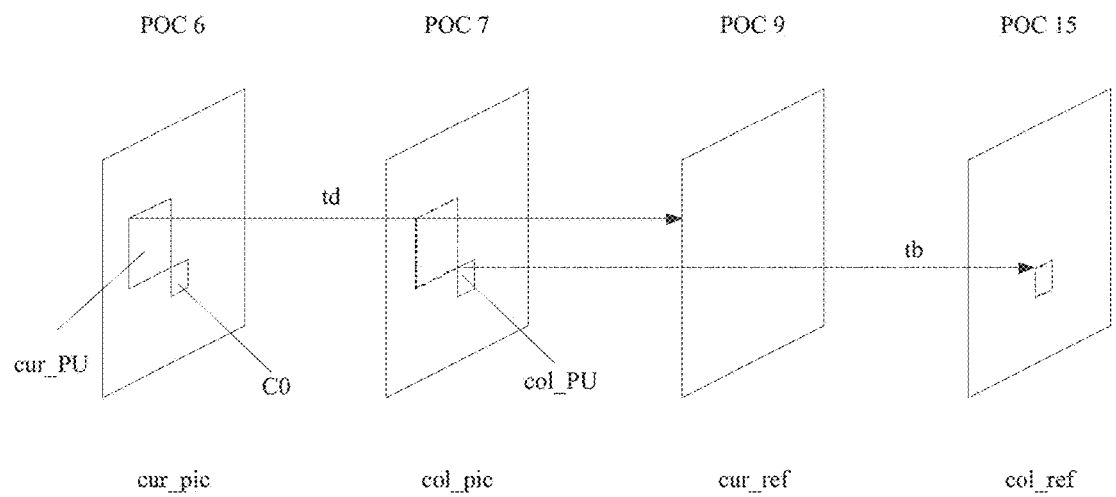
FIG. 15 shows a diagram for determining MVs of a current coding unit in an image based on a first reference image of the image, a co-located image of the image, and a second reference image of the co-located image according to some embodiments of the present disclosure.

A co-located block corresponding to a time-domain block of the current coding unit may be selected according to a certain rule in a co-located image. For example, the time-domain block and the corresponding co-located block in a co-located image may have the same coordinate position in the space domain. For example, FIG. 15 shows a diagram illustrating exemplary an image, a first reference image of the image, a co-located image of the image, and a second reference image of the co-located image according to some embodiments of the present disclosure. As shown in FIG. 15, cur_pic refers to the image with POC 6, col_pic refers to a co-located image with POC 7 of the image, cur_ref refers to the first reference image with POC 9 of the co-located image and col_ref refers to the second reference image with POC 15 of the co-located image. The image block C0 in the image is a time-domain block of a current coding unit (denoted as cur_PU). Correspondingly, the image block col_PU at the same spatial position in the co-located image col_pic as the time-domain block C0 is a co-located block of the time-domain block C0.

In 1210, the processing device 112 (e.g., the image block determination module 1104) may determine, based on each of MVs (also referred to as first MVs) of the one or more co-located blocks, one or more MVs (also referred to as second MVs) of the current coding unit.

In some embodiments, the processing device 112 may obtain the first MVs of the one or more co-located blocks from a storage device. For example, the one or more co-located blocks may have been inter-frame encoded. The processing device 112 may obtain the one or more first MVs of the one or more co-located blocks from the encoding information of the one or more co-located blocks that may be stored in a storage device, for example, the storage device 150, the storage module 1110, etc.

In some embodiments, the processing device 112 may determine one or more first reference images of the image. The processing device 112 may determine a second reference image of each of the one or more co-located images of the image. For each first MV of a co-located block in a co-located image, the processing device 112 may determine the one or more second MVs of the current coding unit based on a first distance between the image and each of the first reference images of the image, a second distance between the co-located image and the corresponding second reference image, and the first MVs of the one or more co-located blocks. For example, the processing device 112 may scale a first MV of a co-located block in a co-located image of a time-domain block to obtain one or more second MVs of the current coding unit based on the first distances between the image and the one or more first reference images of the image and the second distance between the co-located image and the second reference image of the co-located image. More descriptions for determining the one or more MVs of the current coding unit may be found in FIG. 13 and the description thereof.

In 1212, the processing device 112 (e.g., the MV candidate list determination module 1108) may determine an MV candidate list based on the one or more MVs (i.e., the second MVs) of the current coding unit.

In some embodiments, the MV candidate list may be different according to different inter-frame prediction modes. Exemplary non-triangle prediction modes may include a merge mode, an AMVP mode, a CIIP mode, an affine merge mode, an affine AMVP mode, etc. In some embodiments, the MV candidate list may include a plurality of MVs. The desired total count of the plurality of MVs in the MV candidate list may be set by a user or according to a default setting of the image coding system 100. For example, the processing device 112 may determine the desired total count of the plurality of MVs based on the type of a prediction mode. For example, using the merge mode, the desired total count of the plurality of MVs may be equal to 6. Using the AMVP mode, the desired total count of the plurality of MVs may be equal to 2.

In some embodiments, using the AMVP mode, the processing device 112 may construct a preliminary MV candidate list (also referred to as a spatial domain MV candidate list) by adding spatial domain MVs. As shown in FIG. 9A, the processing device 112 may acquire spatial domain MVs of spatial domain blocks (A0, A1, B2, B1, B0) according to an order of A0→A1(→scaled A0→scaled A1)>B0→B1→B2(→scaled B0→scaled B1→scaled B2) in sequence or an order of B0→B1→B2(→scaled B0→scaled B1→scaled B2)>A0→A1(→scaled A0→scaled A1). If the reference image of a spatial domain block is the same as the reference images of the image, the processing device 112 may add the spatial domain MV of the spatial domain block into the preliminary MV candidate list; if the reference image of a spatial domain block is different from the reference images of the image, the processing device 112 may scale the spatial domain MV of the spatial domain block to obtain a scaled spatial domain MV of the spatial domain block and add the scaled spatial domain MV into the preliminary MV candidate list. In some embodiments, the scaled B0, scaled B1, and scaled B2 may be used when the A0, A1, scaled A0, and scaled A1 are available. More descriptions for determining the spatial domain MV candidate list may be found elsewhere in the present disclosure.

In some embodiments, if the size of the current coding unit satisfies a condition, the processing device 112 may add the one or more MVs of the time-domain blocks (i.e., time-domain MVs) determined in operation 1210 to the preliminary MV candidate list. The size of the current coding unit satisfying the condition may include that the size of the current coding unit exceeds 4×4, or exceeds 8×4, or exceeds 4×8, etc. If the desired count of the plurality of MVs in the preliminary MV candidate list does not reach, the processing device 112 may determine one or more MVs based on a historical MV prediction (HMVP) list. The HMVP list may include a plurality of MVs that have been used to encode one or more image blocks in the same CTU as the current coding unit and the reference images of each of the one or more image blocks may be the same as the one or more second reference images of the image. If the desired count of the plurality of MVs in the preliminary MV candidate list does not reach, the processing device 112 may add zero MVs into the MV candidate list until the desired count of the plurality of MVs in the preliminary MV candidate list reaches.

As another example, using the merge mode, the desired total count of the plurality of first MVs may be six, the maximum count of the one or more vectors of the spatial domain blocks is four, and the maximum count of the one or more MVs of the time-domain blocks may be 1. As shown in FIG. 9A, the one or more spatial domain blocks of the current coding unit include spatial domain blocks A1, B1, B0, A0, and B2. The processing device 112 may acquire the MVs of A1, B1, B0, and A0 in sequence. When at least one of spatial domain blocks A1, B1, B0, and A0 do not exist and the MV of spatial domain block B2 is different from that of spatial domain blocks A1 and B1, the MV of the spatial domain block B2 may be added to the first MV candidate list. The MVs of the spatial domain blocks A1, B1, B0, A0, and (B2) may be arranged in the MV candidate in the order of A1-B1-B0-A0-(B2). Using the merge mode, the maximum count of time-domain MVs may be 1. The time-domain MVs may be determined as described elsewhere in the present disclosure. If the desired count (e.g., 6) of the plurality of MVs in the MV candidate list does not reach, the processing device 112 may determine one or more MVs based on a historical MV prediction (HMVP) list. For example, the processing device 112 may compare MVs in the HMVP list with the MVs in the MV candidate list that are determined based on the spatial domain blocks and the time-domain blocks in sequence. If an MV in the HMVP list is different from the MVs in the MV candidate list that are determined based on the spatial domain blocks and the time-domain blocks, the processing device 112 may add the MV in the HMVP list to the MV candidate list until the desired total count of the plurality of MVs is reached. If the desired count (e.g., 6) of the plurality of MVs in the MV candidate list does not reach, the processing device 112 may determine an average MV of MVs arranged in the top (e.g., top two, top three, etc.) of the MV candidate list. The processing device 112 may add the average MV to the MV candidate list. In some embodiments, an MV arranged in the top (e.g., top two, top three, etc.) of the MV candidate list may a bidirectional MV including a forward MV and a backward MV. The processing device 112 may average forward MVs of the MVs arranged in the top (e.g., top two, top three, etc.) of the MV candidate list to obtain an average forward MV. The processing device 112 may average backward MVs of the MVs arranged in the top (e.g., top two, top three, etc.) of the MV candidate list to obtain an average backward MV. The processing device 112 may add the average MV including the average forward MV and the average backward MV to the MV candidate list. In some embodiments, if the desired total count of the plurality of MVs in the MV candidate list is not reached, the processing device 112 may add zero MVs to the MV candidate list until the desired total count of the plurality of MVs in the MV candidate list is reached. As used herein, a zero MV refers to a value of the MV is equal to zero.

In some embodiments, the processing device 112 (e.g., the prediction module 410) may determine a prediction result of the current coding unit based on the MV candidate list.

The prediction result of the current coding unit may include a prediction direction of the current coding unit, a reference index of the current coding unit, a motion vector prediction (MVP) of the current coding unit, a motion vector difference (MVD), a residual error associated with the current coding unit, etc.

In some embodiments, the processing device 112 may determine a target MV (MVP) from the MV candidate list. The processing device 112 may determine a motion estimation of the current coding unit. For example, the processing device 112 may determine a matched image block of the current coding unit from the one or more first reference image of the image. The processing device 112 may determine an actual MV of the current coding unit by determining a difference between coordinates of the current coding unit and coordinates of the matched image block. The processing device 112 may determine the MVD between the actual MV and the MVP.

In some embodiments, operation 1210 and operation 1212 may be combined into a single operation. For example, the processing device 112 may determine the MV candidate list based at least in part on the one or more co-located blocks in each of the one or more co-located images.

Accordingly, the methods and systems provided by the present disclosure may expand the selection positions of the time-domain blocks, such that more co-located blocks may be determined in one single co-located image, thereby acquiring more MVs of the co-located blocks, which may improve the accuracy of the time-domain MVs, thereby improving the accuracy of inter-frame prediction. The methods and systems may determine more co-located images of the image, which may increase more time-domain MVs of co-located blocks of a time-domain block in different co-located images. And a co-located image may correspond to a scaling coefficient (td/tb), there are multiple scaling coefficients. The MVs of the co-located blocks in different co-located frames may be correspondingly scaled to obtain multiple scaled time-domain MVs, which improve the accuracy of inter-frame prediction. The methods and systems may determine more reference images. Different reference images may correspond to different scaling coefficients (td/tb), Multiple scaled time-domain MVs may be obtained after scaling MV of a co-located block with these scaling coefficients, which improves the accuracy of inter-frame prediction.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

FIG. 13 is a flowchart illustrating an exemplary process for determining MVs according to some embodiments of the present disclosure. In some embodiments, the process 1300 may be implemented as a set of instructions (e.g., an application) stored in the storage ROM 230 or RAM 240. The processor 220, and/or the modules and/or the units in FIG. 4 may execute the set of instructions, and when executing the instructions, the processor 220, and/or the modules and/or the units may be configured to perform the process 1300. The operations of the illustrated process presented below are intended to be illustrative. In some embodiments, the process 1300 may be accomplished with one or more additional operations not described and/or without one or more of the operations herein discussed. Additionally, the order in which the operations of the process as illustrated in FIG. 13 and described below is not intended to be limiting. Operation 1210 may be performed according to process 1300 as illustrated in FIG. 13.

In 1302, the processing device 112 (e.g., the MV determination module 1106) may obtain one or more first reference images of a current image. The current image may be the same as or similar to the image as described in operation 1202 illustrated in FIG. 12.

As used herein, a reference image of the current image may refer to an encoded image that is strongly correlated with the current image in the time-domain. For example, a first reference image of the current image may include a picture order count (POC) that is close to the POC of the current image. In some embodiments, the count of the one or more first reference images of the current image may be equal to 1. In some embodiments, the count of the one or more first reference images of the current image may exceed 1, for example, 2, 3, 4, etc.

In some embodiments, the processing device 112 may determine the one or more first reference images from one or more reference image lists of the current image. For example, the processing device 112 may designate one single reference image (i.e., frame) or some reference images (i.e., frames) in the reference image lists of the current image as the first reference images. As a further example, the reference image lists of the current image may include list0 and list1, and the processing device 112 may designate the reference images with index=1 and/or index=3 in the reference image lists (list0 and list1) as the first reference images. As another example, the processing device 112 may determine i images that are arranged in the top of the list0 and determine j images that are arranged in the top of the list 1 as the first reference images. The sum of i and j may exceed 1.

In some embodiments, the processing device 112 may determine the one or more first reference images of the current image based on multiple candidate reference images of image blocks that have been inter-frame encoded (also referred to as encoded images). The processing device 112 may designate at least one of the multiple candidate reference images of the encoded image blocks as a portion of the one or more first reference images of the current image. A frequency of the at least one of the multiple reference images used for the inter-frame prediction of the multiple image blocks may a condition. For example, the processing device 112 may determine the count of encoded image blocks that use each of the multiple candidate reference images for inter-frame encoding, and determine s reference images from the multiple reference images that correspond to the higher counts of encoded image blocks. In some embodiments, the processing device 112 may select the encoded image blocks from the candidate image blocks of the current coding unit determined as described in operation 1204. If the counts of encoded image blocks that use at least two of the candidate reference images are the same, the processing device 112 may determine the first reference image from the at least two of the candidate reference images according to the searching order of the candidate image blocks. For example, if the counts of encoded image blocks that use three candidate reference images are the same, the processing device 112 may compare these candidate image blocks corresponding to the three candidate reference images, and determine the first reference image from three candidate reference images that corresponds to a candidate image block with the highest priority in the searching order.

In some embodiments, the processing device 112 may search the candidate image blocks of the current coding unit according to a searching order and determine the one or more reference images of the first s candidate image blocks that have been inter-frame encoded as the first images of the image. The searching order may be as described in connection to operation 1204.

In 1304, the processing device 112 (e.g., the MV determination module 1106) may obtain a second reference image of each of one or more co-located images of the current image.

The one or more co-located images of the current image may be acquired as described in connection with operation 1206.

The processing device 112 may obtain the second reference image of each of the one or more co-located images of the current image from a storage device (e.g., the storage device 150, the storage module 1110, etc.)

In 1306, the processing device 112 (e.g., the MV determination module 1106) may obtain one or more MVs (also referred to as first MVs) of one or more co-located blocks in each of the one or more co-located images of the current image. Each of the one or more co-located blocks in each of the one or more co-located images may correspond to a time-domain block of a current coding unit in the current image. A time-domain block in the current coding unit may correspond to one or more co-located blocks that are located in the one or more co-located images. In some embodiments, the time-domain block may be determined as described in connection with operation 1204 as described in FIG. 12. The one or more co-located blocks may be determined as described in connection with operation 1208.

In 1308, for each MV of a co-located block, the processing device 112 (e.g., the MV determination module 1106) may determine, based on a first distance between the current image and each of the one or more first reference images and a second distance between the co-located image including the co-located block and the second reference image of the co-located image, one or more MVs (also referred to as second MVs) of the current coding unit.

In some embodiments, for a first MV of a co-located block in a co-located image, the processing device 112 may scale the first MV of the co-located block in the co-located image based on the first distance between the current image and each of the one or more first reference images and the second distance between the co-located image and the second reference image. For example, the processing device 112 may determine a scaled coefficient based on the first distance between the current image and each of the one or more first reference images and the second distance between the co-located image and the second reference image. The processing device 112 may determine one or more scaled coefficients each of which is of the first distance between the current image and each of the one or more first reference images. The processing device 112 may determine one or more scaled first MVs of the co-located block based on the one or more scaled coefficients. The processing device 112 may designate the one or more scaled first MVs of the co-located block as one or more second MVs of the current coding unit.

In some embodiments, the processing device 112 may determine a scaled first MV of a co-located block according to Equation (2):

$$curMV=(td/tb)*colMV \qquad (2)$$

where curMV denotes a second MV of the current coding unit (i.e., scaled first MV of a co-located block), colMV denotes a first MV of the co-located block, td refers to the first distance between the current image and a first reference image, and tb refers to a second distance between a co-located image including the co-located block and the second reference image of the co-located image.

In some embodiments, for a time-domain block, the processing device 112 may adjust the second MVs of the current coding unit by changing the parameters td, tb, and/or colMV. The processing device 112 may obtain different curMVs by selecting different co-located images, reference images, and co-located blocks.

For example, if the count of the co-located images is m, the count of the time-domain blocks is n, the count of the first reference images of the image is q, for each of the time-domain blocks, the processing device 112 may determine m*q scaled coefficients. The processing device 112 may determine m*m*q scaled MVs.

Figure 16:
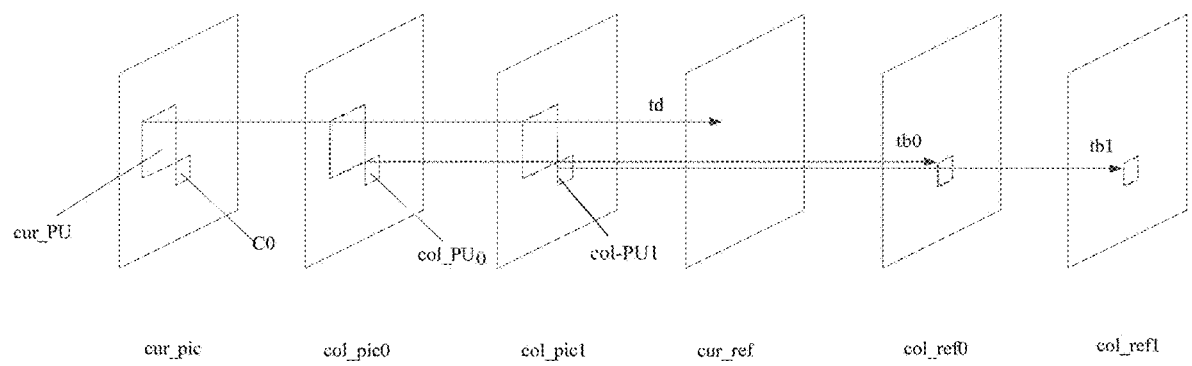
FIG. 16 shows a diagram for determining MVs of a current coding unit in an image based on two co-located images of the image and one single first reference image of the image according to some embodiments of the presents.

For example, FIG. 16 shows a diagram for determining MVs of a current coding unit in an image based on two co-located images of the image and one single first reference image of the image according to some embodiments of the presents. As shown in FIG. 16, cur_PU represents the current coding unit in the image cur_pic, col_pic0 and col_pic1 are co-located images of the current image cur_pic, col_PU0 and col_PU1 represents two co-located blocks of a time-domain block C0 in co-located images col_pic0 and col_pic1, respectively, cur_ref refers to the first reference image of the current image, col_ref0 represents the second reference image of the co-located image col_pic0, and col_ref1 refers to the second reference image of the co-located image col_pic1. td represents the first distance between the current image (cur_pic) and the first reference image (cur_ref) of the current image, tb0 represents the second distance between the co-located image (col_pic0) and the second reference image (col_ref0) of the co-located image (col_pic0), tb1 represents the second distance between the co-located image (col_pic1) and the reference image (col_ref1) of the co-located image (col_pic1). The processing device 112 may obtain first MVs of the two co-located blocks col_PU0 and col_PU1 of the time-domain block C0. The second reference images of the two co-located images may be the col_ref0 and col_ref1, respectively and the two scaled coefficients may be (td/tb0) and (td/tb1), respectively. The processing device 112 may obtain two scaled first MV (curMV0 and curMV1) of the two co-located blocks col_PU0 and col_PU1. The processing device 112 may designate the two first scaled MV (curMV0 and curMV1) as the second MVs of the current coding unit (also referred to time-domain MVs of the current coding unit). The two first scaled MV (curMV0 and curMV1) may be described in the following Equations (3)-(4):

$$curMV0=(td/tb0)*colMV0 \qquad (3)$$

$$curMV1=(td/tb1)*colMV1 \qquad (4)$$

Figure 17:
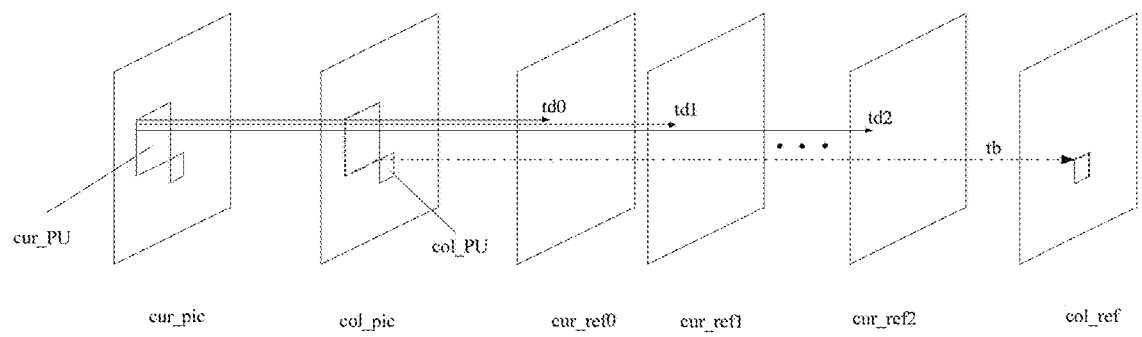
FIG. 17 shows a diagram for determining MVs of a current coding unit in an image based on one single co-located image of the image and three first reference images of the image according to some embodiments of the presents.

As another example, FIG. 17 shows a diagram for determining MVs of a current coding unit in an image based on one single co-located image of the image and three first reference images of the image according to some embodiments of the presents. As shown in FIG. 17, cur_PU represents the current coding unit in the image cur_pic, col_pic is a co-located image of the current image cur_pic, col_PU represent a co-located block of a time-domain block C0 in the co-located image col_pic, cur_ref0, cur_ref1, and cur_ref2 refer to three first reference images of the current image, and col_ref represents the second reference image of the co-located image col_pic. td0 represents a first distance between the current image (cur_pic) and the first reference image (cur_ref0) of the current image, td1 represents a first distance between the current image (cur_pic) and the first reference image (cur_ref1) of the current image, td2 represents a first distance between the current image (cur_pic) and the first reference image (cur_ref2) of the current image, and tb represents the second distance between the co-located image (col_pic) and the second reference image (col_ref) of the co-located image (col_pic). The processing device 112 may obtain a first MV of the co-located block col_PU. The three first reference images may correspond to three scaled coefficients (td0/tb), (td1/tb), and (td2/tb). The processing device 112 may obtain three first scaled MVs (curMV0, curMV1, and curMV2) of the co-located block col_PU. The processing device 112 may designate the three first scaled MVs (curMV0, curMV1, and curMV2) as the second MVs of the current coding unit (also referred to time-domain MVs of the current coding unit). The three first scaled MV (curMV0 and curMV1) may be described in the following Equations (5)-(7):

$$curMV0=(td0/tb)*colMV \qquad (5)$$

$$curMV1=(td1/tb1)*colMV \qquad (6)$$

$$curMV1=(td1/tb1)*colMV \qquad (7)$$

Figure 18:
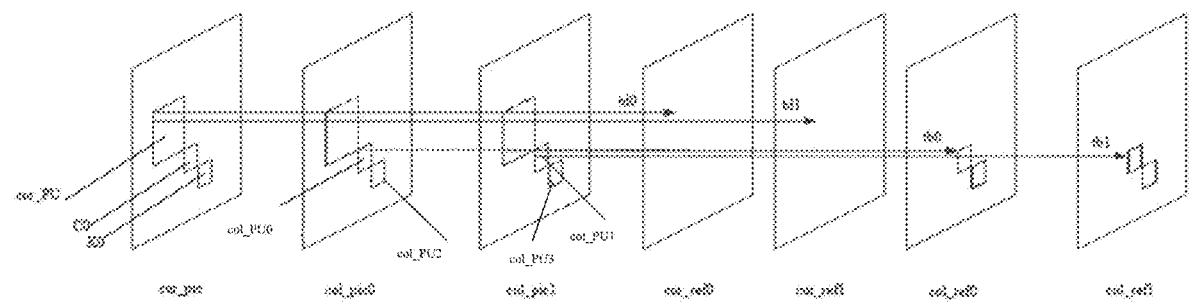
FIG. 18 shows a diagram for determining MVs of a current coding unit in an image based on two co-located images of the image and two first reference images of the image according to some embodiments of the presents.

As another example, FIG. 18 shows a diagram for determining MVs of a current coding unit in an image based on two co-located images of the image and two first reference images of the image according to some embodiments of the presents. As shown in FIG. 17, cur_PU represents the current coding unit in the image cur_pic, col_pic0 and col_pic1 are two co-located images of the current image cur_pic, col_PU0 represent a co-located block of a time-domain block C0 in the co-located image col_pic0, col_PU1 represent a co-located block of the time-domain block C0 in the co-located image col_pic1, col_PU2 represent a co-located block of a time-domain block K0 in the co-located image col_pic0, col_PU3 represent a co-located block of THE time-domain block K0 in the co-located image col_pic1, cur_ref0, and cur_ref1 refer to two first reference images of the current image, and col_ref0 and col_ref1 represent the second reference images of the co-located images col_pic0 and col_pic1, respectively. td0 represents a first distance between the current image (cur_pic) and the first reference image (cur_ref0) of the current image, td1 represents a first distance between the current image (cur_pic) and the first reference image (cur_ref1) of the current image, tb0 represents a second distance between the co-located image (col_pic0) and the second reference image (col_ref0) of the co-located image (col_pic0), and tb0 represents a second distance between the co-located image (col_pic1) and the second reference image (col_ref1) of the co-located image (col_pic1).

For the time-domain C0, the processing device 112 may obtain two first MVs of the co-located blocks col_PU0 and col_PU1. The two first reference images and two co-located images may correspond to four scaled coefficients (td0/tb0), (td1/tb0), (td0/tb1), and (td1/tb1). The processing device 112 may obtain four first scaled MVs (curMV0, curMV1, curMV2, and curMV3) of the co-located blocks col_PU0 and col_PU1. The four first scaled MVs (curMV0, curMV1, curMV2, and curMV3) may be described in the following Equations (8)-(11):

$$curMV0=(td0/tb0)*colMV0 \quad (8)$$

$$curMV1=(td1/tb0)*colMV0 \quad (9)$$

$$curMV2=(td0/tb1)*colMV1 \quad (10)$$

$$curMV3=(td1/tb1)*colMV1 \quad (11)$$

Where colMV0 refers to the first MV of the co-located block col_PU0 and colMV1 refers to the first MV of the co-located blocks col_PUL The processing device 112 may determine four scaled MVs of the co-located blocks col_PU2 and col_PU3 for the time-domain block k0 as similar to the time-domain block C0.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

Figure 19:
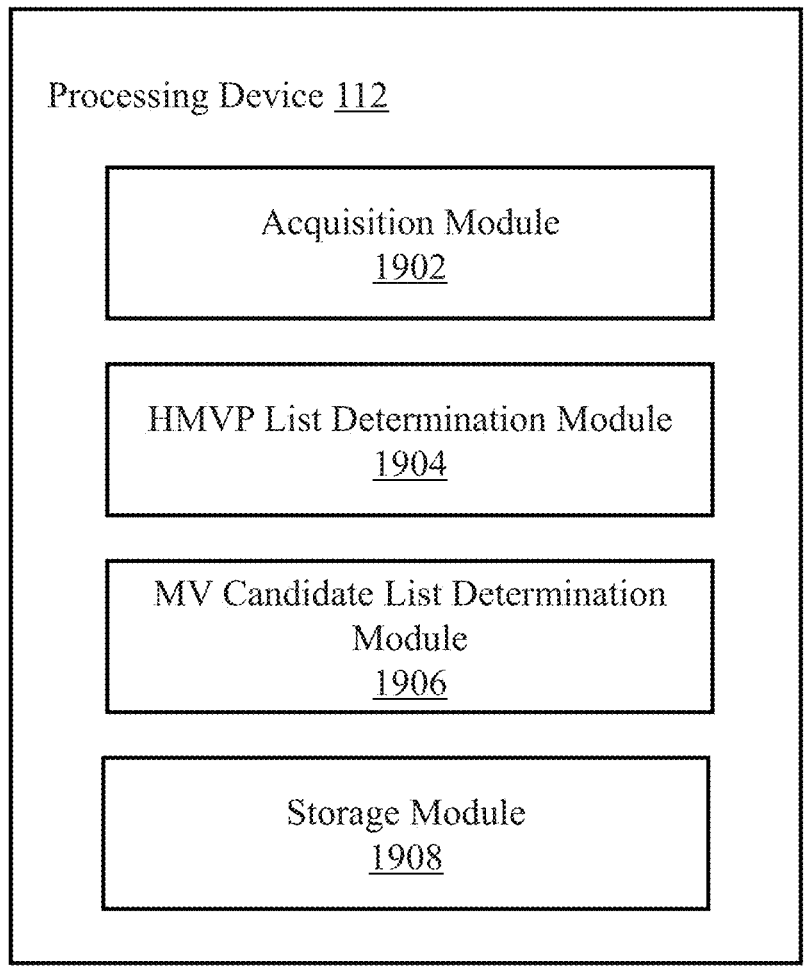
FIG. 19 is a block diagram illustrating an exemplary processing device according to some embodiments of the present disclosure.

FIG. 19 is a block diagram illustrating an exemplary processing device according to some embodiments of the present disclosure. As illustrated in FIG. 19, the processing device 112 may include an acquisition module 1902, an HMVP list determination module 1904, an MV candidate list determination module 1906, and a storage module 1908. In some embodiments, the processing device 1100 may also include a prediction module (not shown in FIG. 19). In some embodiments, the acquisition module 1902, the HMVP list determination module 1904, the MV candidate list determination module 1906, and the storage module 1908 may be connected to and/or communicate with each other via a wireless connection (e.g., a network), a wired connection, or a combination thereof.

The acquisition module 1902 may be similar to or same as the acquisition module 402. For example, the acquisition module 1902 may be configured to obtain a current coding unit in a current image.

The HMVP list determination module 1904 may be configured to determine a first motion vector (MV) candidate list, the first MV candidate list including a plurality of MVs of first image blocks that have been encoded.

In some embodiments, the first MV candidate list may also be referred to as a historical motion vector prediction (HMVP) list. The plurality of MVs of the first image blocks may also be referred to as MVPs or historical MVPs (HMVPs) of the first image blocks. Each of the plurality of MVs may correspond to one of the first image blocks. An HMVP may have been used to encode the corresponding first image block. The first image blocks may be in the same coding tree unit (CTU) as the current coding unit. A reference image of each of the first image blocks may be the same as or different from a reference image of the current coding unit.

When a new image block in the CTU is encoded, the HMVP list determination module 1904 may update the first MV candidate list using the MVP of the new image block that is used to encode the new image block. If the MVP of the new image block is same as a specific HMVP in the first MV candidate list, the HMVP list determination module 1904 may remove the specific HMVP from the first MV candidate list and add the MVP of the new image block at the end of the first MV candidate list; if the MVP of the new image block is different from the specific HMVP in the first MV candidate list, the HMVP list determination module 1904 may remove an HMVP arranged at the first of the first MV candidate list and add the MVP of the new image block at the end of the first MV candidate list.

In some embodiments, the HMVP list determination module 1904 may determine a temporary HMVP list of a current coding unit under an IBC mode and adjust locations of the one or more MVs in the temporary HMVP list to obtain an HMVP list.

The MV candidate list determination module 1906 may be configured to determine, based on the first MV candidate list, a second MV candidate list of the current coding unit corresponding to the prediction mode.

In some embodiments, the MV candidate list determination module 1906 may determine, from the plurality of MVs in the first MV candidate list, one or more first MVs of one or more first image blocks according to a first order.

In some embodiments, at least one of the one or more first image blocks that corresponds to one of the one or more first MVs may have a reference image different from a reference image of the current coding unit. In some embodiments, at least one of the one or more first image blocks that corresponds to one of the one or more first MVs may have a reference image the same as the reference image of the current coding unit.

In some embodiments, the first order may include a positive order or a reverse order. For example, in the positive order, the processing device 112 may select the one or more first MVs from the first MV candidate list from the front to the back in sequence; in the reverse order, the processing device 112 may select the one or more first MVs from the first MV candidate list from the back to the front. As another example, in the positive order, the processing device 112 may determine the one or more first MVs that are arranged in the top portion of the first MV candidate list; in the reverse order, the processing device 112 may determine the one or more first MVs that are arranged in the bottom portion of the first MV candidate list.

In some embodiments, the first order may be random.

In some embodiments, the MV candidate list determination module 1906 may determine, based at least in part on the one or more first MVs and a second order, the second MV candidate list of the current coding unit corresponding to the prediction mode.

In some embodiments, the MV candidate list determination module 1906 may perform a scaling operation on a first MV that is an asynchronous MV to obtain a scaled first MV. The MV candidate list determination module 1906 may determine the second MV candidate list based on the scaled first MV.

In some embodiments, the MV candidate list determination module 1906 may determine at least a portion of second MVs in a preliminary second MV candidate list. The MV candidate list determination module 1906 may compare each of the one or more first MVs (first scaled MVs) with each of the at least a portion of the second MVs. If a first MV (or first scaled MV) is different from each of the at least a portion of the second MVs, the first MV (or first scaled MV) may be added into the preliminary second MV candidate list according to the second order to obtain the second MV candidate list. As used herein, the at least a portion of the second MVs in the second MV candidate list that are used to be compared with the first MVs may also be referred to as third MVs. More descriptions for determining the third MVs and the second MV candidate list based on the first MVs may be found elsewhere in the present disclosure (e.g., FIG. 22 and the descriptions thereof).

The storage module 1908 may be configured to store data generated during any process performed by any component in the processing device 112. For example, the storage module may store the MVs, the HMVP list, the second MV candidate list, etc.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

FIG. 20 is a flowchart illustrating an exemplary process for determining an MV candidate list according to some embodiments of the present application. In some embodiments, the process 2000 may be implemented as a set of instructions (e.g., an application) stored in the storage ROM 230 or RAM 240. The processor 220, and/or the modules and/or the units in FIG. 4 may execute the set of instructions, and when executing the instructions, the processor 220, and/or the modules and/or the units may be configured to perform the process 2000. The operations of the illustrated process presented below are intended to be illustrative. In some embodiments, the process 2000 may be accomplished with one or more additional operations not described and/or without one or more of the operations herein discussed. Additionally, the order in which the operations of the process as illustrated in FIG. 20 and described below is not intended to be limiting.

In 2002, the processing device 112 (e.g., the acquisition module 1902) may obtain a current coding unit in an image.

More descriptions for the current coding unit and/or the image may be found elsewhere in the present disclosure (e.g., FIG. 1 and FIG. 5, and the descriptions thereof).

In 2004, the processing device 112 (e.g., the HMVP list determination module 1904) may determine a first motion vector (MV) candidate list, the first MV candidate list including a plurality of MVs of first image blocks that have been encoded.

In some embodiments, the first MV candidate list may also be referred to as a historical motion vector prediction (HMVP) list. The plurality of MVs of the first image blocks may also be referred to as MVPs or historical MVPs (HMVPs) of the first image blocks. Each of the plurality of MVs may correspond to one of the first image blocks. An HMVP may have been used to encode the corresponding first image block. The first image blocks may be in the same coding tree unit (CTU) as the current coding unit. A reference image of each of the first image blocks may be the same as or different from a reference image of the current coding unit.

When a new image block in the CTU is encoded, the processing device 112 may update the first MV candidate list using the MVP of the new image block that is used to encode the new image block. If the MVP of the new image block is same as a specific HMVP in the first MV candidate list, the processing device 112 may remove the specific HMVP from the first MV candidate list and add the MVP of the new image block at the end of the first MV candidate list; if the MVP of the new image block is different from the specific HMVP in the first MV candidate list, the processing device 112 may remove an HMVP arranged at the first of the first MV candidate list and add the MVP of the new image block at the end of the first MV candidate list.

Figure 23A:
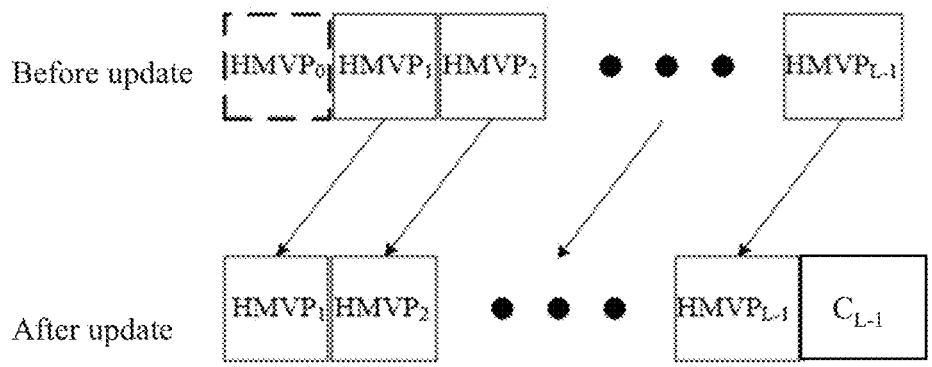
FIG. 23A and FIG. 23B show diagrams illustrating the determination of the first MV candidate list according to some embodiments of the present disclosure.

For example, FIG. 23A shows a diagram illustrating the determination of the first MV candidate list according to some embodiments of the present disclosure. As shown in FIG. 23A, before the update of the first MV candidate list, the first MV candidate list includes MVs, such as $HMVP_0$, $HMVP_1$, $HMVP_2$, ..., $HMVP_{L-1}$. An MVP ($C_{L-1}$) may be used to update the first MV candidate list that is different from the MVs in the first MV candidate list. The new MVP ($C_{L-1}$) is added to the end of the first MV candidate list and the $HMVP_0$ arranged at the first of the first MV candidate list is removed. The order of the $HMVP_1$, $HMVP_2$, ..., $HMVP_{L-1}$ are updated synchronously.

Figure 23B:
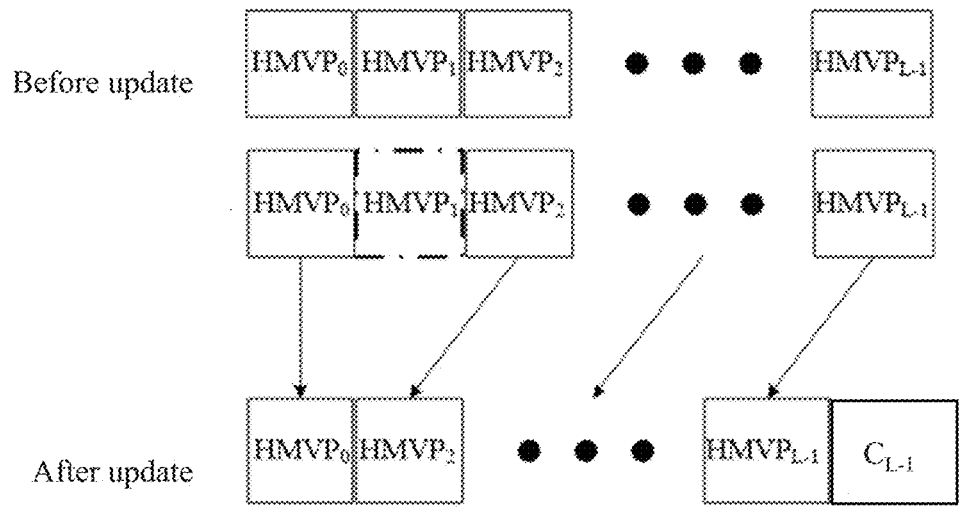

As another example, FIG. 23B shows a diagram illustrating the determination of the first MV candidate list according to some embodiments of the present disclosure. As shown in FIG. 23B, before the update of the first MV candidate list, the first MV candidate list includes MVs, such as $HMVP_0$, $HMVP_1$, $HMVP_2$, ..., $HMVP_{L-1}$. An MVP ($C_{L-1}$) may be used to update the first MV candidate list that is the same as $HMVP_1$ in the first MV candidate list. The new MVP ($C_{L-1}$) is added to the end of the first MV candidate list and the $HMVP_1$ is removed from the first MV candidate list. The order of the $HMVP_2$, ..., $HMVP_{L-1}$ are updated synchronously.

In some embodiments, the first MV candidate list may be determined based on a prediction mode of the current coding unit. Exemplary prediction modes may include a conventional merge mode, a conventional AMVP mode, an IBC merge mode, an IBC AMVP mode, an affine merge mode, an affine AMVP mode, etc. In some embodiments, the first MV candidate list may store the plurality of HMVPs of the first image blocks that have been encoded before the current coding unit as a lookup table. The size of the lookup table may be equal to the count of the plurality of HMVPs in the first MV candidate list. For different prediction modes, the count of the plurality of HMVPs in the first MV candidate list may be different. For example, using the conventional merge mode, the size of the lookup table may be 6; using the conventional AMVP mode, the size of the lookup table may be 2; using the affine merge mode, the size of the lookup table may be 5; using the affine AMVP mode, the size of the lookup table may be 2; using the IBC merge mode, the size of the lookup table may be 6; using the IBC AMVP mode, the size of the lookup table may be 2. The order of the plurality of HMVPs arranged in the first MV candidate list may be the same as the encoding order of the first image blocks.

In some embodiments, if the current coding unit is encoded based on the conventional merge mode or conventional AVMP mode, the plurality of HMVPs in the first MV candidate list may be of the first image blocks that are encoded based on the conventional merge mode and/or conventional AVMP mode.

In some embodiments, if the height and the width of the current coding unit both exceed 8, the prediction mode of the current coding unit may be the affine mode (e.g., the affine merge mode or the affine AMVP mode). Using the affine mode, the current coding unit may be divided into multiple sub-units with the same size. Each of the multiple sub-units may correspond to different MVs for encoding. If the prediction mode of the current coding unit includes the affine merge mode or the affine AMVP mode, the first MV candidate list may include the plurality of HMVPs of the first image blocks that are encoded based on the affine merge mode and/or the affine AMVP mode. The first MV candidate list may also be referred to as an affine HMVP list. In the affine HMVP list, each HMVP may include three MVs corresponding to three control points or two control points (CP). The MV corresponding to each control point may also be referred to as a CPMV. The first MV candidate list may also be referred to as a CPMV candidate list. If a first image block includes two control points, the three CPMVs of an HMVP corresponding to the first image block in the affine HMVP list may include zero. For example, FIGS. 25A-25B show diagrams illustrating the affine mode according to some embodiments of the present disclosure. The current coding unit is divided into 16 sub-units. The three CPs include V0, V1, and V2. The MVs of the three CPs are MV0, MV1, and MV2, respectively. The MV of each sub-units may be obtained based on a weighting of MV0, MV1, and MV2 of three control points (CP).

In some embodiments, the prediction mode of the current coding unit may include the IBC mode (e.g., the IBC merge mode or the IBC AMVP mode). The processing device 112 may determine the first MV candidate list based on a temporary HMVP list. More descriptions for determining the first MV candidate list under the IBC mode may be found in FIG. 21 and the descriptions thereof.

In 2006, the processing device 112 (e.g., the MV candidate list determination module 1906) may determine, from the plurality of MVs in the first MV candidate list, one or more first MVs of one or more first image blocks according to a first order.

In some embodiments, at least one of the one or more first image blocks that corresponds to one of the one or more first MVs may have a reference image different from a reference image of the current coding unit. As used herein, an MV (or HMVP) of a first image block in the first MV candidate list that has a different reference image from the reference image of the current coding unit may also be referred to as an asynchronous MV. In some embodiments, at least one of the one or more first image blocks that corresponds to one of the one or more first MVs may have a reference image the same as the reference image of the current coding unit. As used herein, an MV (or HMVP) of a first image block in the first MV candidate list that has the same reference image as the current coding unit may also be referred to as a synchronous MV.

In some embodiments, the one or more first MVs may include at least one asynchronous MV. Specially, each of the one or more first MVs may include an asynchronous MV. The one or more first MVs may include at least one synchronous MV. Specially, each of the one or more first MVs may include a synchronous MV.

The count of the one or more first MVs may be determined based on the prediction mode of the current coding unit. For example, using the merge mode, the MV candidate list (i.e., the second MV candidate list as described in operation 2008) of the current coding unit may include 6 MVs. The count of the one or more first MVs may be less than 6. As another example, using the AMVP mode, the MV candidate list (i.e., the second MV candidate list as described in operation 2008) of the current coding unit may include 2 MVs. The count of the one or more first MVs may be less than 2.

In some embodiments, the first order may include a positive order or a reverse order. For example, in the positive order, the processing device 112 may select the one or more first MVs from the first MV candidate list from the front to the back in sequence; in the reverse order, the processing device 112 may select the one or more first MVs from the first MV candidate list from the back to the front. As another example, in the positive order, the processing device 112 may determine the one or more first MVs that are arranged in the top portion of the first MV candidate list; in the reverse order, the processing device 112 may determine the one or more first MVs that are arranged in the bottom portion of the first MV candidate list.

In some embodiments, the first order may be a random order. The processing device 112 may randomly select the one or more first MVs from the first MV candidate list.

In 2008, the processing device 112 (e.g., the MV candidate list determination module 1906) may determine, based at least in part on the one or more first MVs and a second order, a second MV candidate list of the current coding unit corresponding to the prediction mode.

In some embodiments, the processing device 112 may perform a scaling operation on a first MV that is an asynchronous MV to obtain a scaled first MV. The processing device 112 may determine the second MV candidate list based on the scaled first MV. In some embodiments, the processing device 112 may perform the scaling operation on a first MV by multiplying the first MV with a scaling coefficient.

In some embodiments, the scaling coefficient may be determined based on a distance (ta) between the image and the reference image of the image corresponding to the current coding unit and a distance (tb) between the image and a reference image of the first image block corresponding to the first MV. For example, the scaled first MV may be determined according to Equation (12) as follows:

$$\text{scale}HMVP = (ta/tb) * HMVP, \qquad (12)$$

where HMVP refers to a first MV that is an asynchronous MV, and scaleHMVP refers to a scaled first MV of the first MV.

In some embodiments, the scaling coefficient may be set by a user or according to a default setting of the image coding system 100. For example, the scaling coefficient may be constant.

In some embodiments, if the one or more first MVs are both synchronous MVs, the processing device 112 may not perform the scaling operation on the one or more first MVs. In some embodiments, if the one or more first MVs include one or more asynchronous MVs, the processing device 112 may perform the scaling operation on each of the one or more asynchronous MVs in the first MVs, which may improve the accuracy of prediction.

In some embodiments, the processing device 112 may obtain a preliminary second MV candidate list including one or more second MVs. The one or more second MVs may include one or more spatial domain MVs and/or one or more time-domain MVs determined as described elsewhere in the present disclosure (e.g., FIG. 5 and FIG. 12, and the descriptions thereof). In some embodiments, the spatial domain MVs may include MVs of spatial domain blocks and/or evolution MVs of the MVs of spatial domain blocks. The evolution MV of an MV of a spatial domain block may be determined based on the MV of the spatial domain block based on a transform operation. For example, under an affine mode (e.g., the affine merge mode or the affine AMVP mode), the processing device 112 may perform an affine transform operation on the MV of the spatial domain block to obtain an evolution MV.

In some embodiments, the processing device 112 may add the one or more first MVs (or scaled first MVs) into the preliminary second MV candidate list according to the second order to obtain the second MV candidate list. In some embodiments, the second order may be the same as the first order. In other words, the order that the first MVs are selected from the first MV candidate list may be the same as the order that the first MVs are added into the preliminary second MV candidate list. For example, if the first MVs include $HMVP_0$, $HMVP_1$, $HMVP_2$ that are selected from the first MV candidate list in the first order of $HMVP_0$-$HMVP_1$-$HMVP_2$, the $HMVP_0$ (or scaled $HMVP_0$), $HMVP_1$ (or scaled $HMVP_1$), $HMVP_2$ (or scaled $HMVP_2$) may be added into the preliminary second MV candidate list in the second order of $HMVP_0$-$HMVP_1$-$HMVP_2$.

In some embodiments, the second order may be different from the first order. For example, the processing device 112 may add the synchronous MVs in the first MVs before the asynchronous MVs in the first MVs. For example, if the first MVs include $HMVP_0$, $HMVP_1$, $HMVP_2$ that are selected from the first MV candidate list in the first order of $HMVP_0$-$HMVP_1$-$HMVP_2$. $HMVP_0$ and $HMVP_1$ may be asynchronous MVs. The processing device 112 may scale the asynchronous $HMVP_0$ and $HMVP_1$ to obtain scaled $HMVP_0$ and scaled $HMVP_1$. The scaled $HMVP_0$, scaled $HMVP_1$, and $HMVP_2$ may be added into the preliminary second MV candidate list in the second order of $HMVP_2$-scaled $HMVP_0$-scaled $HMVP_1$ to obtain the second MV candidate list. As used herein, the second order may indicate the order of the first MVs (or scaled first MVs) arranged in the second MV candidate list.

In some embodiments, the processing device 112 may determine at least a portion of the second MVs in the preliminary second MV candidate list. The processing device 112 may compare each of the one or more first MVs (first scaled MVs) with each of the at least a portion of the second MVs. If a first MV (or first scaled MV) is different from each of the at least a portion of the second MVs, the first MV (or first scaled MV) may be added into the preliminary second MV candidate list according to the second order to obtain the second MV candidate list. As used herein, the at least a portion of the second MVs in the second MV candidate list that are determined to be compared with the first MVs may also be referred to as third MVs. More descriptions for determining the third MVs and the second MV candidate list based on the first MVs may be found elsewhere in the present disclosure (e.g., FIG. 22 and the descriptions thereof).

In some embodiments, the processing device 112 may determine the second MV candidate list by adding average MVs and/or 0MVs into the preliminary second MV candidate list as described elsewhere in the present disclosure (e.g., FIG. 5 and the descriptions thereof).

In some embodiments, the processing device 112 (e.g., the prediction module 410) may determine, based on the second MV candidate list, a prediction result of the current coding unit.

The prediction result of the current coding unit may include a prediction direction of the current coding unit, a reference index of the current coding unit, a motion vector prediction (MVP) of the current coding unit, a motion vector difference (MVD), a residual error associated with the current coding unit, etc.

In some embodiments, the processing device 112 may determine the prediction result based on an inter-frame prediction mode. In some embodiments, the inter-frame prediction mode may include the AMVP mode, the merge mode, etc. In some embodiments, the inter-frame prediction mode may include a conventional mode, an affined mode, an intra block copy (IBC) mode. For example, the inter-frame prediction mode may include the conventional merge mode, the conventional AMVP mode, the affine merge mode, the affine AMVP mode, the IBC merge mode, the IBC AMVP mode, etc.

In some embodiments, using the AMVP mode, the processing device 112 may determine an MV from the second MV candidate list as the motion vector prediction (MVP) of the current coding unit. The processing device 112 may determine a motion estimation of the current coding unit. For example, the processing device 112 may determine a matched image block of the current coding unit from the one or more first reference image of the image. The processing device 112 may determine an actual MV of the current coding unit by determining a difference between coordinates of the current coding unit and coordinates of the matched image block. The processing device 112 may determine the MVD between the actual MV and the MVP.

In some embodiments, using the merge mode, the processing device 112 may determine an MV from the second MV candidate list and designate the MV as the MV of the current coding unit.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, operations 2006 and 2008 may be integrated into one single operation.

FIG. 21 is a flowchart illustrating an exemplary process for determining an MV candidate list according to some embodiments of the present application. In some embodiments, the process 2100 may be implemented as a set of instructions (e.g., an application) stored in the storage ROM 230 or RAM 240. The processor 220, and/or the modules and/or the units in FIG. 4 may execute the set of instructions, and when executing the instructions, the processor 220, and/or the modules and/or the units may be configured to perform the process 2100. The operations of the illustrated process presented below are intended to be illustrative. In some embodiments, the process 2100 may be accomplished with one or more additional operations not described and/or without one or more of the operations herein discussed. Additionally, the order in which the operations of the process as illustrated in FIG. 21 and described below is not intended to be limiting. Operation 2004 may be performed according to process 2100 as illustrated in FIG. 21.

Figure 26A:
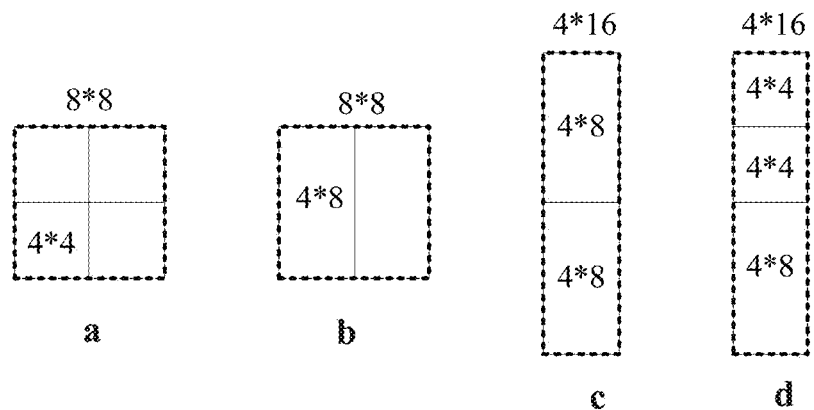
FIG. 26A shows exemplary sharing regions under different division modes according to some embodiments of the present disclosure.

Process 2100 may be used to an HMVP list of a current coding unit under an IBC mode (e.g., the IBC merge mode or the IBC AMVP mode). Using the IBC mode, a sharing region of multiple coding units in an image may be determined based on a size threshold (e.g., 64). The size threshold may be used to define a count of pixels in the sharing region. For example, FIG. 26A shows exemplary sharing regions under different division modes according to some embodiments of the present disclosure. As shown in FIG. 26A, each of the sharing regions a, b, c, and d includes 64 pixels. The sharing region includes four coding units each of which includes a size of 4*4. The sharing region b includes two coding units each of which includes a size of 4*8. The sharing region c includes two coding units each of which includes a size of 4*8. The sharing region d includes three coding units with sizes of 4*4, 4*4, and 4*8, respectively.

Using the IBC mode, coding units in the same sharing region may share an MV candidate list (e.g., the second MV candidate list as described in FIG. 20). An HMVP list for the coding units in the same sharing region may be the same, thus after coding units in the same sharing region are encoded, the HMVP list for the coding units in the same sharing region may be not updated. But one or more coding units in the same sharing region may be encoded based on a non-IBC mode. The HMVP list for a coding unit in the same sharing region that is encoded based on a non-IBC mode may be updated.

Figure 26B:
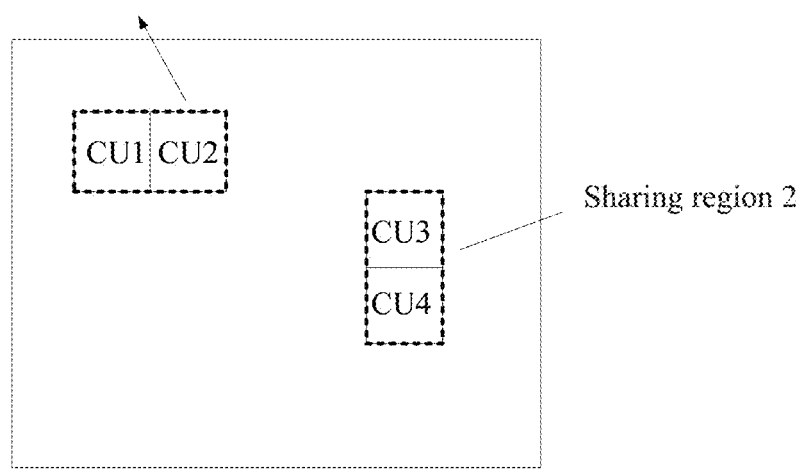
FIG. 26B shows a diagram illustrating a sharing region in an image according to some embodiments of the present disclosure.

In some embodiments, a temporary HMVP list may be determined by copying the HMVP list (also referred to as an original HMVP list) of a coding unit. The temporary HMVP list may be not updated, but the original HMVP list may be updated in the encoding process of coding units in the sharing region. For example, FIG. 26B shows a diagram illustrating a sharing region in an image according to some embodiments of the present disclosure. As shown in FIG. 26B, coding units CU1, CU2, CU3, and CU4 may be encoded based on the IBC mode. CU1 and CU2 may be in the sharing region 1 and CU3 and CU4 may be in the sharing region 2. When encoding the coding units in the sharing region 1, a temporary HMVP list1 may be obtained by copying the original HMVP list of the sharing region 1. CU1 and CU2 may use the temporary HMVP list1. After CU1 and CU2 are encoded, the MVs of CU1 and CU2 may be added into the original HMVP list to update the original HMVP list of the sharing region 1. When encoding the coding units in the sharing region 2, a temporary HMVP list2 may be obtained by copying the original HMVP list of the sharing region 2. CU3 and CU4 may use the temporary HMVP list2. After CU3 and CU4 are encoded, the MVs of CU3 and CU4 may be added into the original HMVP list to update the original HMVP list of sharing region 2.

When a sharing region is obtained based on different division modes, coding units in the sharing region generated based on different division modes may be in different sizes, and predicted results of the coding unit generated based on different division modes may be different. Therefore, an original HMVP list under the IBC mode may be saved. Each division mode of the sharing region may correspond to an original HMVP list and a temporary HMVP list, which are used to build an MV candidate list of the coding units in the sharing region under the IBC mode. The RDcosts corresponding to the division modes may be determined. A target original HMVP list and a target division mode may be determined based on the RDcosts. After determining the target original HMVP list and the target division mode, the processing device 112 may determine a target HMVP list for the current coding unit according to process 2100.

In 2102, the processing device 112 (e.g., the HMVP list determination module 1904) may determine a temporary HMVP list of a current coding unit under an IBC mode. The temporary HMVP list of the current coding unit may be generated by copy an original HMVP list (i.e., the target original HMVP list) of the current coding unit.

In 2104, the processing device 112 (e.g., the HMVP list determination module 1904) may adjust locations of the one or more MVs in the temporary HMVP list to obtain an HMVP list (i.e., the target HMVP list or the first MV candidate list as described in FIG. 20) of the current coding unit. MVs in the temporary HMVP list may also be referred to as HMVPs.

In some embodiments, the temporary HMVP list of the current coding unit may include a first portion of HMVPs of image blocks that are encoded based on the IBC mode and a second portion of HMVPs of image blocks that are encoded based on non-IBC modes.

In some embodiments, if the HMVPs of image blocks are added in the original HMVP list in the reverse order, HMVPs of image blocks that are encoded using the IBC mode may be moved to the front of the temporary HMVP list. In other words, the processing device 112 may determine the first portion of MVs of image blocks in the temporary HMVP list and move the first portion of MVs to the front of the second portion of MVs in the temporary HMVP list. The relative positions of MVs in the first portion may be unchanged. As used herein, the HMVPs of image blocks that are added in the original HMVP list in the reverse order may refer to that the HMVPs of image blocks may be arranged in the original HMVP list from the back to the front.

In one embodiment, if the HMVPs of image blocks are added in the original HMVP list in the positive order, HMVPs of image blocks that are encoded using the IBC mode may be moved to the back of the temporary HMVP list. In other words, the processing device 112 may determine the first portion of HMVPs of image blocks in the temporary HMVP list and move the first portion of HMVPs to the back of the temporary HMVP list. The relative positions of HMVPs in the first portion may be unchanged. As used herein, the HMVPs of image blocks being added in the original HMVP list in the positive order may refer to that the HMVPs of image blocks may be arranged in the original HMVP list from the front to the back.

In some embodiments, the processing device 112 may move the first portion of HMVPs in the temporary HMVP list to the back of the temporary HMVP list to obtain the HMVP list. When determining an MV candidate list (i.e., the second MV candidate list as described in FIG. 20) of the current coding unit based on the HMVP list, the second order as described in connection with operation 2008 in FIG. 20 may be in the positive order, i.e., the first portion of MVs may be arranged in the bottom portion of the MV candidate list.

In some embodiments, the processing device 112 may move the first portion of HMVPs in the temporary HMVP list to the front of the temporary HMVP list to obtain the HMVP list. When determining an MV candidate list (i.e., the second MV candidate list as described in FIG. 20) of the current coding unit based on the HMVP list, the second order as described in connection with operation 2008 in FIG. 20 may be in the reverse order, i.e., the first portion of MVs may be arranged in the bottom portion of the MV candidate list.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, process 2100 may further include determining an MV candidate list based on the HMVP list of the current coding unit.

FIG. 22 is a flowchart illustrating an exemplary process for determining an MV candidate list according to some embodiments of the present application. In some embodiments, the process 2200 may be implemented as a set of instructions (e.g., an application) stored in the storage ROM 230 or RAM 240. The processor 220, and/or the modules and/or the units in FIG. 4 may execute the set of instructions, and when executing the instructions, the processor 220, and/or the modules and/or the units may be configured to perform the process 2200. The operations of the illustrated process presented below are intended to be illustrative. In some embodiments, the process 2200 may be accomplished with one or more additional operations not described and/or without one or more of the operations herein discussed. Additionally, the order in which the operations of the process as illustrated in FIG. 20 and described below is not intended to be limiting. Operation 2008 may be performed according to process 2200 as illustrated in FIG. 22.

In 2202, the processing device 112 (e.g., the MV candidate list determination module 1906) may obtain one or more first MVs from a first MV candidate list and a preliminary second MV candidate list of a current coding unit, the preliminary second MV candidate list including one or more second MVs.

The one or more first MVs acquired from the first MV candidate list may be as described in connection with operations 2004 and 2006. For example, the first MC candidate list may include a plurality of HMVPs of a plurality of first image blocks that have been encoded. The first MVs may be obtained from the plurality of HMVPs in the first MV candidate list according to a first order as described in FIG. 20.

The one or more second MVs may include one or more spatial domain MVs and/or one or more time-domain MVs determined as described elsewhere in the present disclosure (e.g., FIG. 5 and FIG. 12, and the descriptions thereof). In some embodiments, the spatial domain MVs may include MVs of spatial domain blocks and/or evolution MVs of the MVs of spatial domain blocks. The evolution MV of an MV of a spatial domain block may be determined based on the MV of the spatial domain block based on a transform operation. For example, under an affine mode (e.g., the affine merge mode or the affine AMVP mode), the processing device 112 may perform an affine transform operation on the MV of the spatial domain block to obtain an evolution MV.

In 2204, the processing device 112 (e.g., the MV candidate list determination module 1906) may determine one or more third MVs from the preliminary second MV candidate list.

In some embodiments, the processing device 112 may determine randomly the one or more third MVs from the spatial domain MVs in the preliminary second MV candidate list.

In some embodiments, for each first MV, the processing device 112 may determine the one or more third MVs from the second MVs (e.g., the spatial domain MVs) in the preliminary second MV candidate list based on a position relationship between the current coding unit and a first image block corresponding to each first MV determined from the first MV candidate list.

In some embodiments, if the lower-right corner pixel of the first image block corresponding to the first MV is located on the upper-right of the current coding unit, the one or more third MVs may include a second MV (e.g., the spatial domain MV/evolution MV) of an image block including adjacent pixels of the upper-right corner pixel of the current coding unit; if the lower-right corner pixel of the first image block corresponding to the first MV is located on the lower-left of the current coding unit, the one or more third MVs may include a second MV (e.g., the spatial domain MV/evolution MV) of an image block including adjacent pixels at the left side of the lower-left corner pixel of the current coding unit; if the lower-right corner pixel of the first image block corresponding to the first MV is located on the left, upper-left or upper of the current coding unit, the one or more third MVs may include a second MV (e.g., the spatial domain MV/evolution MV) of an image block including adjacent pixels of the upper-right corner pixel of the current coding unit and a second MV (e.g., the spatial domain MV/evolution MV) of an image block including adjacent pixels located at the left side of the lower-left corner pixel of the current coding unit.

In some embodiments, if the lower-right corner pixel of the first image block corresponding to the first MV is located on the upper-right of the current coding unit, the one or more third MVs may include a second MV (e.g., the spatial domain MV/evolution MV) of an image block that are located at the upper of the current coding unit; if the lower-right corner pixel of the first image block corresponding to the first MV is located on the lower-left of the current coding unit, the one or more third MVs may include a second MV (e.g., the spatial domain MV/evolution MV) of an image block that is located at the left of the current coding unit; if the lower-right corner pixel of the first image block corresponding to the first MV is located on the left, upper-left or the upper of the current coding unit, the one or more third MVs may include a second MV (e.g., the spatial domain MV/evolution MV) of an image block that is located at the upper of the current coding unit and a second MV (e.g., the spatial domain MV/evolution MV) of an image block that is located at the left of the current coding unit.

Figure 24A:
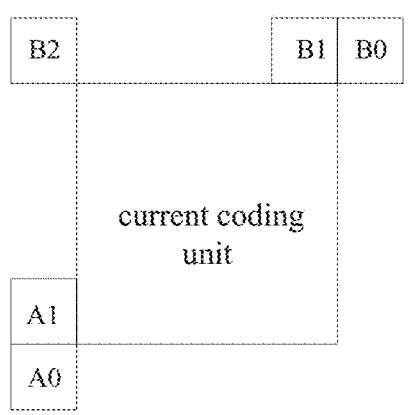
FIG. 24A and FIG. 24B show diagrams illustrating exemplary spatial domain blocks of a current coding unit according to some embodiments of the present disclosure.
Figure 24B:
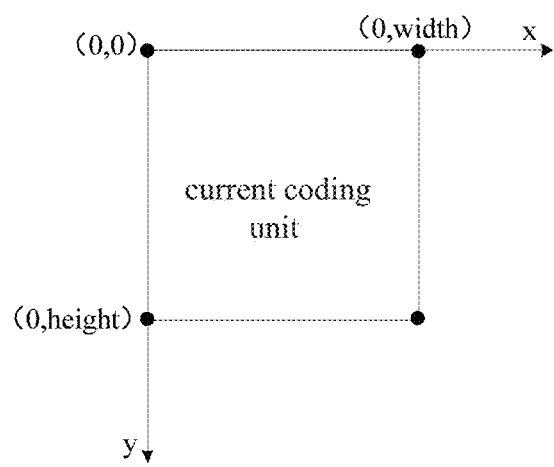

For example, FIG. 24A and FIG. 24B show diagrams illustrating exemplary spatial domain blocks of a current coding unit according to some embodiments of the present disclosure. As shown in FIG. 24A, the current coding unit may include 5 spatial domain blocks A0, A1, B0, B1, and B2 located at the left and upper of the current coding unit. The spatial MVs may include MVs or evolution MVs of the spatial domain blocks A0, A1, B0, B1, and B2. As shown in FIG. 24B, a coordinate system is established with the point at the upper-left corner (i.e., upper-left vertex) of the current coding unit as the origin. The coordinates of the upper-left corner of the current coding unit are (0,0), the positive direction of the X-axis points to the right, and the positive direction of the Y-axis points to the down.

In some embodiments, the processing device 112 may obtain coordinates of the bottom right vertex of a first image block corresponding to a first MV acquired from the first MV candidate list. If the abscissa of the lower-right vertex of the first image block is greater than a (0<a<width as shown in FIG. 24B), and the ordinate of the bottom right vertex of the first image block is less than 0 (i.e., the lower-right corner pixel of the first image block corresponding to the first MV is located at the upper-right of the current coding unit), the one or more third MVs may include a second MV (e.g., the spatial domain MV/evolution MV) of the image block B1 including adjacent pixels of the upper-right corner (or upper-right corner pixel) of the current coding unit. If the abscissa of the lower-right vertex of a first image block corresponding to a first MV acquired from the first MV candidate list is less than 0, the ordinate of the lower-right vertex of the first image block is greater than b (0<b<height as shown in FIG. 24B) (i.e., the lower-right corner pixel of the first image block corresponding to the first MV is located at the lower-left of the current coding unit), the one or more third MVs may include a second MV (e.g., the spatial domain MV/evolution MV) of the image block A1 including adjacent pixels on the lower-left vertex of the current coding unit. If the abscissa of the lower-right vertex of the first image block is greater than a (0<a<width as shown in FIG. 24B), and the ordinate of the bottom right vertex of the first image block is less than b (0<b<height as shown in FIG. 24B) (i.e., the lower-right corner pixel of the first image block corresponding to the first MV is located on the left, the upper, or the upper-left of the current coding unit), the one or more third MVs may include a second MV (e.g., the spatial domain MV/evolution MV) of the image block A1 including adjacent pixels on the lower-left vertex (or lower-left corner pixel) of the current coding unit and B1 including adjacent pixels of the upper-right vertex (or upper-right corner pixel) of the current coding unit. If there is no MV/evolution MV of spatial image block A1 or B1 in the preliminary second candidate list, no third MVs are determined.

In some embodiments, the processing device 112 may obtain coordinates of the lower-right vertex of a first image block corresponding to a first MV acquired from the first MV candidate list. If the abscissa of the lower-right vertex of the first image block is greater than a (0<a<width as shown in FIG. 24B), and the ordinate of the lower-right vertex of the first image block is less than 0 (i.e., the lower-right corner pixel of the first image block corresponding to the first MV is located on the upper-right of the current coding unit), the one or more third MVs may include one or more second MVs (e.g., the spatial domain MV/evolution MV) of the image blocks (e.g., B1 and B0) that are located at the upper of the current coding unit. If the abscissa of the lower-right vertex of a first image block corresponding to a first MV acquired from the first MV candidate list is less than 0, the ordinate of the lower-right vertex of the first image block is greater than b (0<b<height as shown in FIG. 24B) (i.e., the lower-right corner pixel of the first image block corresponding to the first MV is located on the lower-left of the current coding unit), the one or more third MVs may include one or more second MV s (e.g., the spatial domain MV/evolution MV) of the image blocks (e.g., A0 and A1) that are located on the left of the current coding unit. If the abscissa of the lower-right vertex of the first image block is greater than a (0<a<width as shown in FIG. 24B), and the ordinate of the bottom right vertex of the first image block is less than b (0<b<height as shown in FIG. 24B) (i.e., the lower-right corner pixel of the first image block corresponding to the first MV is located on the left, the upper, or the upper-left of the current coding unit), the one or more third MVs may include one or more second MV s (e.g., the spatial domain MV/evolution MV) of the image blocks (e.g., A1 and A0) that are located on the left of the current coding unit and one or more second MVs (e.g., the spatial domain MV/evolution MV) of the image blocks (e.g., B1 and B0) that are located at the upper of the current coding unit. If the preliminary second MV candidate list includes one or more second MVs (e.g., the spatial domain MV/evolution MV) of the image block B2, the one or more third MVs may include the one or more second MVs (e.g., the spatial domain MV/evolution MV) of the image block B2.

In 2206, the processing device 112 (e.g., the MV candidate list determination module 1906) may compare each of the one or more first MVs obtained from a first MV candidate list with each of the one or more third MVs to obtain a comparison result.

In 2208, the processing device 112 (e.g., the MV candidate list determination module 1906) may update the preliminary second MV candidate list to obtain a second MV candidate list based on the comparison result.

In some embodiments, if a first MV is different from each of the one or more third MVs, the processing device 112 may add the first MV into the preliminary second MV candidate list to update the preliminary second MV candidate list and obtain the second MV candidate list. If a first MV is the same as one of the one or more third MVs, the processing device 112 may not add the first MV into the preliminary second MV candidate list.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, operations 2206 and 2208 may be integrated into one single operation.

EXAMPLE

Example 1

A current coding unit may be encoded using the AMVP mode. According to process 2000 as described in FIG. 20, a first number of HMVPs may be determined from an HMVP list (i.e., the first MV candidate list as described in FIG. 20) in the reverse order. An asynchronous MV in the first number of HMVPs determined from the HMVP list may be scaled to obtain scaled asynchronous MV. The scaled asynchronous MVs and the synchronous MVs in the first number of HMVPs may be added to an MV candidate list (e.g., the preliminary second MV candidate list or the second MV candidate list as described in FIG. 20) and the synchronous MVs may be arranged in front of the scaled asynchronous MVs.

Figure 27A:
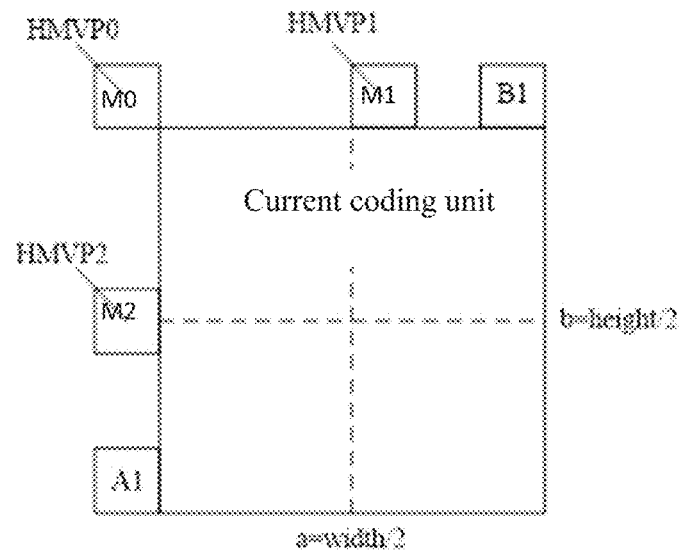
FIG. 27A shows a first number of HMVPs determined from an HMVP list according to some embodiments of the present disclosure.
Figure 27B:
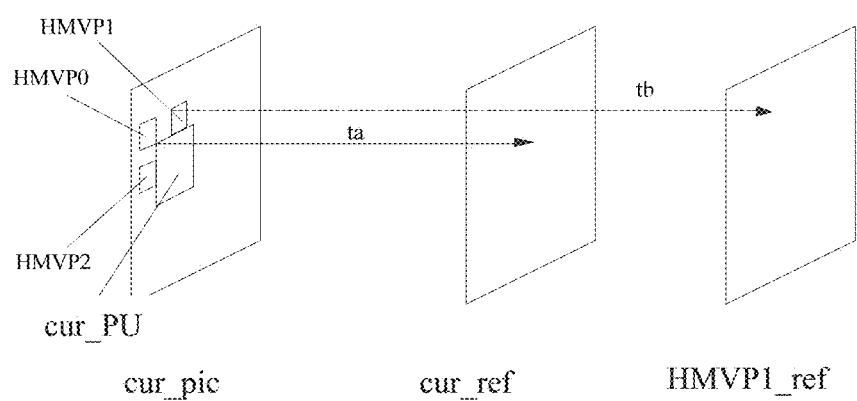
FIG. 27B shows a diagram illustrating the scaling of the HMVP1 according to some embodiments of the present disclosure.

For example, FIG. 27A shows a first number of HMVPs determined from an HMVP list according to some embodiments of the present disclosure. As shown in FIG. 27A, the first number of HMVPs determined from the HMVP list includes HMVP0, HMVP1, and HMVP2. The positive order of HMVP0, HMVP1, and HMVP2 arranged in the HMVP list may be HMVP0-HMVP1-HMVP2 (the reverse order of HMVP0, HMVP1, and HMVP2 arranged in the HMVP list may be HMVP2-HMVP1-HMVP0). HMVP0, HMVP1, and HMVP2 may be determined from the HMVP list in the reverse order, i.e., HMVP2-HMVP1-HMVP0. An image block corresponding to HMVP1 may have a reference image different from the reference image of the current coding unit. Image blocks corresponding to HMVP0 and HMVP2 may have reference images same as the reference image of the current coding unit. The HMVP1 may be an asynchronous MV. The HMVP1 may be scaled. For example, FIG. 27B shows a diagram illustrating the scaling of the HMVP1 according to some embodiments of the present disclosure. As shown in FIG. 27B, ta refers to a distance between the image (cur_pic) and a reference image (cur_ref) of the image and tb refers to a distance between the image (cur_pic) and a reference image (HMVP1_ref) of the image block corresponding to the HMVP1. HMVP1 may be scaled to obtain scaled HMVP1 by multiplying the HMVP1 with a ratio of ta and tb. HMVP0, scaled HMVP1, and HMVP2 may be added to an MV candidate list (i.e., the preliminary second MV candidate list or the second MV candidate list as described in FIG. 20) in an order of HMVP2-HMVP0-scaleHMVP1.

Example 2

A current coding unit may be encoded using the merge mode. According to process 2000 as described in FIG. 20, a first number of HMVPs may be determined from an HMVP list (i.e., the first MV candidate list as described in FIG. 20) in the reverse order. An asynchronous MV in the first number of HMVPs determined from the HMVP list may be scaled to obtain scaled asynchronous MV. The scaled asynchronous MVs and the synchronous MVs in the first number of HMVPs may be added to an MV candidate list and the synchronous MVs may be arranged before the scaled asynchronous MVs. The first number of HMVPs may be compared with MVs that have been added into an MV candidate list (i.e., the preliminary second MV candidate list or the second MV candidate list as described in FIG. 20).

As shown in FIG. 27A, image blocks corresponding to HMVP0, HMVP1, and HMVP2 are image blocks M0, M1, and M2, respectively. According to process 2200, if a is equal to width/2, and b is equal to height/2, HMVP0 may be compared with MVs of image blocks A1 and B1, scaled HMVP1 may be compared with the MV of image block B1, and HMVP2 may be compared with the MV of image block A1. If the HMVP0 is the same as the MV of image block A1, scaled HMVP1 and HMVP2 are different from the MV of B1 and the MV of A1, the scaled HMVP1 and HMVP2 may be added to the MV candidate list (i.e., the preliminary second MV candidate list or the second MV candidate list as described in FIG. 20) of the current coding unit.

The basic concepts have been described above. Obviously, for those skilled in the art, the detailed disclosure is merely by way of example, and does not constitute a limitation on the present disclosure. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. In addition, certain features, structures, or characteristics in one or more embodiments of the present disclosure may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure method does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "about," "approximate," or "substantially" may indicate ±20% variation of the value it describes. Accordingly, in some embodiments, the numerical parameters set forth in the description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters configured to illustrate the broad scope of some embodiments of the present disclosure are approximations, the numerical values in specific examples may be as accurate as possible within a practical scope.

Each patent, patent application, patent application publication and other materials cited herein, such as articles, books, instructions, publications, documents, etc., are hereby incorporated by reference in their entirety. In addition to the application history documents that are inconsistent or conflicting with the contents of the present disclosure, the documents that may limit the widest range of the claim of the present disclosure (currently or later attached to this application) is excluded from the present disclosure. It should be noted that if the description, definition, and/or terms used in the appended application of the present disclosure is inconsistent or conflicting with the content described in the present disclosure, the use of the description, definition and/or terms of the present disclosure shall prevail.

At last, it should be understood that the embodiments described in the present disclosure are merely illustrative of the principles of the embodiments of the present disclosure. Other modifications may be within the scope of the present disclosure. Accordingly, by way of example, and not limitation, alternative configurations of embodiments of the present disclosure may be considered to be consistent with the teachings of the present disclosure. Accordingly, the embodiments of the present disclosure are not limited to the embodiments explicitly described and described by the present disclosure.

What is claimed is:

1. A system, comprising:
at least one storage device including a set of instructions; and
at least one processor in communication with the at least one storage device, wherein when executing the set of instructions, the at least one processor is directed to cause the system to perform operations including:
obtaining a current coding unit in an image;
determining feature information of the current coding unit, the feature information being associated with a texture feature;
determining, based on the feature information of the current coding unit, a motion vector (MV) candidate list; and
determining, based on the MV candidate list, a prediction result of the current coding unit, wherein the determining, based on the feature information of the current coding unit, a motion vector (MV) candidate list includes:
determining, based on the feature information, image blocks that are located along each of two adjacent boundaries of the current coding unit; and
determining, based on the image blocks that are located along each of the two adjacent boundaries of the current coding unit, the motion vector (MV) candidate list, wherein the two adjacent boundaries of the current coding unit include a first boundary satisfying a condition and a second boundary, and one or more MVs of image blocks located along the first boundary are arranged in the MV candidate list in front of MVs of image blocks located along the second boundary.

2. The system of claim 1, the determining, based on the feature information of the current coding unit, an MV candidate list includes:
determining, based on the feature information of the current coding unit, one or more motion vectors (MVs) of one or more image blocks associated with the current coding unit, each of the one or more image blocks having been encoded; and
determining, based at least in part on the one or more MVs, the MV candidate list.

3. The system of claim 2, wherein the determining, based on the feature information of the current coding unit, one or more motion vectors (MVs) of one or more image blocks associated with the current coding unit includes:
obtaining the MVs of the one or more image blocks, wherein at least one of a count of the one or more image blocks is determined based on the feature information.

4. The system of claim 3, wherein the determining the one or more image blocks includes:
determining, based on the feature information, a count of image blocks that are located along each of two adjacent boundaries of the current coding unit; and
determining, based on the count of image blocks that are located along each of the two adjacent boundaries of the current coding unit, the one or more image blocks.

5. The system of claim 4, wherein a first count of image blocks located along the first boundary exceeds a second count of image blocks located along the second boundary.

6. The system of claim 5, wherein the determining, based on the feature information, a count of image blocks that are located along each of the two adjacent boundaries of the current coding unit includes;
determining, based on a prediction mode of the current coding unit, an initial count of image blocks located along the first boundary and an initial count of image blocks that located along the second boundary;
increasing the initial count of image blocks located along the first boundary to obtain the first count; and
decreasing the initial count of image blocks that located along the second boundary to obtain the second count.

7. The system of claim 5, wherein
the feature information includes a size feature,
the size feature includes information associated with lengths of the two adjacent boundaries of the current coding unit; and
the first boundary satisfying the condition includes that the first boundary has a longer length among the two adjacent boundaries.

8. The system of claim 5, wherein
the texture feature includes information associated with a texture direction of the current coding unit; and
the first boundary satisfying the condition includes that the texture direction of the current coding unit points to the first boundary.

9. The system of claim 8, wherein the determining feature information of the current coding unit includes:
performing an intra-frame prediction on the current coding unit using multiple angular prediction modes with different prediction directions;
determining a rate distortion (RD) cost corresponding to each of the multiple angular prediction modes to obtain multiple RDcosts; and
designating a prediction direction of one of the multiple angular prediction modes corresponding to a minimum RDcost among the multiple RDcosts as the texture direction.

10. The system of claim 3, wherein
the texture feature includes a texture similarity degree between the current coding unit and each of the one or more image blocks; and
an MV of an image block with a higher texture similarity degree with the current coding unit is arranged in front of an MV of an image block with a lower texture similarity degree with the current coding unit in the MV candidate list.

11. The system of claim 2, wherein the determining, based at least in part on the one or more MVs, the MV candidate list includes:
determining one or more co-located images of the image;
determining one or more co-located blocks in each of the one or more co-located images, each of the one or more co-located blocks corresponding to one of the one or more image blocks;
generating, based on each of first motion vectors (MVs) of the one or more co-located blocks, multiple second MVs of the current coding unit, each of the first MVs of the one or more co-located blocks corresponding to the multiple second MVs of the current coding unit;
determining, based at least in part on the one or more MVs and the multiple second MVs of the current coding unit, the MV candidate list.

12. The system of claim 11, wherein the determining, based at least in part on the one or more MVs and the multiple second MVs of the current coding unit, the MV candidate list includes:
obtaining a first MV candidate list, the first MV candidate list including a plurality of historical MVs of a plurality of first image blocks, each of the plurality of historical MVs having been used to encode one of a plurality of first image blocks;

determining, from the plurality of historical MVs, one or more historical MVs of one or more first image blocks according to a first order;

determining, based at least in part on the one or more MVs, the multiple second MVs, the one or more historical MVs of the one or more first image blocks, and a second order, the MV candidate list.

13. The system of claim 1, wherein the feature information includes a size feature, the size feature includes at least one of information associated with lengths of two adjacent boundaries of the current coding unit, information associated with area of the current coding unit, and information associated with total count of pixels in the current coding unit.

14. The system of claim 1, wherein the texture feature includes a texture complexity, wherein the texture complexity indicates whether a texture of the current coding unit is flat or irregular.

15. The system of claim 1, wherein the feature information includes a size feature, the first boundary and the second boundary are determined the size feature or the texture feature of the current coding unit.

16. The system of claim 2, wherein the determining, based at least in part on the one or more MVs, the MV candidate list includes:

determining, based on the one or more MVs, a preliminary second MV candidate list;

adding one or more first MVs or scaled first MVs into the preliminary second MV candidate list to obtain a second MV candidate list.

17. The system of claim 16, wherein the adding one or more first MVs or scaled first MVs into the preliminary second MV candidate list to obtain a second MV candidate list includes:

obtaining a first MV candidate list associated with the current coding unit in an image, the first MV candidate list including a plurality of MVs of a plurality of first image blocks, each of the plurality of MVs having been used to encode one of the plurality of first image blocks;

determining, from the plurality of MVs, the one or more first MVs of one or more first image blocks according to a first order; and adding the one or more first MVs or scaled first MVs into the preliminary second MV candidate list according to a second order to obtain the second MV candidate list.

18. The system of claim 17, further including:

determining an MV from the second MV candidate list as a motion vector prediction (MVP) of the current coding unit.

* * * * *